(12) United States Patent
Ando

(10) Patent No.: US 11,615,269 B2
(45) Date of Patent: Mar. 28, 2023

(54) PROCESSING METHOD, SYSTEM, PROGRAM, AND STORAGE MEDIUM FOR GENERATING LEARNING DATA, AND LEARNING DATA GENERATION METHOD AND SYSTEM

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 806 days.

(21) Appl. No.: 16/548,885

(22) Filed: Aug. 23, 2019

(65) Prior Publication Data

US 2019/0377982 A1 Dec. 12, 2019

Related U.S. Application Data

(63) Continuation of application No. PCT/IB2017/051078, filed on Feb. 24, 2017.

(51) Int. Cl.
| | |
|---|---|
| *G06K 9/62* | (2022.01) |
| *G06N 20/00* | (2019.01) |
| *G06N 3/04* | (2006.01) |
| *G06N 3/08* | (2006.01) |
| *G06N 20/10* | (2019.01) |
| *G06V 10/774* | (2022.01) |

(52) U.S. Cl.
CPC ........... *G06K 9/6257* (2013.01); *G06K 9/626* (2013.01); *G06K 9/6227* (2013.01); *G06K 9/6261* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,725,662 | B2 * | 5/2014 | Izhikevich | G06N 3/08 706/12 |
| 10,366,502 | B1 * | 7/2019 | Li | B60R 1/00 |
| 10,602,523 | B2 * | 3/2020 | Youtz | H04W 72/048 |
| 10,713,591 | B2 * | 7/2020 | Gangadharappa | G06N 5/04 |
| 2004/0162724 | A1 | 8/2004 | Hill et al. | |
| 2005/0105712 | A1 | 5/2005 | Williams et al. | |

(Continued)

FOREIGN PATENT DOCUMENTS

| | | |
|---|---|---|
| CN | 101010934 A | 8/2007 |
| CN | 103217935 A | 7/2013 |

(Continued)

OTHER PUBLICATIONS

An English translation of the International Search Report("ISR") of PCT/IB2017/051078 dated Apr. 25, 2017.

(Continued)

*Primary Examiner* — Mohammed Rachedine
(74) *Attorney, Agent, or Firm* — Metrolex IP Law Group, PLLC

(57) ABSTRACT

The disclosure relates to a processing method for generating learning data, which may include: specifying requirement information for generating learning data, based on request information for making a request for learning; and transmitting the requirement information to a device that generates the learning data. The disclosure also relates to a system and a program that realize the method, and a storage medium that stores the program.

14 Claims, 30 Drawing Sheets

(56) References Cited

U.S. PATENT DOCUMENTS

| | | |
|---|---|---|
| 2009/0228264 A1 | 9/2009 | Williams et al. |
| 2012/0113268 A1 | 5/2012 | Ito et al. |
| 2013/0006954 A1* | 1/2013 | Nikoulina ............... G06F 40/44 |
| | | 707/706 |
| 2013/0073488 A1 | 3/2013 | Anderson et al. |
| 2013/0124465 A1 | 5/2013 | Pingel et al. |
| 2017/0330061 A1* | 11/2017 | Ikeda ..................... G06V 20/53 |
| 2018/0114142 A1* | 4/2018 | Mueller ............... G06K 9/6269 |

FOREIGN PATENT DOCUMENTS

| | | | | |
|---|---|---|---|---|
| CN | 104980559 A | * | 10/2015 | ........ H04M 1/72454 |
| CN | 106780089 A | * | 5/2017 | ............... G06N 3/10 |
| CN | 107016399 A | * | 8/2017 | ........... G05B 19/048 |
| CN | 108700851 A | * | 10/2018 | ............. G01R 22/10 |
| CN | 106663095 B | * | 9/2019 | ............. G06F 16/00 |
| EP | 3113037 A1 | | 1/2017 | |
| JP | H06-052250 A | | 2/1994 | |
| JP | 2006-91734 A | | 4/2006 | |
| JP | 2007-279887 A | | 10/2007 | |
| JP | 2008-040683 A | | 2/2008 | |
| JP | 2012-101320 A | | 5/2012 | |

OTHER PUBLICATIONS

The Written Opinion("WO") of PCT/IB2017/051078 dated Apr. 25, 2017.

Shrish Bajpai, "How can I generate the training data from the dataset of images?", Jul. 7, 2015, ResearchGate GmbH, Retrieved from the Internet: URL:https://www.researchgate.net/post/How_can_I_generate_the_training_data_from_the_dataset_of_images [retrieved on Apr. 20, 2020]; relevance is indicated in the EESR on Apr. 30, 2020.

The EESR dated Apr. 30, 2020 in a counterpart European patent application.

Office Action (CNOA) dated Nov. 16, 2022 in a counterpart Chinese patent application, with English translation.

* cited by examiner

PROCESSING METHOD, SYSTEM, PROGRAM, AND STORAGE MEDIUM FOR GENERATING LEARNING DATA, AND LEARNING DATA GENERATION METHOD AND SYSTEM

CROSS REFERENCE TO RELATED APPLICATIONS

This application is a continuation application of International Application No. PCT/IB2017/051078, filed on Feb. 24, 2017, the entire contents of which are incorporated herein by reference.

TECHNICAL FIELD

The present disclosure relates to the field of deep learning, and more specifically relates to a processing method, a system, a program, and a storage medium for generating learning data, and a learning data generation method and system.

RELATED ART

In recent years, artificial intelligence (AI) technology such as deep learning has been developed, and a technology for performing classification and prediction of subjects based on input data such as camera images and sensor information has begun to spread. Using an AI technology such as deep learning, a machine can perform learning by itself to acquire the ability to classify the subjects of analysis, for example. Due to rapid evolution of AI technology, a machine can acquire a wider range of abilities than ever as the results of learning. Accordingly, more and more users wish to use the abilities acquired through learning using a deep learning technology or the like.

SUMMARY OF THE INVENTION

Problem to be Solved by the Invention

However, it is not easy for general users to understand or utilize a learning method according to the deep learning technology. In particular, what kind of data is required in order to acquire an ability depends on the learning method, the subject of learning, the level of difficulty in achieving the goal of learning, and so on, and therefore it is difficult for general users to understand and utilize a learning method such as deep learning.

In deep learning, it is required that learning is performed based on a large quantity of data. Generally, the smaller the quantity of data used for learning is, the narrower the applicable range of the acquired ability is. However, learning through deep learning requires a lot of time and system resources, and providing too much data is problematic. Therefore, there is a problem in that it is difficult for general users to know what kind of learning data is required and how much learning data is required in order to acquire a desired ability, and it takes a lot of trouble to prepare learning data.

If the subject of learning is specified and the goal of learning is set, a general user can utilize a learning method such as deep learning, provided that the user has a device that automatically enables the user to prepare learning data or automatically provides learning data to the user.

For example, in the case of a confectionery production line, if it is only necessary to prepare good and bad products as samples in order to acquire the ability to discern between good and bad confectionery products, it is very easy to utilize a learning method such as deep learning. One or more aspects aim to provide, as solutions to the problem, a method, a system, a database, a program, and a storage medium that make it possible to automatically or semi-automatically provide learning data.

Means for Solving the Problems

One or more embodiments provide a processing method for generating learning data, which may include: a step of specifying requirement information for generating learning data, based on request information for making a request for learning; and a step of transmitting the requirement information to a device that generates the learning data.

Furthermore, the request information may include information regarding a learning subject that is the subject of learning that is to be performed based on the learning data, and information regarding a goal of learning indicating a processing ability that is to be acquired for the learning subject.

In the above-described processing method, the step of specifying the requirement information for generating the learning data may include: a step of acquiring information regarding the goal of learning included in the request information; and a step of specifying at least one of the type and the number of learning data, based on the information regarding the goal of learning.

In the above-described processing method, the step of specifying the requirement information for generating the learning data may include: a step of acquiring information regarding the learning subject included in the request information; and a step of specifying requirement information corresponding to the information regarding the learning subject.

In the above-described processing method, the step of specifying the requirement information for generating the learning data may include: a step of acquiring information regarding at least one state of the learning subject; and a step of specifying requirement information for each state of the learning subject, or specifying requirement information corresponding to state conversion of the learning subject.

Furthermore, the step of specifying the requirement information for generating the learning data may include: a step of specifying, based on the request information, data information regarding the learning data, including at least one of: format information regarding the learning data; detail information regarding the learning data; range information regarding the learning data; information regarding preprocessing for the learning data; information regarding a means for acquiring the learning data; and identification information regarding the learning data.

Furthermore, the step of specifying the requirement information for generating the learning data may include: a step of specifying, based on the request information, subject information regarding the learning subject, including at least one of: the type of the learning subject; the state of the learning subject; state control information regarding the learning subject; and a state control program for the learning subject.

Furthermore, the step of specifying the requirement information for generating the learning data may include: a step of specifying, based on the request information, setting information regarding an operation subject that is to be subjected to data acquisition and/or operation for the learning subject, the setting information including at least one of: the type of the operation subject, the hardware configuration of the operation subject; control data for the operation subject; and a control program for the operation subject.

In the above-described processing method, the step of specifying the requirement information for generating the learning data may include: a step of acquiring the requirement information from a database based on the request information, or a step of generating the requirement information based on the request information.

The above-described processing method may further include: a step of, after specifying the requirement information, storing a correspondence relationship between at least one piece of information included in the request information, and the requirement information.

The above-described processing method may further include a step of acquiring, from the device, the learning data acquired through learning performed based on the requirement information.

The above-described processing method may further include: a step of acquiring a learning result of learning performed using the request information and the learning data; and a step of transmitting the learning result to a device that performs subject analysis using the learning result.

One or more embodiments provide a method thorough which learning data is generated, which may include: a step of receiving request information for making a request for learning; a step of transmitting the request information to a device that provides requirement information for generating learning data; a step of receiving the requirement information from the device; and a step of generating the learning data based on the requirement information.

Furthermore, the request information may include information regarding a learning subject that is the subject of learning that is to be performed based on the learning data, and information regarding a goal of learning indicating a processing ability that is to be acquired for the learning subject.

In the above-described method, the step of generating the learning data based on the requirement information may include: a step of specifying at least one of the type and the number of learning data, based on the requirement information corresponding to the information regarding the goal of learning; and a step of generating data regarding the type and/or the number as part of the learning data.

In the above-described method, the step of generating the learning data based on the requirement information may include: a step of forming the learning subject and/or an operation subject that is to be subjected to data acquisition and/or operation for the learning subject, based on the requirement information corresponding to information regarding the learning subject; and a step of generating data based on the result of formation, as at least part of the learning data.

In the above-described method, the step of generating the learning data based on the requirement information may include: a step of setting a state of the learning subject based on the requirement information corresponding to information regarding at least one state of the learning subject; and a step of generating data for each state of the learning subject as at least part of the learning data.

The step of generating the learning data based on the requirement information may further include: a step of storing the generated data in association with teaching data that reflects the processing ability.

The above-described method may further include: a step of receiving a learning result acquired by performing learning based on the learning data; and a step of performing subject analysis by utilizing the learning result.

One or more embodiments provide a processing system for generating learning data, which may include: a requirement information specifying unit configured to specify requirement information for generating learning data, based on request information for making a request for learning; and a learning data transmitting unit configured to transmit the requirement information to a device configured to generate the learning data.

Furthermore, the request information may include information regarding a learning subject that is the subject of learning that is to be performed based on the learning data, and information regarding a goal of learning indicating a processing ability that is to be acquired for the learning subject.

In the above-described system, the requirement information specifying unit is configured to acquire information regarding the goal of learning included in the request information, and specify at least one of the type and the number of learning data, based on the information regarding the goal of learning.

In the above-described system, the requirement information specifying unit is configured to acquire information regarding the learning subject included in the request information, and specify requirement information corresponding to the information regarding learning subject.

In the above-described system, the requirement information specifying unit is configured to acquire information regarding at least one state of the learning subject, and specify requirement information for each state of the learning subject, or specify requirement information corresponding to state conversion of the learning subject.

Furthermore, the requirement information specifying unit is configured to specify, based on the request information, data information regarding the learning data, including at least one of: format information regarding the learning data; detail information regarding the learning data; range information regarding the learning data; information regarding preprocessing for the learning data; information regarding a means for acquiring the learning data; and identification information regarding the learning data.

Furthermore, the requirement information specifying unit is configured to specify, based on the request information, subject information regarding the learning subject, including at least one of: the type of the learning subject; the state of the learning subject; state control information regarding the learning subject; and a state control program for the learning subject.

Furthermore, the requirement information specifying unit is configured to specify, based on the request information, setting information regarding an operation subject that is to be subjected to data acquisition and/or operation for the learning subject, the setting information including at least one of: the type of the operation subject, the hardware configuration of the operation subject; control data for the operation subject; and a control program for the operation subject.

In the above-described system, the requirement information specifying unit is configured to acquire the requirement information from a database based on the request information, or generate the requirement information based on the request information.

The above-described system may further include: a storage unit configured to, after specifying the requirement information, store a correspondence relationship between at least one piece of information included in the request information, and the requirement information.

The above-described system may further include: a learning data acquiring unit configured to acquire, from the device, the learning data acquired through learning performed based on the requirement information.

The above-described system may further include: a learning unit configured to acquire a learning result by performing learning using the request information and the learning data; and a learning result transmitting unit configured to transmit the learning result to a device configured to perform subject analysis based on the learning result.

One or more embodiments provide: a system that generates learning data, which may include: a request information receiving unit configured to receive request information for making a request for learning; a request information transmitting unit configured to transmit the request information to a device configured to provide requirement information for generating learning data; a requirement information receiving unit configured to receive the requirement information from the device; and a learning data generation unit configured to generate the learning data based on the requirement information.

The request information may include information regarding a learning subject that is the subject of learning that is to be performed based on the learning data, and information regarding a goal of learning indicating a processing ability that is to be acquired for the learning subject.

In the above-described system, the learning data generation unit is configured to specify at least one of the type and the number of learning data, based on the requirement information corresponding to the information regarding the goal of learning, and generate data regarding the type and/or the number as part of the learning data.

In the above-described system, the learning data generation unit is configured to form the learning subject and/or an operation subject that is to be subjected to data acquisition and/or operation for the learning subject, based on the requirement information corresponding to information regarding the learning subject, and to generate data based on the result of formation, as at least part of the learning data.

In the above-described system, the learning data generation unit is configured to set a state of the learning subject based on the requirement information corresponding to information regarding at least one state of the learning subject, and to generate data for each state of the learning subject as at least part of the learning data.

The above-described system may further include: a learning data storage unit configured to store the generated data in association with teaching data that reflects the processing ability.

The above-described system may further include: a learning result receiving unit configured to receive a learning result acquired by performing learning based on the learning data; and a learning result utilizing unit configured to perform subject analysis by utilizing the learning result.

One or more embodiments provide a server that may include: a storage device configured to store a program; and a processor, and the processor is configured to perform operation to specify requirement information for generating learning data based on the program and request information for making a request for learning, and to transmit the requirement information to a device that is configured to generate the learning data.

One or more embodiments provide a program that may cause a processor to execute: a step of specifying requirement information for generating learning data, based on request information for making a request for learning; and a step of transmitting the requirement information to a device that generates the learning data.

One or more embodiments provide a storage medium that may store a program for realizing: a step of specifying requirement information for generating learning data, based on request information for making a request for learning; and a step of transmitting the requirement information to a device that generates the learning data.

Effects of the Invention

According to one or more embodiments, it is possible to automate/semi-automate the generation of learning data by specifying requirement information. As a result, a learning requestor can create necessary learning data without understanding the details of the learning method. In particular, if the learning requestor is different from a person who has created a learning program for the learning device, a load on the learning requestor is significantly reduced.

Also, according to one or more embodiments, it is possible to avoid a situation where AI learning does not end due to the lack of learning data and the CPU wastefully continues running Therefore, it is possible to reduce a load on the CPU and save system resources. Also, according to one or more embodiments, it is possible to avoid a situation in which additional learning is performed due to the lack of learning. Therefore, it is possible to reduce a communication load between a client and a server, for example, and processing load on the server, for example, and thus it is possible to save server resources and processing time.

BRIEF DESCRIPTION OF THE DRAWINGS

The drawings described below are intended to facilitate further understanding of the present invention, and constitute part of the present application. Also, the conceptual examples of the present invention and descriptions thereof are intended to illustrate the present invention, and are not intended to unreasonably limit the present invention. In the drawings:

FIG. 28 is a flow diagram illustrating a good/bad product determination method, such as in

FIG. 26.

EMBODIMENTS

In order to enable a person skilled in the art to further understand the present invention, embodiments will be clearly and fully described below with reference to combinations of the drawings. However, obviously, the embodiments described below constitute only part of the present invention, and do not constitute the entirety of the invention. Other embodiments obtained by a person skilled in the art based on the embodiments without performing creative work are all included in the scope of protection of the present invention.

Note that "/" used in the present application means "and", "or", or any one or more options of a plurality of options. Terms "include", "have", and any other modifications thereof are intended to cover what is included, without being exclusive. For example, a process, a method, a system, a device, or a part that includes a series of steps or units need not be limited to the steps or units that are explicitly shown, and may include other steps or units that are not explicitly shown or that are unique to the process, the method, the system, the device, or the part. The following describes embodiments with reference to combinations of the drawings.

The following embodiments describe a system that acquires different abilities depending on various goals of learning, for example. An ability that a user wishes to acquire is different every time, and therefore it is required that different learning data is prepared according to the user's needs.

According to one or more embodiments, when an ability that is to be acquired is specified for a machine that performs learning, for example, it is possible to acquire the first piece of learning data by specifying requirement information regarding learning data that is required in order to acquire the specified ability, and repeatedly performing configuration setting for a learning subject and an operation subject according to the specified requirement information. Furthermore, it is possible to acquire learning data by defining the first piece of learning data as learning data, or storing the first piece of learning data in association with teaching data or the like to form learning data.

Figure 1:
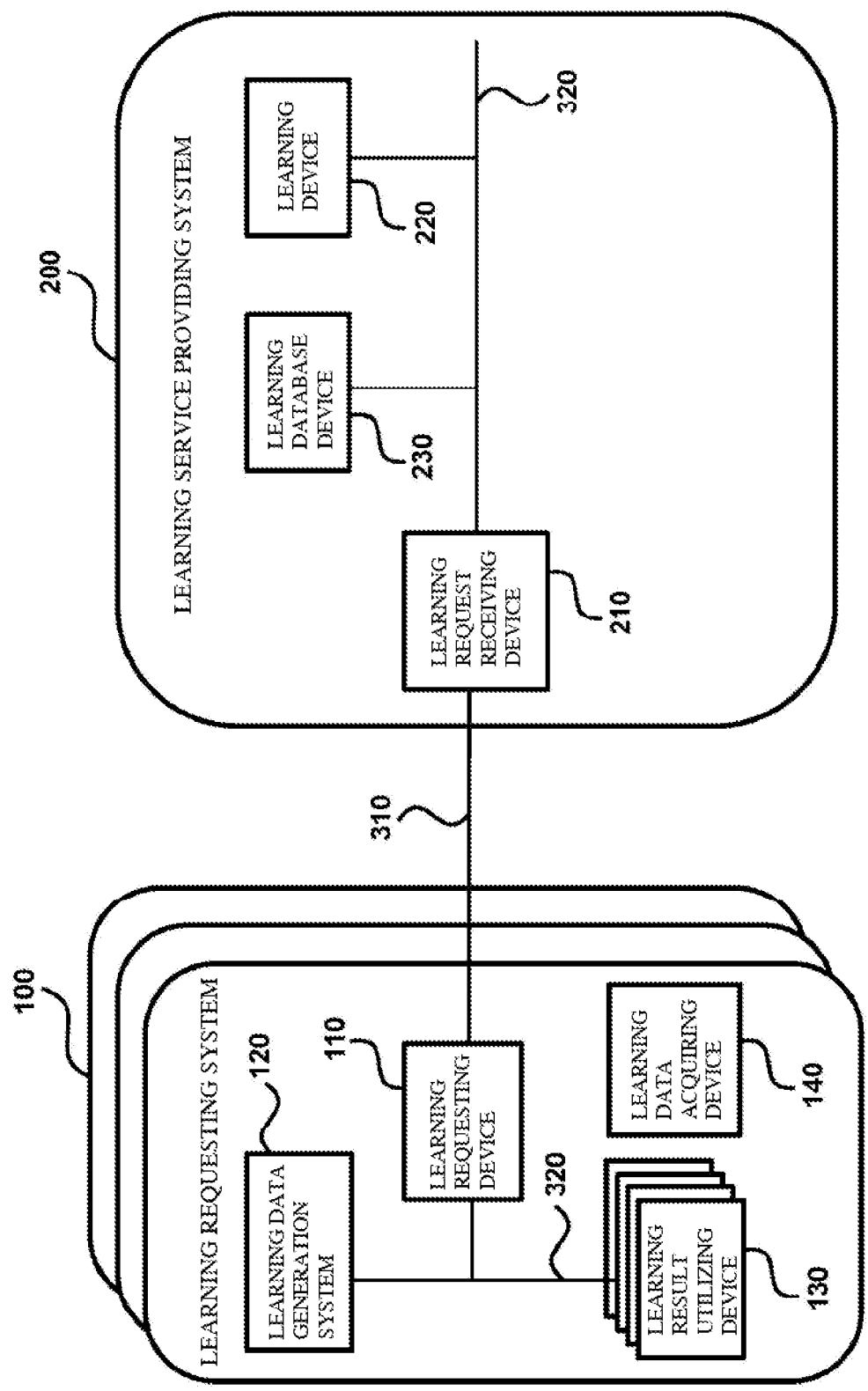
FIG. 1 is a diagram illustrating configurations of a learning requesting system and a learning service providing system according to one or more embodiments.

FIG. 1 is a diagram showing configurations of a learning requesting system 100 and a learning service providing system 200 according to one or more embodiments. As shown in FIG. 1, the learning requesting system 100 according to one or more embodiments may include a learning requesting device 110, a learning data generation system 120, a learning result utilizing device 130, and a learning data acquiring device 140. The learning requesting device 110 may be used as an interface between the learning requesting system 100 and a user, and receives request information from a user, which is used to make a request for learning. The learning requesting device 110 may also be used as an interface between the learning requesting system 100 and the learning service providing system 200, and transmits the received request information to the learning service providing system 200 and receives requirement information from the learning service providing system 200, which is used to generate learning data based on the request information. The learning data generation system 120 generates learning data based on the requirement information. The learning result utilizing device 130 utilizes the results of learning performed using the learning data, to perform operation/analysis/inspection, etc. on subjects. The learning data acquiring device 140 acquires and stores learning data.

"Subjects" in the present application may include various subjects that are paid attention to achieve an objective of one or more embodiments. In one or more embodiments, subjects may include a learning subject, which is the subject of learning that is performed based on learning data, and an operation subject, which is to be subjected to operation/ setting, etc. for the learning subject. For example, in a case where good/bad confectionary products are to be discerned in a production line of a food processing plant, examples of subjects may include a confectionary product, which is a learning subject, and a camera that captures an image of a confectionary product, which is an operation subject. Also, for example, in a case where files are automatically classified in a computer system, other examples of subjects may include a file, which is a learning subject, and a program for determining a file and extracting features, which is an operation subject.

The learning service providing system 200 may include a learning request receiving device 210, a learning device 220, and a learning database device 230. The learning request receiving device 210 is used as an interface between the learning service providing system 200 and the learning requesting system 100, and receives request information of a user from the learning requesting device 110 and transmits requirement information generated based on the request information to generate learning data, to the learning requesting device 110. The learning device 220 performs learning using learning data, and transmits learning results obtained through learning, to the learning request receiving device 210. The learning database device 230 stores learning data, request information used by a user to make a request for learning, the usage history of learning results, requirement information for generating learning data, a learning program, and so on. The following describes the respective hardware structures and functions of the devices.

The learning requesting system 100 and the learning service providing system 200 communicate with each other using an Internet 310, for example. However, the present invention is not limited in such a way. The learning requesting system 100 and the learning service providing system 200 may transmit/receive information using various communication methods, e.g. via an intranet, a local area network, a mobile communication network, or a combination thereof. They may be provided in the same device.

Figure 2:
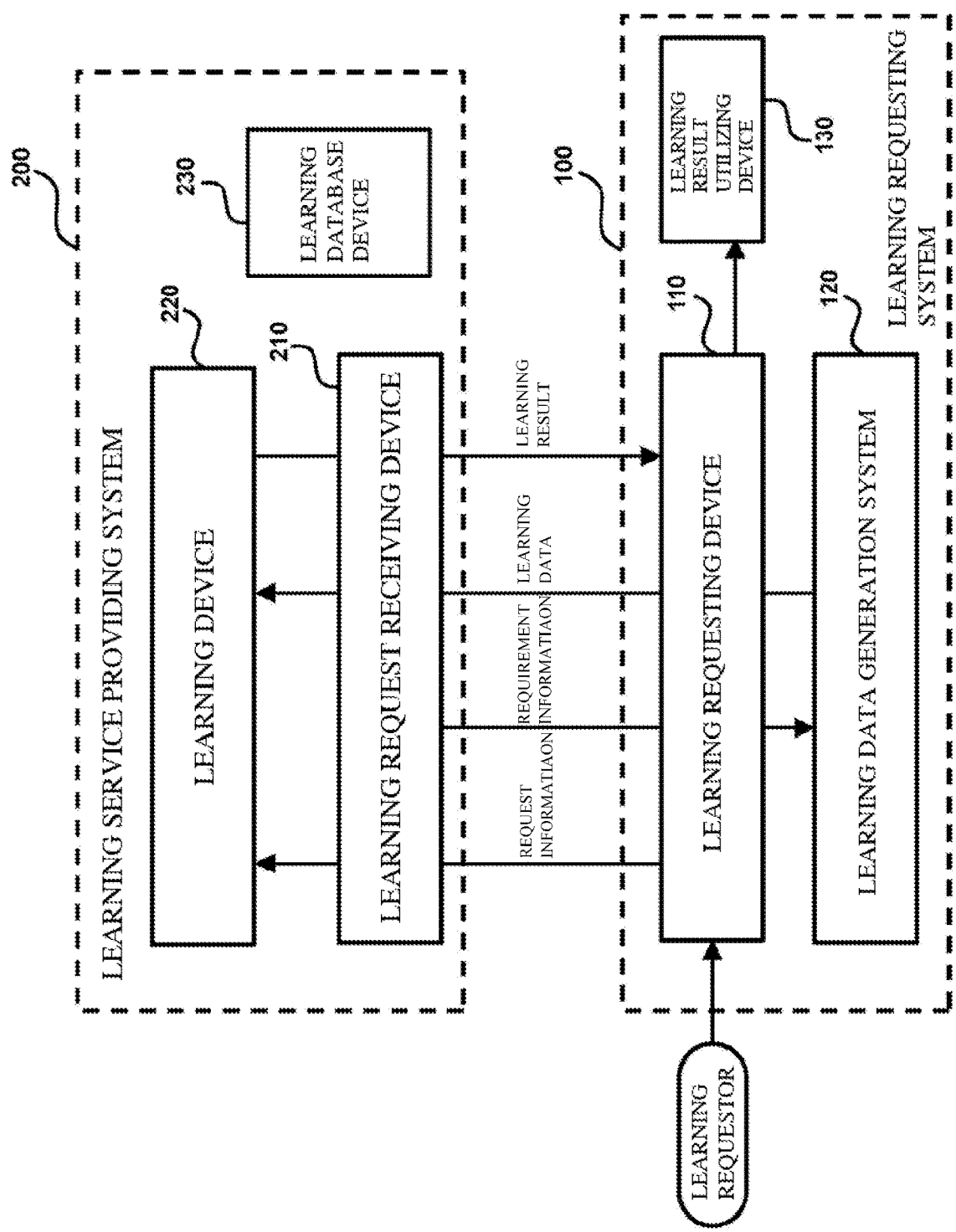
FIG. 2 is a diagram illustrating interactions between a learning requesting system and a learning service providing system according to one or more embodiments.

FIG. 2 is a diagram showing interactions between the learning requesting system 100 and the learning service providing system 200 according to one or more embodiments. As shown in FIG. 2, the learning requesting device 110 receives request information for making a request for learning, from a learning requester, and transmits the request information to the learning request receiving device 210 via the Internet 310. The learning request receiving device 210 receives the request information and notify the learning device of the received request information. Thereafter, the learning request receiving device 210 transmits requirement information for generating learning data specified based on the request information, to the learning requesting device 110. The learning requesting device 110 transmits the received requirement information for generating learning data, to the learning data generation system 120. The learning data generation system 120 generates learning data based on the requirement information for generating learning data. The learning data is transmitted to the learning device 220 via the Internet 310. The learning device 220 receives the learning data, performs learning based on the previously received request information for making a request for learning, and the learning data, to generate learning results, and the learning results may be formed as data by being converted into copiable data. The learning results formed as data is transmitted to the learning requesting device 110 via the Internet 310. The learning requesting device 110 transmits the learning results formed as data to the learning result utilizing device 120. The learning result utilizing device 120 utilizes the learning results to acquire a new ability, and exercises the ability to perform, on a processing subject, processing corresponding thereto.

In one or more embodiments, the learning service providing system 200 can specify requirement information for generating learning data, based on request information for making a request for learning, and transmit the requirement information to the learning data generation system 120 in the learning requesting system 100.

In one or more embodiments, it is possible to automate/ semi-automate the generation of learning data by specifying requirement information. A user who makes a request for learning need not manually input various kinds of data required for acquisition of learning data, and need not manually operate/set an operation device/program that acquires learning data. Therefore, it is possible to simplify operation and avoid the occurrence of an error.

In addition, the learning service providing system 200 may be realized using a remote server and a cloud. Thus, it is possible to reduce a computation load on a local device, save computational resources, and reduce computation time.

"Request information" in the present application may include various kinds of information for making a request for learning. In one or more embodiments, request information may include information regarding a learning subject, which is the subject of learning that is performed based on learning data, and information regarding the goal of learning, which indicates the processing ability that is to be acquired for the learning subject. For example, in a case where good/bad confectionary products are to be discerned in a production line of a food processing plant, the subject of learning may include confectionary products, and the goal of learning may be to enable an inspection device in the production line to acquire the ability to discern good/bad confectionary products. Of course, request information may additionally include various kinds of information, and it suffices if an objective of one or more embodiments can be achieved. For example, request information may include information regarding a user, etc.

By setting the content of request information, a user can clearly understand what is to be provided, without knowing a machine learning method. Thus, it is possible to improve the operability of the system, and reduce a load on the user.

Figure 3:
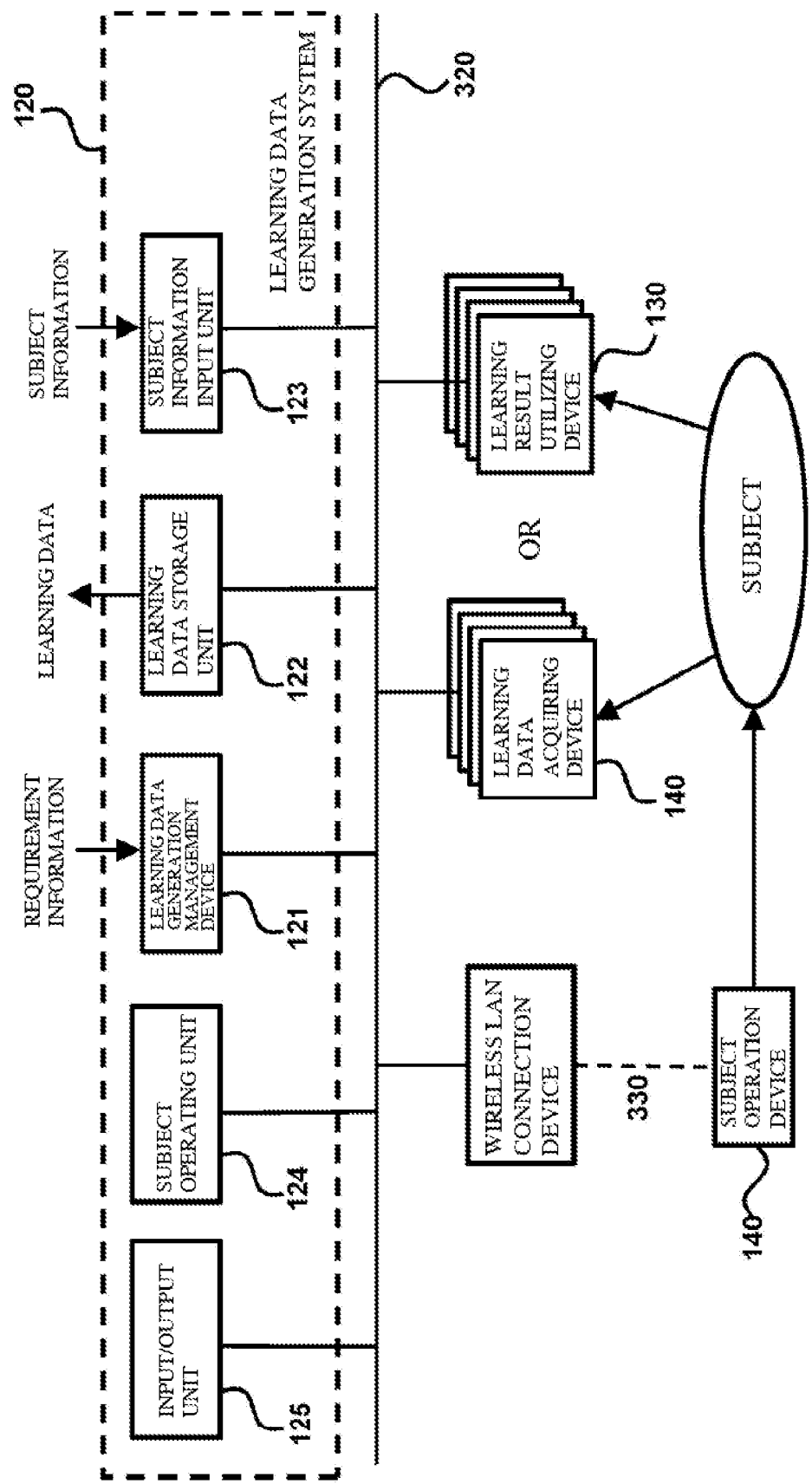
FIG. 3 is a diagram illustrating interactions between functional modules of a learning data generation system and other devices in a learning requesting system according to one or more embodiments.

FIG. 3 is a diagram showing interactions between functional modules of the learning data generation system 120 and other constituent elements of the learning requesting system 100 according to one or more embodiments. In FIG. 3, the dashed box represents the learning data generation system 120. The learning data generation system 120 generates learning data based on requirement information for generating learning data. As shown in FIG. 3, the learning data generation system 120 includes a learning data generation management device 121, a learning data storage unit 122, a subject information input unit 123, and a subject operating unit 124.

The learning data generation management device 121 manages operation of the learning data storage unit 122, the subject information input unit 123, and the subject operating unit 124 based on requirement information for generating learning data. The learning data storage unit 122 stores learning data generated based on the requirement information. The subject information input unit 123 provides, based on an instruction from the learning data generation management device 121, subject information corresponding thereto, to the learning data generation management device 121. The subject operating unit 124 provides, based on an instruction from the learning data generation management device 121, an instruction for operating the subject, to a subject operating device 410, which is an external device. FIG. 3 shows that the learning data generation system 120 communicates with external devices via a local area network 320. However, optionally, the learning data generation system 120 may transmit/receive information using other various communication methods, e.g. via the internet, an intranet, a mobile communication network, or a combination thereof.

As shown in FIG. 3, the learning data generation system 120 externally receives requirement information for generating learning data, and provides the learning data generation management device 121 with the requirement information. The learning data generation management device 121 generates an instruction for operating the subject based on the requirement information, and transmits the instruction to the subject operating unit 124. The subject operating unit 124 transmits the instruction in an appropriate data format, to the subject operating device 410 via a wireless local area network. The subject operating device 410 operates the subject to cause the subject to perform various actions for generating learning data, and thus realizes various states of the subject. The learning data acquiring device 140 performs data acquisition/operation/analysis on the subject in each state, thereby acquiring learning data. The learning data is transmitted to the learning data generation system 120 via the local area network 320, while being stored in the learning data storage unit 122. Subject information may be stored in association with learning data, or constitute part of learning data.

As shown in FIG. 3, the learning data generation system 120 may also include an input/output unit 125 that is used as an interface that communicates with external devices. For example, the input/output unit 125 may communicate with external devices using various communication methods, e.g. via an intranet, a wired/wireless local area network, a mobile communication network, or a combination thereof. For example, FIG. 3 shows an example in which the input/output unit 125 communicates with the subject operating device 410 via a wireless local area network.

Note that the learning data generation management device 121 and the learning data storage unit 122 may be implemented using a PC 600 described below, or implemented using a general-purpose PC that has a hardware structure and a configuration that are similar to those of the PC 600 described below. For example, the learning data generation management device 121 and the learning data storage unit 122 may be implemented using a CPU 610 and a storage unit 640 of the PC 600 described below, respectively.

Optionally, the learning data generation management device 121 and the learning data storage unit 122 may be integrated with the learning result utilizing device 130 or the learning data acquiring device 140, or integrated on the learning result utilizing device 130 or the learning data acquiring device 140.

FIG. 3 shows that learning data acquiring device 140 acquires learning data from the subject. However, alternatively, the learning result utilizing device 130 may acquire learning data from the subject. The learning result utilizing device 130 has the function of acquiring information regarding the subject, which is required when learning results are to be used, and therefore the learning result utilizing device 130 can also be used to input learning data. Therefore, optionally, the learning requesting system 100 can include both the learning data acquiring device 140 and the learning result utilizing device 130, and can also only include the learning result utilizing device 130 without including the learning data acquiring device 140. In addition to the function of acquiring information regarding the subject required when learning results are to be used, the learning result utilizing device 130 also has the function of performing operation/analysis/inspection, etc. on the subject, using learning results. Therefore, if the learning requesting system 100 need not have the function of performing operation/analysis/inspection, etc. on the subject using learning results, the learning requesting system 100 may include the learning data acquiring device 140 without including the learning result utilizing device 130.

Figure 4:
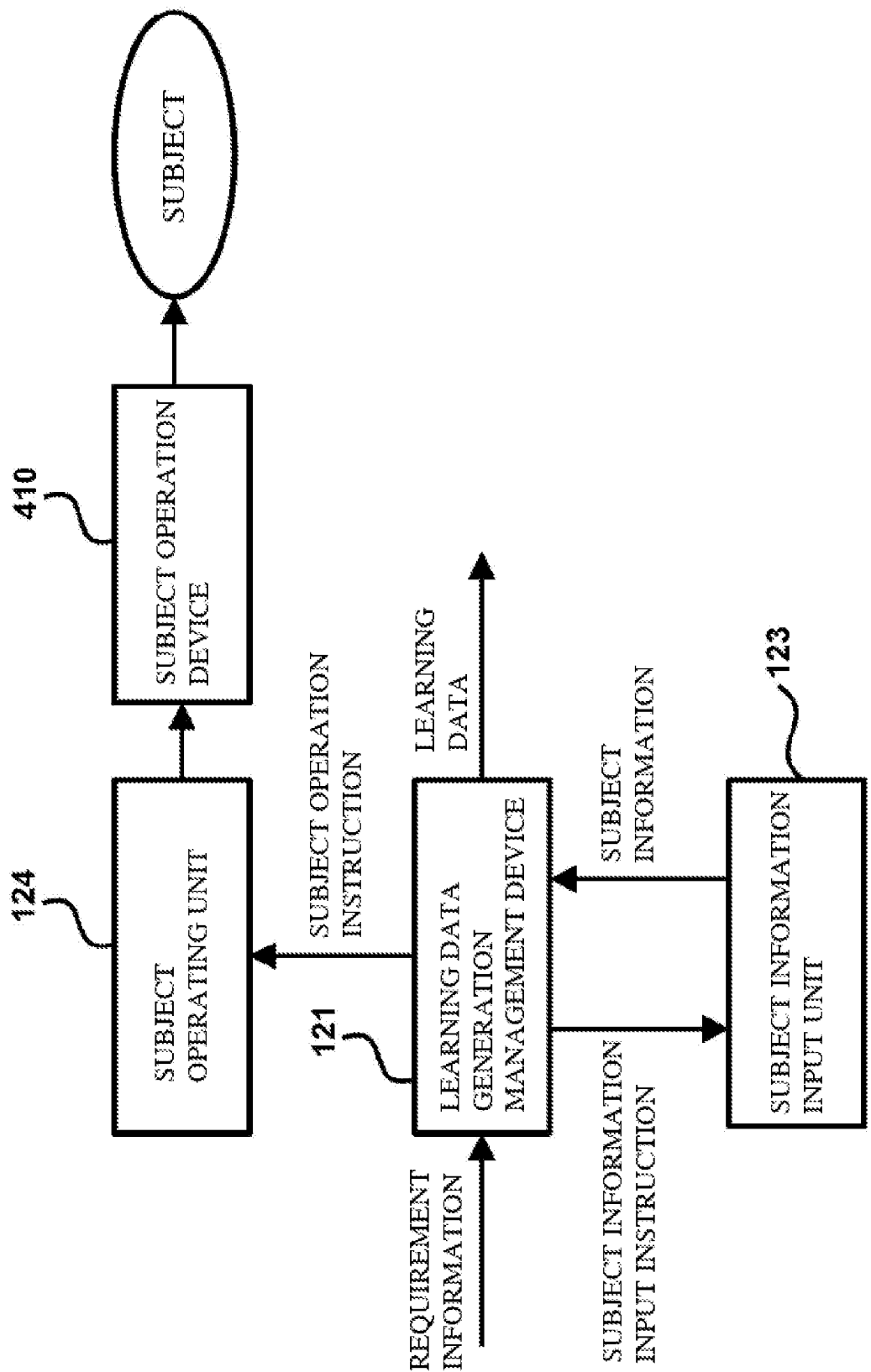
FIG. 4 is a diagram illustrating an example of operation of a learning data generation system according to one or more embodiments.

FIG. 4 is a diagram showing an example of operation of the learning data generation system 120 according to one or more embodiments. As shown in FIG. 4, the learning data generation management device 121 receives requirement information for generating learning data, and generates an instruction to make a request for input of subject information, based on the requirement information, and transmits the instruction to the subject information input unit 123. Based on the received instruction, the subject information input unit 123 searches for, or generates, subject information corresponding thereto, and transmits the found or generated subject information to the learning data generation management device 121. The learning data generation management device 121 transmits an instruction for operating the subject to the subject operating unit 124, based on requirement information for generating learning data, and subject information. After receiving the instruction, the subject operating unit communicate with the subject operating device 410, which is provided outside the learning data generation system 120. Thus, the subject operating device 410 operates the subject. For example, if the learning subject has a plurality of states, it is possible to acquire each of the states of the learning subject, which are required in order to acquire learning data. The learning data acquiring device 140 or the learning result utilizing device 130 performs operation/analysis/inspection, etc. on the subject in each state, thereby generating the first piece of learning data. The first piece of learning data can be stored in the learning data storage unit 122.

The first piece of learning data mentioned here may be defined as learning data per se, or constitute part of learning data. If the first piece of learning data is used alone as learning data, the first piece of learning data may be stored in the learning data storage unit 122 in association with teaching data, information that is to be used in the subsequent learning, or the like, or only the relationship between: the first piece of learning data and teaching data, information that is to be used in the subsequent learning, or the like may be stored in the learning data storage unit 122. When learning is to be performed, the stored learning data may be converted to data that is in a format that can be handled by the learning device 220, and thereafter output to the learning device 220.

Learning data for learning includes at least a piece of data that is input to a neural network when learning is performed. Learning data may also include teaching data in addition to the first piece of learning data.

Teaching data may be data that reflects the processing ability for the learning subject, which corresponds to the processing ability (the goal of learning) for the learning subject. If supervised learning is to be performed, teaching data is required for each piece of learning data that is used for learning. For example, in a case where good/bad confectionery products are to be detected in a production line of a food processing plant, learning is performed to discern good/bad products, using images captured by a camera, for example. Many pieces of image data (e.g. a hundred thousand images) captured by a camera constitute part of learning data.

However, teaching information that indicates, for each pieces of image data, whether the product captured in the image is a good product or a bad product is required. Furthermore, if good products have ranks, e.g. if good products include rank-A products, rank-B products, rank-C products, and so on, teaching information that indicates, for each piece of image data corresponding to a good product, which rank the product captured in the image belongs to is required. Teaching data may constitute part of learning data, or stored independent of learning data, in association with learning data.

By defining the generated data as part of learning data or defining the generated data and teaching data that has been stored in association therewith as part of learning data, it is possible to simplify the input to the device that performs learning using learning data. These pieces of data stored in association with each other may also be used in similar calculations that will be performed thereafter. Thus, it is possible to reduce a computation load on the system.

Learning data may also include other kind of data for learning in addition to the first piece of learning data and teaching data. For example, information that can be utilized by the learning requesting system 100 (and the learning data generation system 120 therein as well) or the learning service providing system 200 (and the learning device 220 therein as well) and information regarding the learning requester and the learning service provider may each be included in learning data. The following describes examples of data that can be included in learning data.

Information regarding a learning request: for example, information regarding the requester, the details of the ability that is to be acquired, the learning subject, the content of input data (the type of data, the attribute of data, the type of the sensor to be used, etc.) and the level of the goal of learning.

If information regarding a learning request is included in the learning data, it is possible to check the details of the learning request when performing learning, without referencing other data, and thus it is possible to improve the independence of learning computation, and simplify the system configuration.

Identification information regarding learning data

If identification information regarding learning data is included in the learning data, it is possible to identify learning data that is to be used, from among other kinds of learning data.

Classification information regarding learning data: pieces of classification information that have been set in correspondence with various kinds of learning can be included.

If classification information regarding learning data is included in the learning data, it is possible to determine what learning the learning data is to be used for.

Attribute information regarding learning data: the creation date, the data name, size, file format, etc.

If attribute information regarding learning data is included in the learning data, it is possible to perform learning after checking the attribute of learning data to avoid the occurrence of an error.

Descriptive information regarding learning data: for example, a comment regarding image data, log information regarding a sensor, etc.

If descriptive information regarding learning data is included in the learning data, it is possible to use such information to learn teaching data for learning and to perform text-based learning.

Rights information regarding learning data: owner information, copyright information, etc.

If rights information regarding learning data is included in the learning data, it is possible to perform learning after checking matters related to rights, and thus it is possible to avoid piracy or the like.

Value information regarding learning data: trading value, information regarding the value level, information regarding expectants, and so on.

If value information regarding learning data is included in the learning data, it is possible to evaluate the learning data.

Information regarding the learning data generation device: for example, identification information regarding the learning data generation device, attribute information regarding the learning data generation device (a manufacturer name, a model name, a serial number, etc.), information regarding learning data generation method (a type, an attribute, etc.), information regarding performance of the learning data generation device (measurement accuracy, etc.), information regarding the settings for the learning data generation device (an action mode, etc.).

If information regarding the learning data generation device is included in the learning data, it is possible to check detailed information when the learning data generation device generates learning data, and to avoid the occurrence of an error.

Information regarding the control target: for example, identification information regarding the control target, attribute information regarding the control target (a manufacturer name, a model name, a serial number, etc.), information regarding performance of the control target (functions, ability levels, etc.), information regarding the settings for the control target (an action mode, etc.).

If information regarding the control target is included in learning data, it is possible to check the control target when performing learning, and avoid the occurrence of an error.

The kinds of data described above are merely examples, and do not limit the content of learning data.

Figure 5:
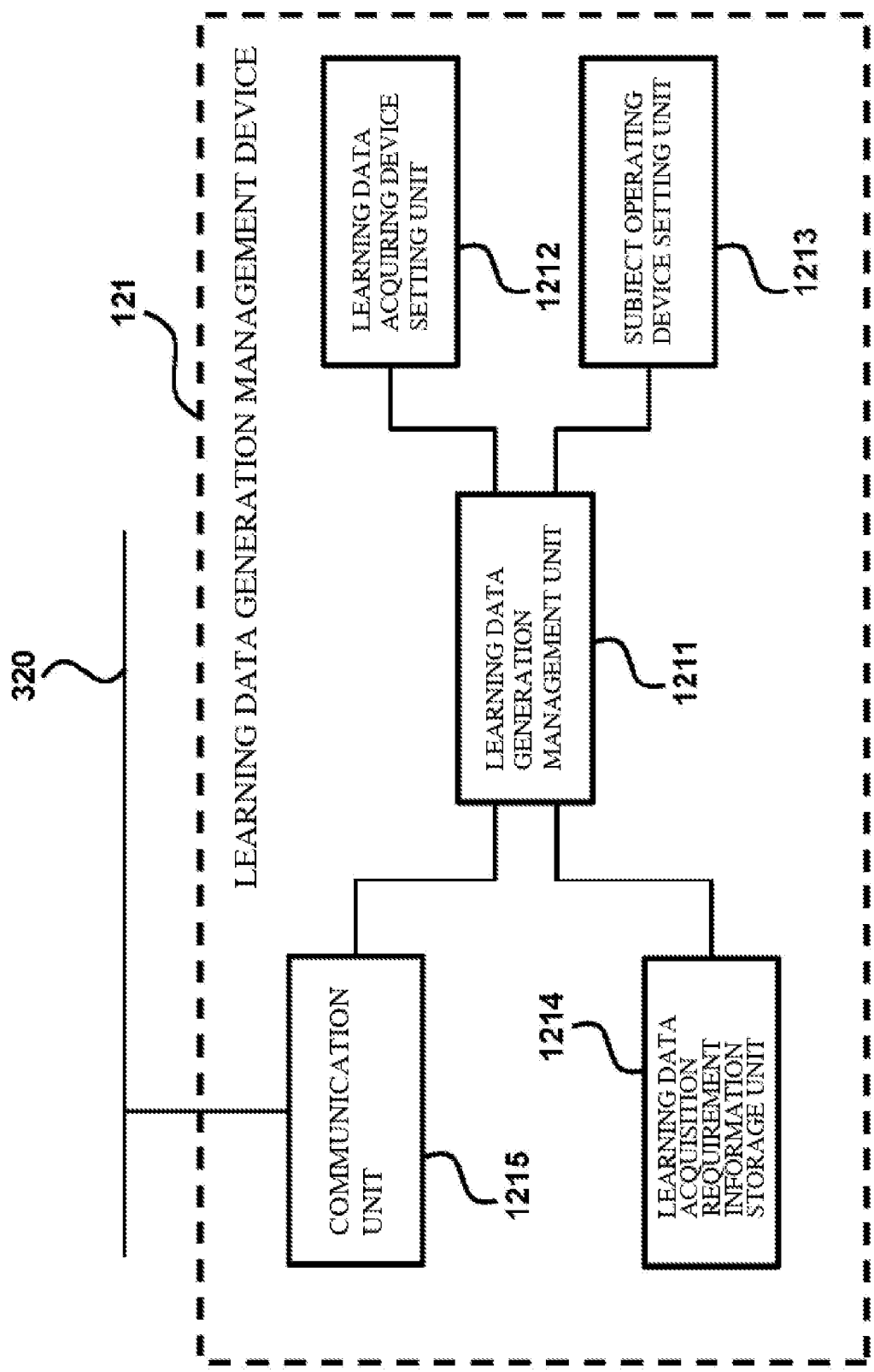
FIG. 5 is a block diagram illustrating functional modules of a learning data generation management device according to one or more embodiments.

FIG. 5 is a block diagram showing functional modules of the learning data generation management device 121 according to one or more embodiments. As shown in FIG. 5, the learning data generation management device 121 may include a learning data generation management unit 1211, a learning data acquiring device setting unit 1212, a subject operating device setting unit 1213, a learning data acquisition requirement information storage unit 1214, and a communication unit 1215. The learning data generation management unit 1211 performs centralized control regarding operation of the learning data acquiring device setting unit 1212, the subject operating device setting unit 1213, the learning data acquisition requirement information storage unit 1214, and the communication unit 1215. The learning data acquiring device setting unit 1212 performs operation setting regarding the learning data acquiring device 140. The subject operating device setting unit 1213 performs operation setting regarding the subject operating device 410. The learning data acquisition requirement information storage unit 1214 stores requirement information for generating learning data, which has been received. The communication unit 1215 communicates with external devices.

The following describes examples of the hardware structures of constituent elements, other than the learning data generation system 120, of the learning requesting system 100 according to one or more embodiments, and examples of functional modules of the constituent elements. The following thereafter describes an example of a hardware structure of the learning service providing system 200 according to one or more embodiments, and examples of functional modules of each constituent element.

First, a description is given of an example of a PC that realizes part of the hardware structures of the learning requesting system 100 and the learning service providing system 200 according to one or more embodiments.

Figure 6:
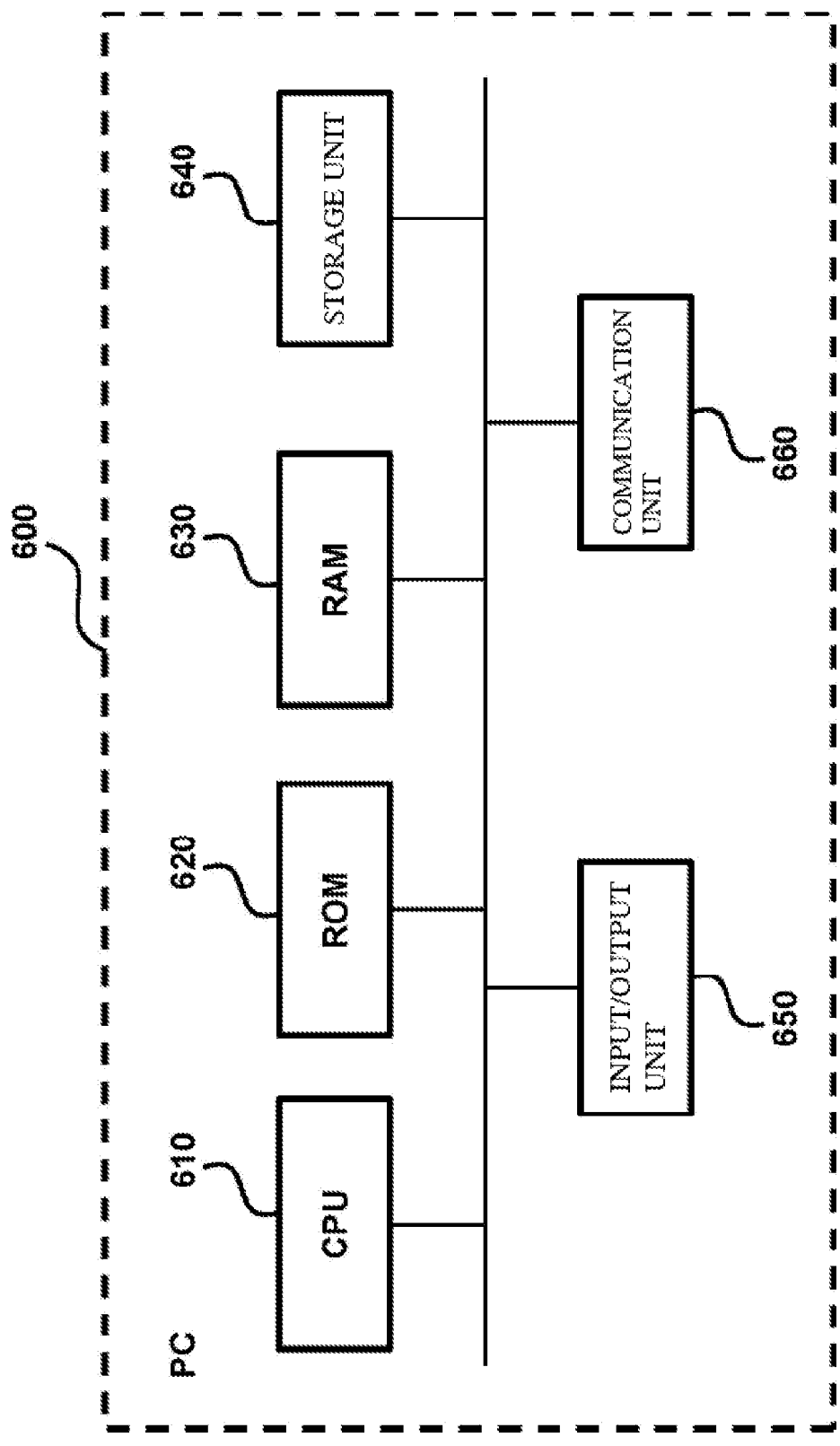
FIG. 6 is a diagram illustrating an example of a personal computer (PC) that realizes part of a hardware structure of a learning requesting system and a learning service providing system according to one or more embodiments.

FIG. 6 is a diagram showing an example of a personal computer (PC) 600 that realizes part of the hardware structures of the learning requesting system 100 and the learning service providing system 200 according to one or more embodiments. As shown in FIG. 6, the PC 600 may include a CPU 610 that performs centralized control, a read only memory (ROM) 620 that stores system software, a random access memory (RAM) 630 that stores data that has been written/read out, a storage unit 640 that stores various programs and data, an input/output unit 650 that is an input and output interface, and a communication unit 660 that realizes a communication function. Alternatively, the CPU 610 may be replaced with another processor such as a microprocessor (MCU) or a field programmable gate array (FPGA). The input/output unit 650 may include various interfaces such as an input/output interface (an I/O interface), a universal serial bus (USB) interface (which may be included as one of a plurality of ports of the I/O interface), and a network interface. It can be understood by a person skilled in the art that the configurations shown in FIG. 6 are merely conceptual, and do not limit the hardware structures of the learning requesting system 100 and the learning service providing system 200. For example, the PC 600 may include more or fewer constituent elements compared to those shown in FIG. 6, or include a constituent element that is different from those shown in FIG. 6.

A point to be noted is that the above-described CPU 610 may include one or more processors. In the present application, the one or more processors and/or another data processing circuit are usually referred to as "the processing circuits". At least one or all of the data processing circuits can be realized using software, hardware, firmware, or the like, or a combination thereof. The data processing circuits may be independent processing modules. Also, all or at least one of the data processing circuits may be combined with one of the other constituent elements of the PC 600.

The storage unit 640 can store software programs and modules of application software, and as with a program command/data storage device corresponding to the method for generating learning data, which will be described below in the present application, the CPU 610 realizes a method of generating the above-described learning data by executing the software programs and modules stored in the storage unit 640. The storage unit 640 may include a non-volatile memory, such as one or more magnetic storage devices, flash memories, or other non-volatile solid-state memories. In some examples, the storage unit 640 may also include a memory that is remote from the CPU 610, and such remote memory may be connected to the PC 600 via a network. Examples of the aforementioned network include, but are not limited to, the internet, an intranet, a local area network, a mobile communication network, and a combination thereof.

The communication unit 660 receives or transmits data via a network. Specific examples of the aforementioned network may include a wireless network that is provided by the telecommunication carrier of the PC 600. In one example, the communication unit 660 includes a network interface controller (NIC) that can communicate with the Internet by connecting to another network via a base station. Also, in one example, the communication unit 660 may be a radio frequency (RF) module that wirelessly communicates with the Internet.

Figure 7:
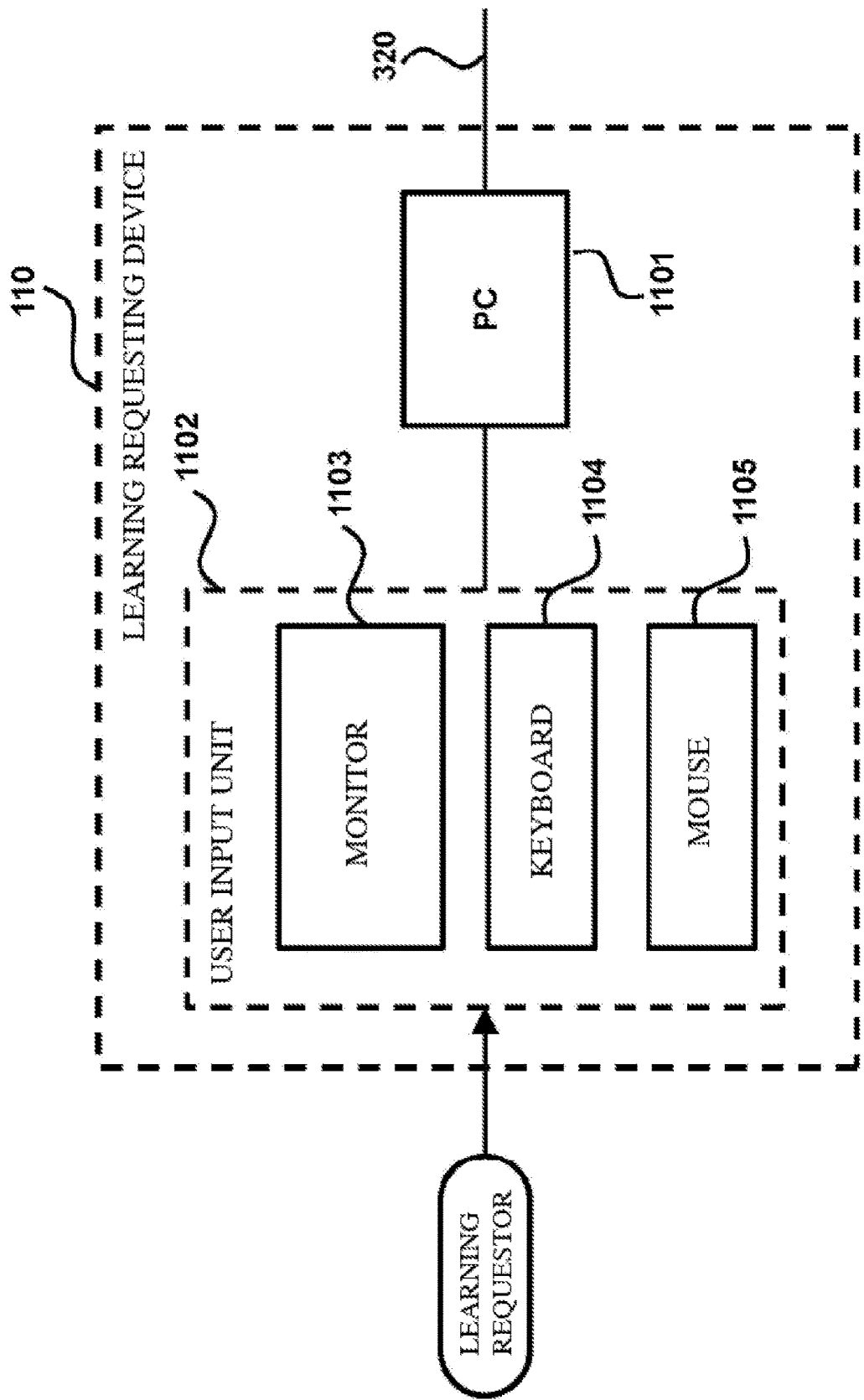
FIG. 7 is a diagram illustrating an example of a hardware structure of a learning requesting device according to one or more embodiments.

FIG. 7 is a diagram showing an example of a hardware structure of the learning requesting device 110 included in the learning requesting system 100 according to one or more embodiments. As shown in FIG. 7, the learning requesting device 110 may include a PC 1101 and a user input unit 1102. The PC 1101 may have constituent devices and configuration that are the same as the constituent devices and configuration of the PC 600, or have more or fewer constituent devices compared to the PC 600, or have a configuration different from the configuration of the PC 600. The user input unit 1102 may include a monitor 1104, a keyboard 1105, and a mouse 1106. Alternatively, or additionally, the user input unit 1102 may also include an input device such as a camera or a scanner.

The learning requesting device 110 serves as an interface between the learning requesting system 100 and a user, and as an interface between the learning requesting system 100 and the learning service providing system 200. In the learning requesting device 110 shown in FIG. 7, a user operates the user input unit 1102 to input, to the PC 1101, request information for making a request for learning. The PC 1101 processes the request information based on software programs stored therein to generate data in the format that can be interpreted by the learning request receiving device 210, and transmits the data to the learning request receiving device 210 via the Internet 310. Furthermore, the PC 1101 receives requirement information for generating learning data, from the learning request receiving device 210 via the Internet 310.

Figure 8:
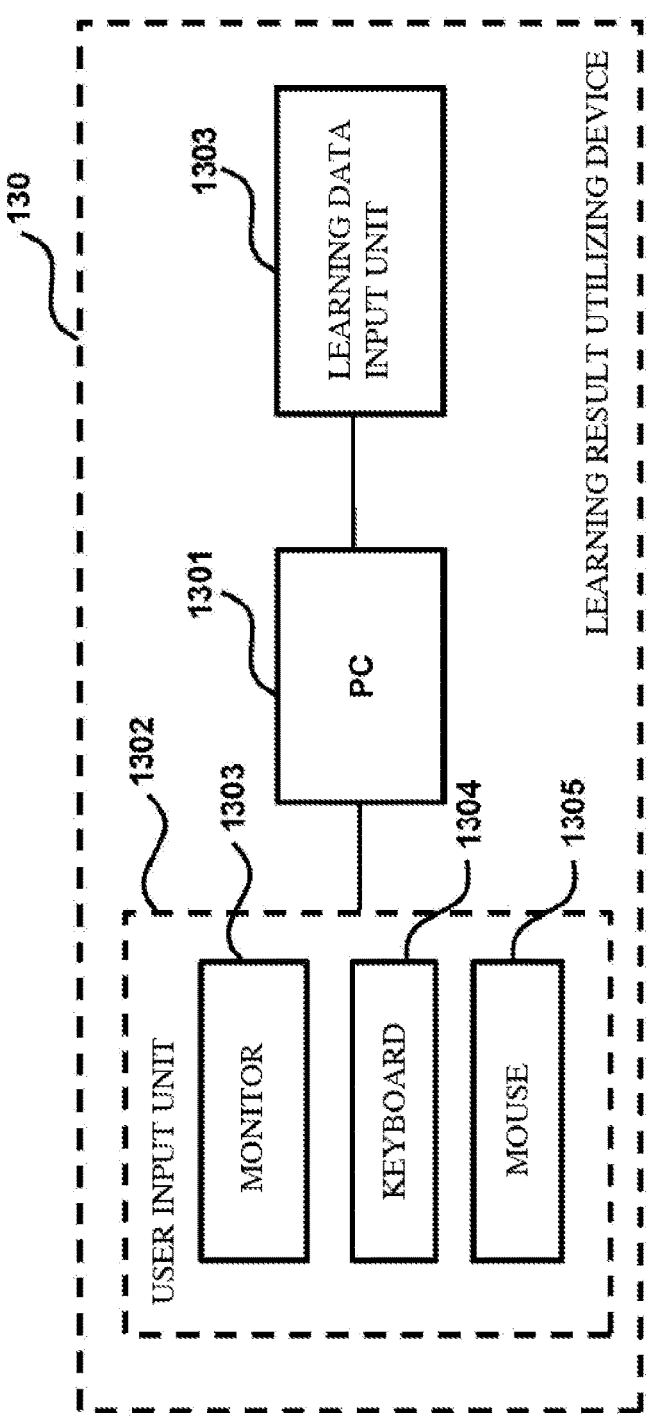
FIG. 8 is a diagram illustrating an example of a hardware structure of a learning result utilizing device according to one or more embodiments.
Figure 8:
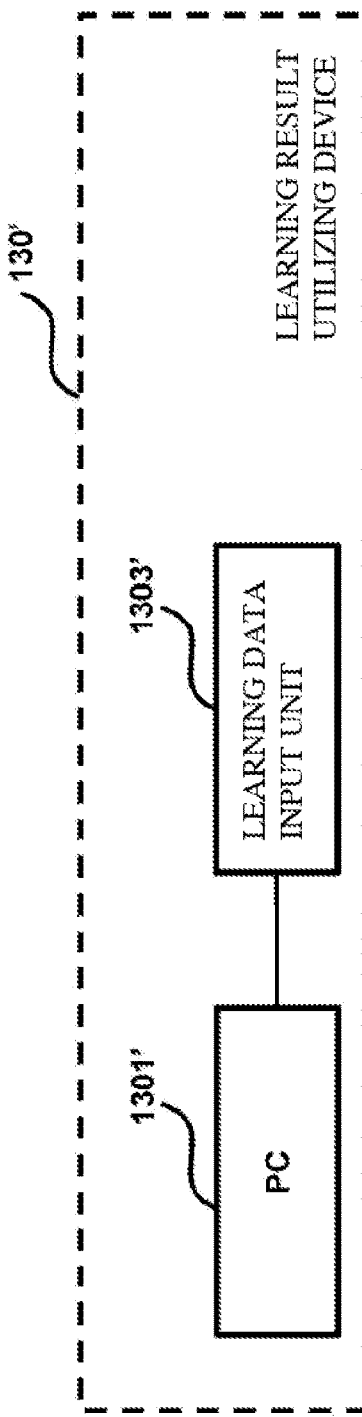

FIG. 8 is a diagram showing an example of a hardware structure of the learning result utilizing device according to one or more embodiments. As shown in (a) of FIG. 8, the learning result utilizing device 130 may include a PC 1301, a user input unit 1302, and a learning data input unit 1303. The PC 1301 may have constituent devices and configuration that are the same as the constituent devices and configuration of the PC 600, or have more or fewer constituent devices compared to the PC 600, or have a configuration different from the configuration of the PC 600. The user input unit 1302 may include a monitor 1304, a keyboard 1305 and/or a mouse 1306. Alternatively, or additionally, the user input unit 1302 may also include an input device such as a camera or a scanner.

The learning data input unit 1303 acquires subject information regarding the subject, which may be input data to a neural network. For example, the learning data input unit 1303 may be a device such as a camera, a sensor, a network terminal, a self-driving robot, or the like, or another input device that can input subject information may be provided. As shown in (a) of FIG. 8, the PC 1301 and the learning data input unit 1303 are two constituent elements that are independent of each other, and perform wired/wireless communication with each other. The PC 1301 may be a general-purpose PC. Alternatively, the PC 1301 and the learning data input unit 1303 may be integrated as a built-in device.

(b) of FIG. 8 shows another example of a hardware structure of the learning result utilizing device. In (b) of FIG. 8, unlike in (a) of FIG. 8, a learning result utilizing device 130' may include a PC 1301' and a learning data input unit 1303'. The PC 1301', which is a built-in PC, may have constituent devices and configuration that are the same as the constituent devices and configuration of the PC 600, or have more or fewer constituent devices compared to the PC 600, or have a configuration different from the configuration of the PC 600. The PC 1301' also includes an integrated monitor and input devices such as a keyboard, a mouse, and a camera or a scanner, for example. The learning data input unit 1303' may have the same functions and configuration as the learning data input unit 1303, or similar functions and configuration.

Similar to the learning result utilizing devices 130 and 130', the learning data acquiring device 140 also has the function of acquiring learning data for the subject. Therefore, the learning data acquiring device 140 may have the same hardware structure as the learning result utilizing device 130, or a similar hardware structure. That is, for example, the learning data acquiring device 140 may have a hardware structure as shown in (a) and (b) of FIG. 8.

Figure 9:
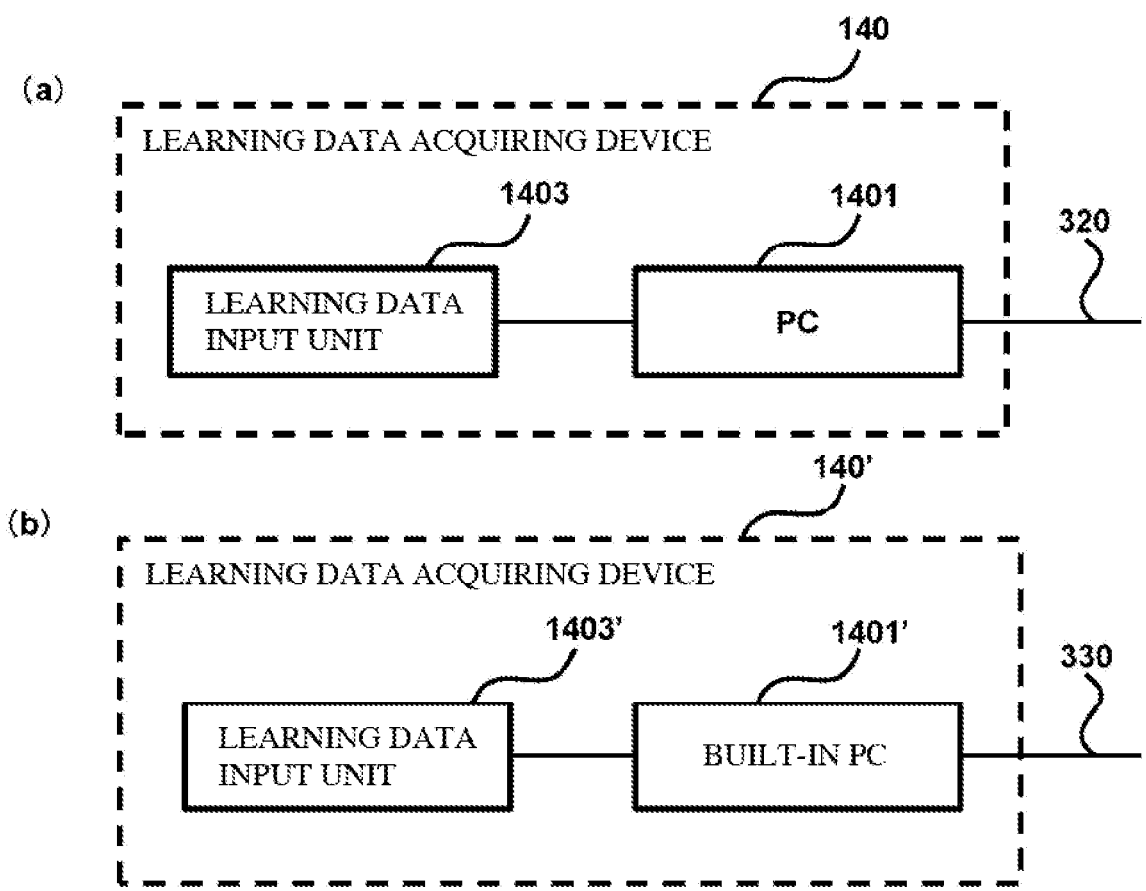
FIG. 9 is a diagram illustrating an example of a hardware structure of a learning data acquiring device according to one or more embodiments.

FIG. 9 is a diagram showing an example of a hardware structure of the learning data acquiring device according to one or more embodiments. As shown in (a) of FIG. 9, the learning data acquiring device 140 may include a PC 1401 and a learning data input unit 1403. The PC 1401 may have constituent devices and configuration that are the same as the constituent devices and configuration of the PC 600, or have more or fewer constituent devices compared to the PC 600, or have a configuration different from the configuration of the PC 600. The PC 1401 communicates with external devices via the local area network 320. The learning data input unit 1403 acquires subject information regarding the subject, which may be input data to a neural network. The learning data input unit 1403 may have the same functions and configuration as the learning data input unit 1303, or similar functions and configuration.

(b) of FIG. 9 shows another example of a hardware structure of the learning result utilizing device. In (b) of FIG. 9, unlike in (a) of FIG. 9, a learning data acquiring device 140' may include a PC 1401' and a learning data input unit 1403'. The PC 1401', which is a built-in PC, may have constituent devices and configuration that are the same as the constituent devices and configuration of the PC 600, or have more or fewer constituent devices compared to the PC 600, or have a configuration different from the configuration of the PC 600. The PC 1401' also includes an integrated monitor and input devices such as a keyboard, a mouse, and a camera or a scanner, for example. The learning data input unit 1403' may have the same functions and configuration as the learning data input unit 1403, or similar functions and configuration.

In (a) and (b) of FIG. 9, the PC 1401 and the PC 1401' each communicate with external devices via the local area network 320. However, the present invention is not limited in this way, and the PC 1401 and the PC 1401' may each communicate with external devices via the Internet, an intranet, a mobile communication network, or a combination thereof.

Figure 10:
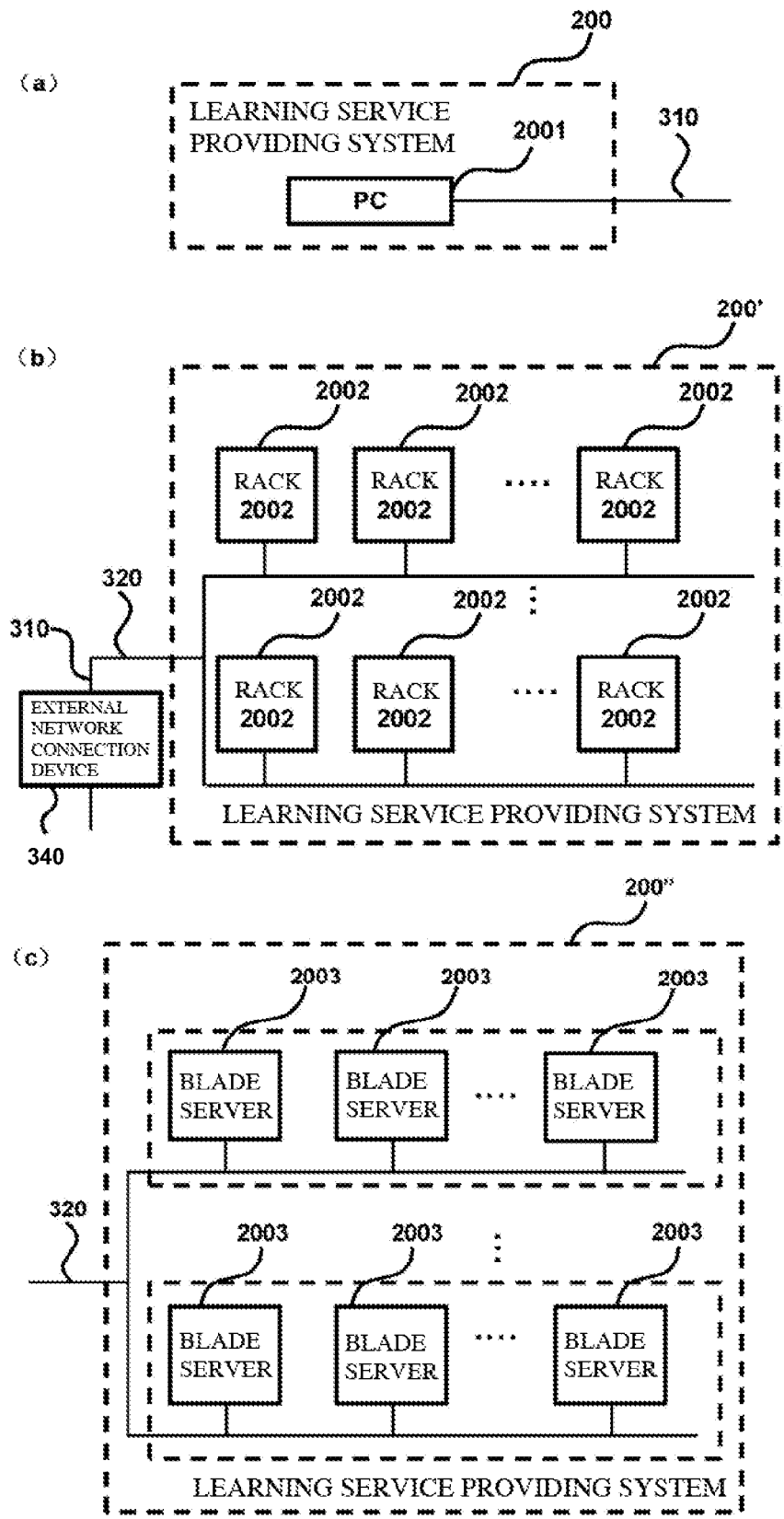
FIG. 10 is a diagram illustrating an example of a hardware structure of a learning service providing system according to one or more embodiments.

FIG. 10 is a diagram showing an example of a hardware structure of the learning service providing system according to one or more embodiments. (a) of FIG. 10 shows an example of a simple hardware structure of the learning service providing system. As shown in (a) of FIG. 10, the learning service providing system 200 may include a PC 2001. The PC 2001 may have constituent devices and configuration that are the same as the constituent devices and configuration of the PC 600, or have more or fewer constituent devices compared to the PC 600, or have a configuration different from the configuration of the PC 600. The PC 2001 communicate with external devices via the Internet 310.

(b) of FIG. 10 shows an example of a hardware structure of the learning service providing system, which is based on the hardware structure of a data center. As shown in (b) of FIG. 10, a learning service providing system 200' may include a plurality of server racks 2002. The plurality of server racks 2002 constitute a distributed server system, and realize the functions of the learning service providing system 200'. The software programs and data of the learning service providing system 200' can be distributed among a plurality of server racks 2002 instead of being provided in a single server rack 2002, and each server rack 2002 can communicate with external devices via the local area network 320. Also, each server rack 2002 may be connected to an external network connection device 340 to communicate with external devices via the Internet 310. An existing distributed server system that includes server racks may be used as a hardware structure for realizing the learning service providing system 200'. In deep learning, similar calculations are repeatedly performed through processing, and if the learning service providing system 200' is realized as a distributed server system, such calculations are performed by a plurality of server racks 2002 executing programs. Thus, it is possible to reduce processing time, and reduce the complexity of processing.

(c) of FIG. 10 shows an example of a hardware structure of the learning service providing system, which is based on the hardware structure of a data center. As shown in (c) of FIG. 10, the learning service providing system 200" may include a plurality of blade servers 2003. The plurality of blade servers 2003 constitute a distributed server system, and realize the functions of the learning service providing system 200". The software programs and data of the learning service providing system 200" can be distributed among a plurality of blade servers 2003 instead of being provided in a single blade server 2003, and the functions of each constituent element of the learning service providing system 200" can be realized by a different blade server 2003. At least one of the plurality of blade servers 2003 may act as one blade server unit (as indicated by a dashed box in the figure). The blade servers 2003 can communicate with each other via the local area network 320. Also, each blade server 2003 may be connected to the external network connection device 340 (not shown) to communicate with external devices via the Internet 310. An existing distributed server system that includes blade servers may be used as a hardware structure for realizing the learning service providing system 200". If this is the case, as in the example shown in (b) of FIG. 10, the learning service providing system 200" can also achieve the technical effect of reducing processing time and reduce the complexity of processing.

Figure 11:
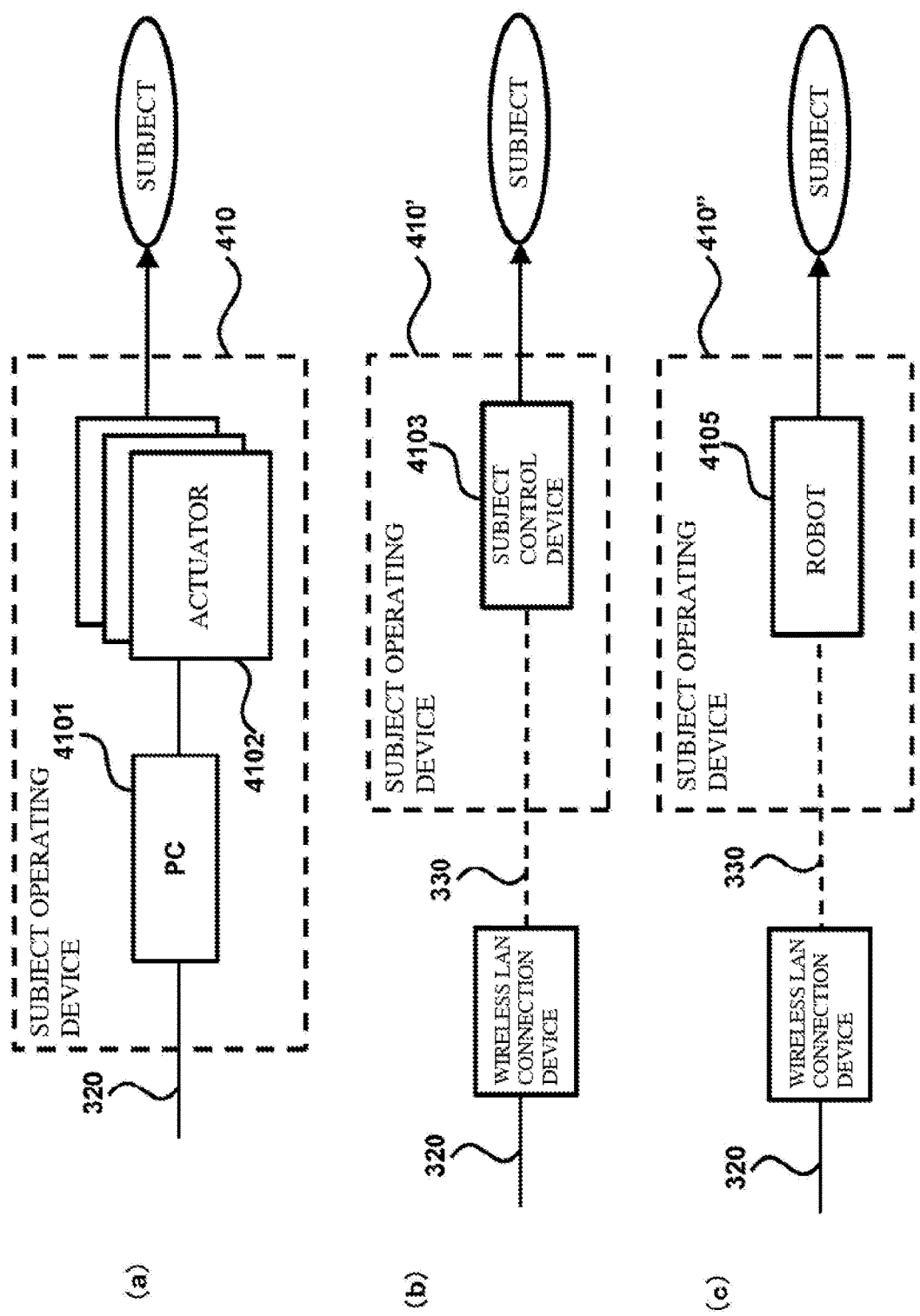
FIG. 11 is a diagram illustrating an example of a hardware structure of a subject operating device according to one or more embodiments.

FIG. 11 is a diagram showing an example of a hardware structure of a subject operating device 410 according to one or more embodiments. The subject operating device 410 may be a device that operates the subject to bring the subject into a certain state in order to generate learning data. The learning data generation system 120 can control the subject operating device 410 according to information regarding the type of the subject operating device 410, the control method, and so on.

(a) in FIG. 11 shows an example of a hardware structure of a subject operating device that is constituted by a PC. As shown in (a) of FIG. 11, the subject operating device 410 may include a PC 4101 and actuators 4102. The PC 4101 transmits an operation instruction to an actuator 4102 based on an instruction to operate the subject, which has been received from the subject operating unit 124 of the learning data generation system 120. The PC 4101 may have constituent devices and configuration that are the same as the constituent devices and configuration of the PC 600, or have more or fewer constituent devices compared to the PC 600, or have a configuration different from the configuration of the PC 600. The actuator 4102 operates the subject based on the operation instruction, to acquire a state of the subject corresponding thereto. The subject operating device 410 can communicate with external devices (such as the learning data generation system 120) via the local area network 320.

For example, in a case where good/bad confectionery products are to be discerned in a production line of a food processing plant, the subject operating device 410 can operate the orientation of one or more cameras using the actuators 4102 to provide a certain change in the orientations of platforms on which confectionery products that are to be captured by the cameras are placed. Thus, the subject operating device 410 can operate the one or more cameras and the platforms at predetermined points in time under the control of the PC 4101.

(b) in FIG. 11 shows another example of a hardware structure of a subject operating device. As shown in (b) of FIG. 11, a subject operating device 410' may include a subject control device 4103. The subject control device 4103 performs analysis/control on the subject. For example, control parameters, control data, control programs, and so on for controlling the subject control device 4103 may be included in advance in requirement information for generating learning data. Thus, the learning data generation system 120 can automatically change the state of the subject, using the subject control device 4103 based on the requirement information, to acquire learning data. The subject operating device 410' can communicate with external devices (such as the learning data generation system 120) via the wireless local area network 330. Optionally, the subject control device 4103 may be partially or entirely included in the learning data generation system 120.

For example, when making a decision in a game such as go or shogi, game rules and game programs may be included in requirement information for generating learning data. The subject control device 4103 can control changes on the go board or shogi board in each phase based on the requirement information.

(c) in FIG. 11 shows yet another example of a hardware structure of a subject operating device. As shown in (c) of FIG. 11, a subject operating device 410" may include a robot 4105. The robot 4105 performs, based on a control instruction received from the learning data generation system 120, operation corresponding thereto on the subject. For example, control parameters, control data, control programs, and so on for the robot 4105 may be included in advance in requirement information for generating learning data. Thus, the learning data generation system 120 can operate the subject using the robot 4105 based on the requirement information, to perform control to change the state of the subject. The subject operating device 410" can communicate with external devices (such as the learning data generation system 120) via the wireless local area network 330.

Operation/control performed by the subject operating devices 410, 410', and 410" on the subject is not limited to the above-described operation/control, and various operation/control may be performed according to the content of learning requested by a user. The following describes examples.

Arrange/combine subjects

For example, in a case of capture a panoramic image of confectionery productions, a plurality of cameras are arranged/combined. Alternatively, operation units of a plant are arranged/combined so as to realize predetermined orientations relative to the operation subjects that are to be operated.

Remove at least one of the subjects.

For example, only files of a particular type, of files that are the subjects of learning, are analyzed, and files of another type are removed.

Operate subject operating units.

For example, platforms on which confectionery products are placed are operated.

Physically operate subjects.

Change the orientations of subjects.

For example, an automobile is driven.

Electronically connect to subjects.

Control subjects by transmitting a signal.

Send data/Load programs/Execute programs.

Set prohibited actions.

Note that the above descriptions are merely illustrative, and are not intended to limit the functions and configuration of the subject operating device 410 according to one or more embodiments.

In (a), (b), and (c) of FIG. 11, the subject operating device 410 communicate with external devices via the local area network 320 or the wireless local network 330. However, the present invention is not limited to such examples, and the subject operating device 410 can transmit/receive information to/from external devices using various communication methods, e.g. via an intranet, a local area network, the Internet, a mobile communication network, or a combination thereof.

Note that at least one or all of the functions/at least part or all of the hardware structure of the subject operating device 410 may be included in the learning data generation system 120. A person skilled in the art can set constituent devices included in each system according to the needs.

The following describes examples of functional modules of constituent elements included in the learning requesting system 100 and the learning service providing system 200 according to one or more embodiments.

Figure 12:
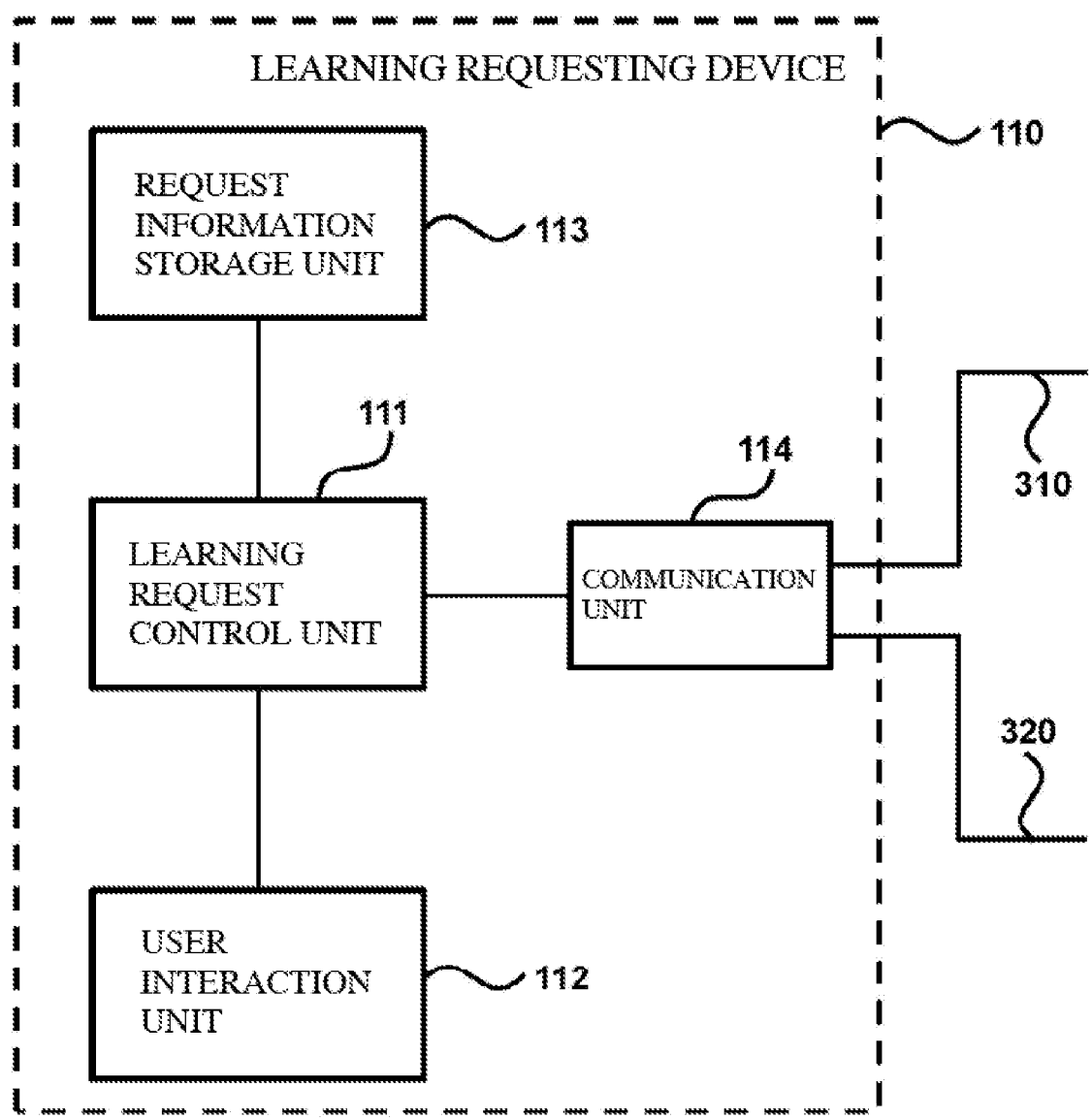
FIG. 12 is a block diagram illustrating functional modules of a learning requesting device according to one or more embodiments.

FIG. 12 is a block diagram showing the functional modules of the learning requesting device 110 according to one or more embodiments. When a user makes a request for learning, the user uses the learning requesting device 110 to request the learning service providing system 200 to perform learning. The learning requesting device 110 is connected to the learning service providing system 200 via a communication means such as the Internet 310 or the local area network 320, and can make a request for learning. As shown in FIG. 12, the learning requesting device 110 may include a learning request control unit 111, a user interaction unit 112, a request information storage unit 113, and a communication unit 114. The learning request control unit 111 performs centralized control regarding operation of the user interaction unit 112, the request information storage unit 113, and the communication unit 114. The user interaction unit 112, which is an interface between the learning requesting device 110 and the user, receives a learning request from the user, and provides the user with information corresponding thereto. The request information storage unit 113 stores request information for making a request for learning from the user, received by the user interaction unit 112. The communication unit 114 communicates with the learning request receiving device 210 via the Internet 310 or the local area network 320. FIG. 12 shows an example in which the learning requesting device 110 communicates with the learning request receiving device 210 via the Internet 310 or the local area network 320. However, as described above, the learning requesting device 110 may transmit/receive information to/from the learning request receiving device 210 using other various communication methods, e.g. via an intranet, a mobile communication network, or a combination thereof. Thus, the learning request receiving device 210 can interact with the user using the learning requesting device 110, to acquire learning request information such as the subject of learning and the purpose of learning.

Figure 13:
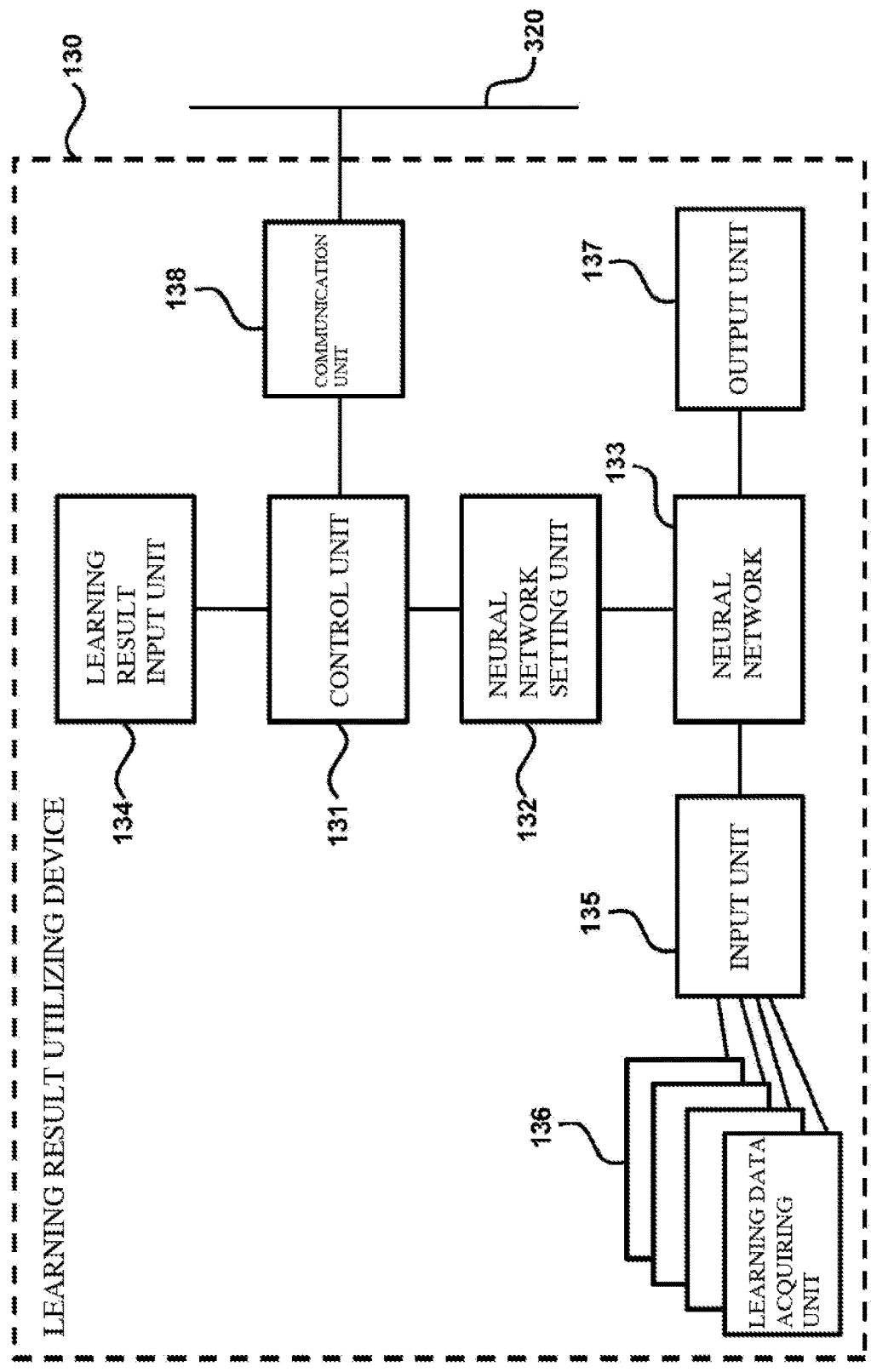
FIG. 13 is a block diagram illustrating functional modules of a learning result utilizing device according to one or more embodiments.

FIG. 13 is a block diagram showing the functional modules of the learning result utilizing device 130 according to one or more embodiments. As shown in FIG. 13, the learning result utilizing device 130 may include a control unit 131, a neural network setting unit 132, a neural network 133, a learning result input unit 134, a learning data input unit 135, a learning data acquiring unit 136, an output unit 137, and a communication unit 138. The control unit 131 performs centralized control regarding operation of each constituent element of the learning result utilizing device 130. The neural network setting unit 132 set parameters for the neural network based on an instruction from the control unit 131. The neural network 133 performs machine learning such as deep learning on learning data input by the learning data input unit 135. The learning result input unit 134 inputs learning results such that the learning result utilizing device 130 acquire an ability corresponding thereto. The learning data input unit 135 receives learning data from the learning data acquiring unit 136, and inputs the learning data to the neural network 133 in an appropriate format. The learning data acquiring unit 136 acquires, from the subject, learning data corresponding thereto. The output unit 137 outputs the results of analysis of deep learning performed by the neural network 133. The communication unit 138 realizes communication between the learning result utilizing device 130 and external devices.

Note that the learning result utilizing device 130 may include one or more learning data acquiring units 136. Different learning data acquiring units can acquire learning data regarding different subjects. The learning result utilizing device 130 can include the learning data acquiring units 136, and is thus provided with the function of acquiring learning data. Therefore, the learning data acquiring device 140 may be omitted. FIG. 13 shows that the communication unit 138 communicates with external devices via the local area network 320. However, optionally, the learning result utilizing device 130 may transmit/receive information using various communication methods, e.g. via the Internet, an intranet, a mobile communication network, or a combination thereof.

Figure 14:
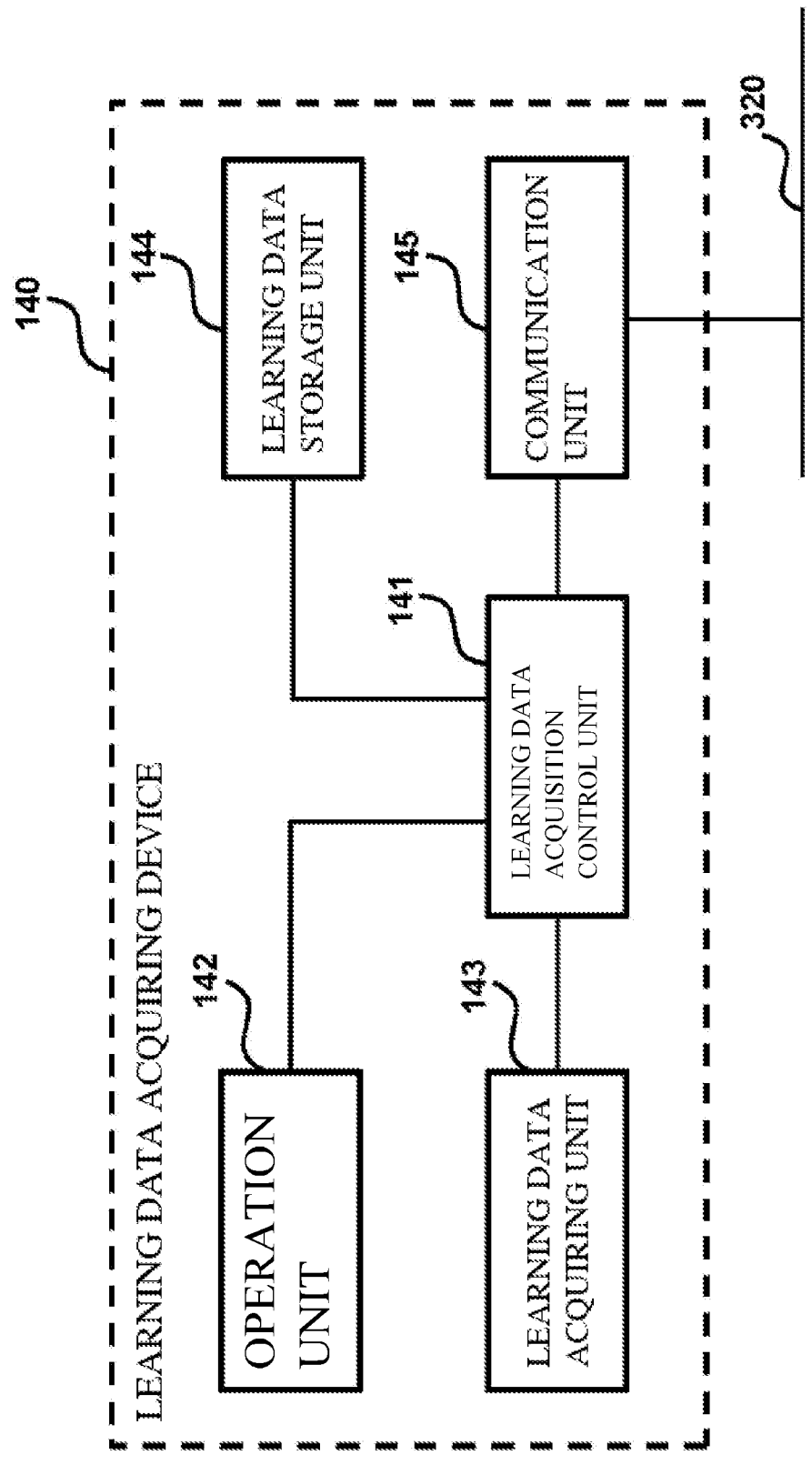
FIG. 14 is a block diagram illustrating functional modules of a learning data generation management device according to one or more embodiments.

FIG. 14 is a block diagram showing the functional modules of the learning data acquiring device 140 according to one or more embodiments. As shown in FIG. 14, the learning data acquiring device 140 may include a learning data acquisition control unit 141, an operation unit 142, a learning data acquiring unit 143, a learning data storage unit 144, and a communication unit 145. The learning data acquisition control unit 141 performs centralized control regarding operation of the operation unit 142, the learning data acquiring unit 143, the learning data storage unit 144, and the communication unit 145. The operation unit 142 transmits an instruction for operating the subject, in an appropriate data format, to the subject operating device 410 via the local area network 320. The learning data acquiring unit 143 acquires learning data from the learning subject.

The learning data storage unit 144 stores learning data acquired by the learning data acquiring unit 143. The communication unit 145 communicates with external devices via the local area network 320.

Figure 15:
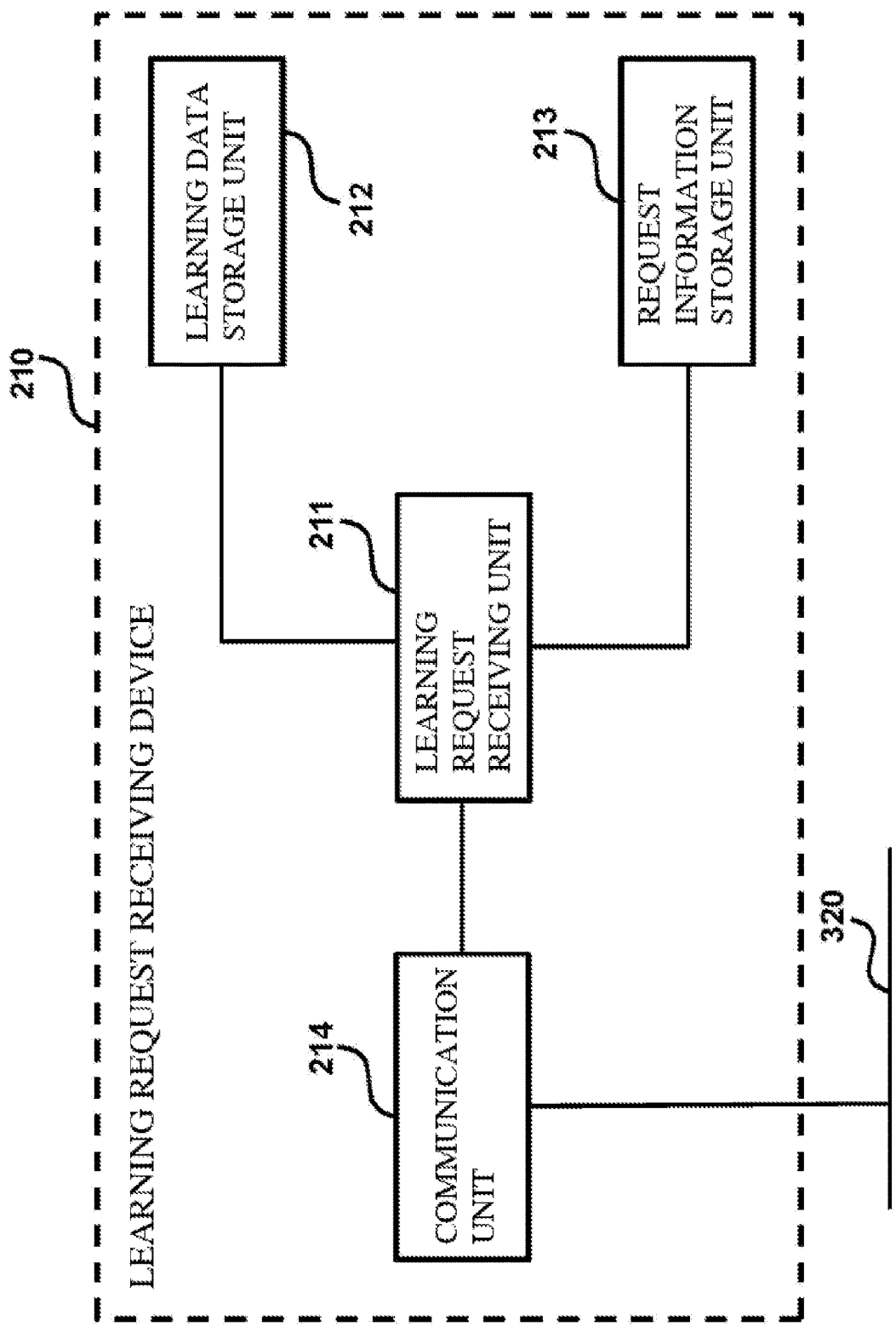
FIG. 15 is a block diagram illustrating functional modules of a learning request receiving device according to one or more embodiments.

FIG. 15 is a block diagram showing the functional modules of the learning request receiving device 210 according to one or more embodiments. The learning request receiving device 210 receives a learning request from the learning requesting device 110, and notifies the learning device 220 of the received learning request. As shown in FIG. 15, the learning request receiving device 210 may include a learning request receiving unit 211, a learning data storage unit 212, a request information storage unit 213, a communication unit 214. The learning request receiving unit 211 performs centralized control regarding operation of the learning data storage unit 212, the request information storage unit 213, and the communication unit 214. The learning data storage unit 212 stores learning data received from the learning requesting system 100. The request information storage unit 213 stores request information for making a request for learning, input by the user and received from the learning requesting system 100. The communication unit 214 realizes communication between the learning request receiving device 210 and external devices. FIG. 15 shows that the communication unit 214 communicates with external devices via the local area network 320. However, the present invention is not limited in this way, and the communication unit 214 may transmit/receive information using various communication methods, e.g. via an intranet, the Internet, a mobile communication network, or a combination thereof.

Figure 16:
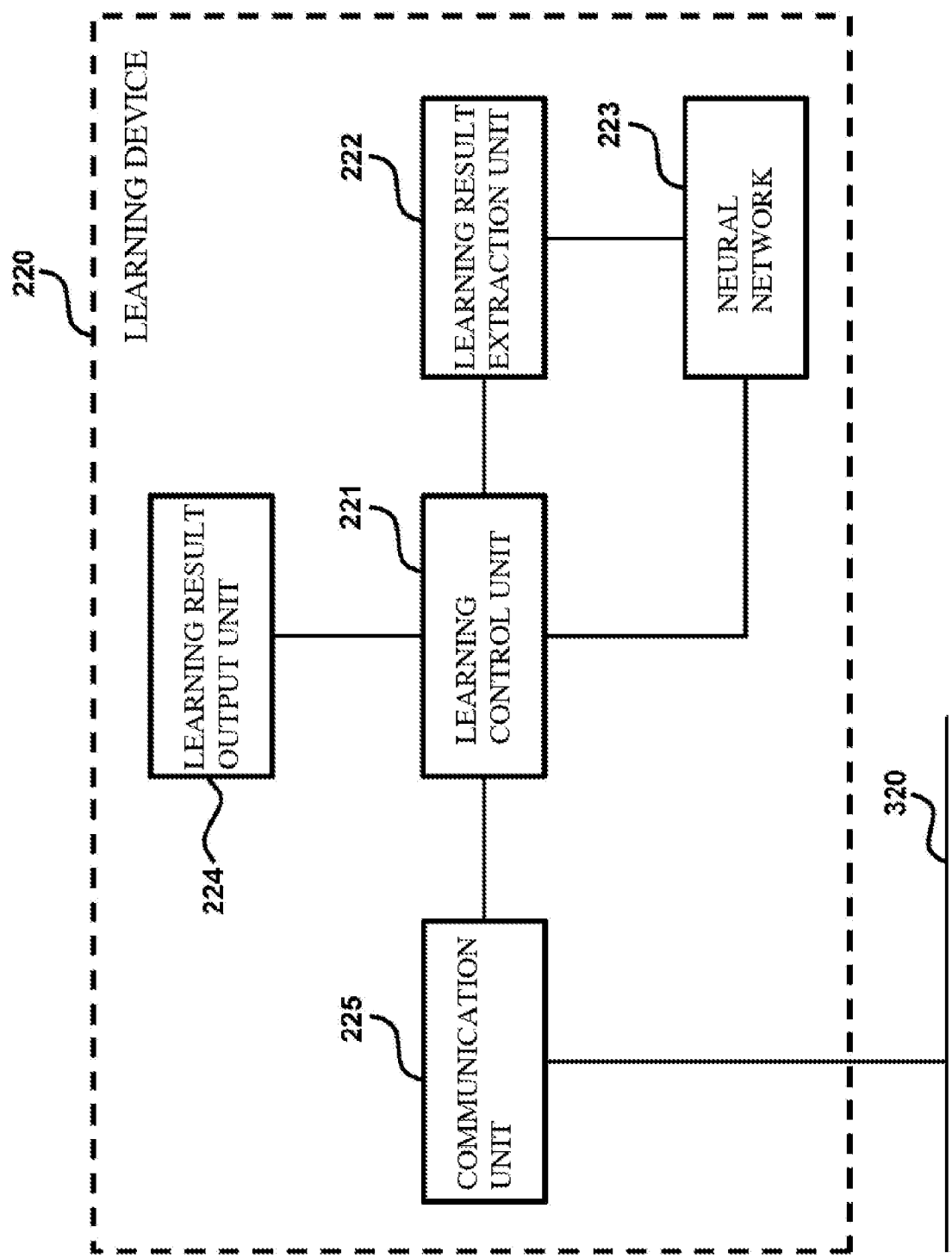
FIG. 16 is a block diagram illustrating functional modules of a learning device according to one or more embodiments.

FIG. 16 is a block diagram showing the functional modules of the learning device 220 according to one or more embodiments. As shown in FIG. 16, the learning device 220 may include a learning control unit 221, a learning result extraction unit 222, a neural network 223, a learning result output unit 224, and a communication unit 225. The learning control unit 221 performs centralized control regarding operation of the learning result extraction unit 222, the neural network 223, the learning result output unit 224, and the communication unit 225. The learning result extraction unit 222 extracts learning results from the neural network 223 based on an instruction from the learning control unit 221. The neural network 223 performs deep learning on learning data to acquire learning results. The learning result output unit 224 outputs the learning results to the outside of the learning device 220. The communication unit 225 realizes communication between the learning device 220 and external devices. FIG. 16 shows that the communication unit 225 communicates with external devices via the local area network 320. However, the present invention is not limited in this way, and the communication unit 225 may transmit/receive information using various communication methods, e.g. via the Internet, an intranet, a mobile communication network, or a combination thereof.

Figure 17:
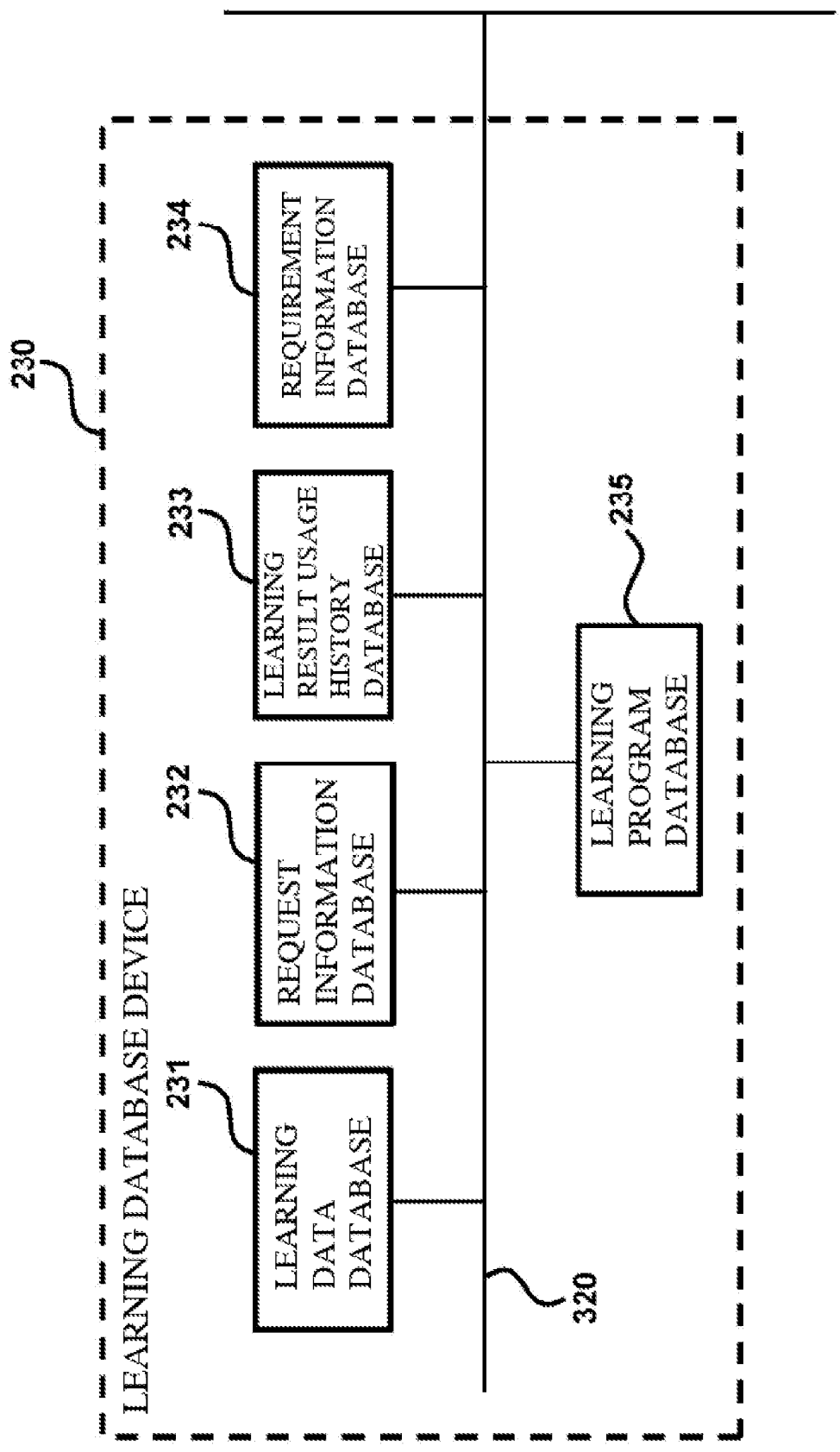
FIG. 17 is a block diagram illustrating functional modules of a learning database device according to one or more embodiments.

FIG. 17 is a block diagram showing the functional modules of the learning database device 230 according to one or more embodiments. The learning database device 230 stores various kinds of information that are required when learning is to be performed. As shown in FIG. 17, the learning database device 230 may include a learning data database 231, a request information database 232, a learning result usage history database 233, a requirement information database 234, and a learning program database 235. The learning data database 231 stores learning data for learning. For example, learning data may be stored in the learning data database 231 in association with requirement information for generating learning data, such as the subject of learning data, the details of learning data, the range of learning data, and the purpose of learning. The request information database 232 stores request information for making a request for learning, received from a user. For example, request information for making a request for learning may be stored in the request information database 232 in association with requirement information for generating learning data, such as information regarding a user (a learning requester), the subject of learning data, the details of learning data, the range of learning data, and the purpose of learning. The learning result usage history database 233 stores a usage log of learning results. The requirement information database 234 stores requirement information for generating learning data.

The learning program database 235 stores one or more learning programs for learning, and request information for making a request for learning corresponding to the one or more learning programs. For example, the learning programs may be stored in the learning program database 235 in association with request information such as the subject of learning, the content of learning data, and the goal of learning. Therefore, upon a user specifying request information for making a request for learning, a required learning program can be specified in response, using the learning program database 235, and thus the corresponding learning program can be executed. Furthermore, upon a required learning program being specified, requirement information for generating learning data corresponding to the learning program can be specified. Requirement information for generating learning data may include pieces of data that hierarchically describe requirements. Optionally, a user may specify a search condition for specifying learning that is to be performed, such as the subject of learning or the goal of learning, and thus search for requirement information for generating learning data corresponding to the learning data corresponding thereto, using the learning program database 235. Therefore, by storing learning programs and pieces of information in correspondence with each other using the learning program database 235, it is possible to efficiently perform selection of a learning method and management of a learning service, for each instance of learning.

With the learning database device 230 having the above-described configuration, it is possible to perform required analysis regarding learning results, and, for example, it is possible to compare classification abilities regarding different learning results. Thus, it is possible to determine an identity between the situations where learning results are used.

Note that the learning data database 231, the request information database 232, the learning result usage history database 233, the requirement information database 234, and the learning program database 235 described above may be realized using the same hardware element or different hardware elements. If some pieces of information are stored in association with each other, one or more databases may be omitted.

Figure 18:
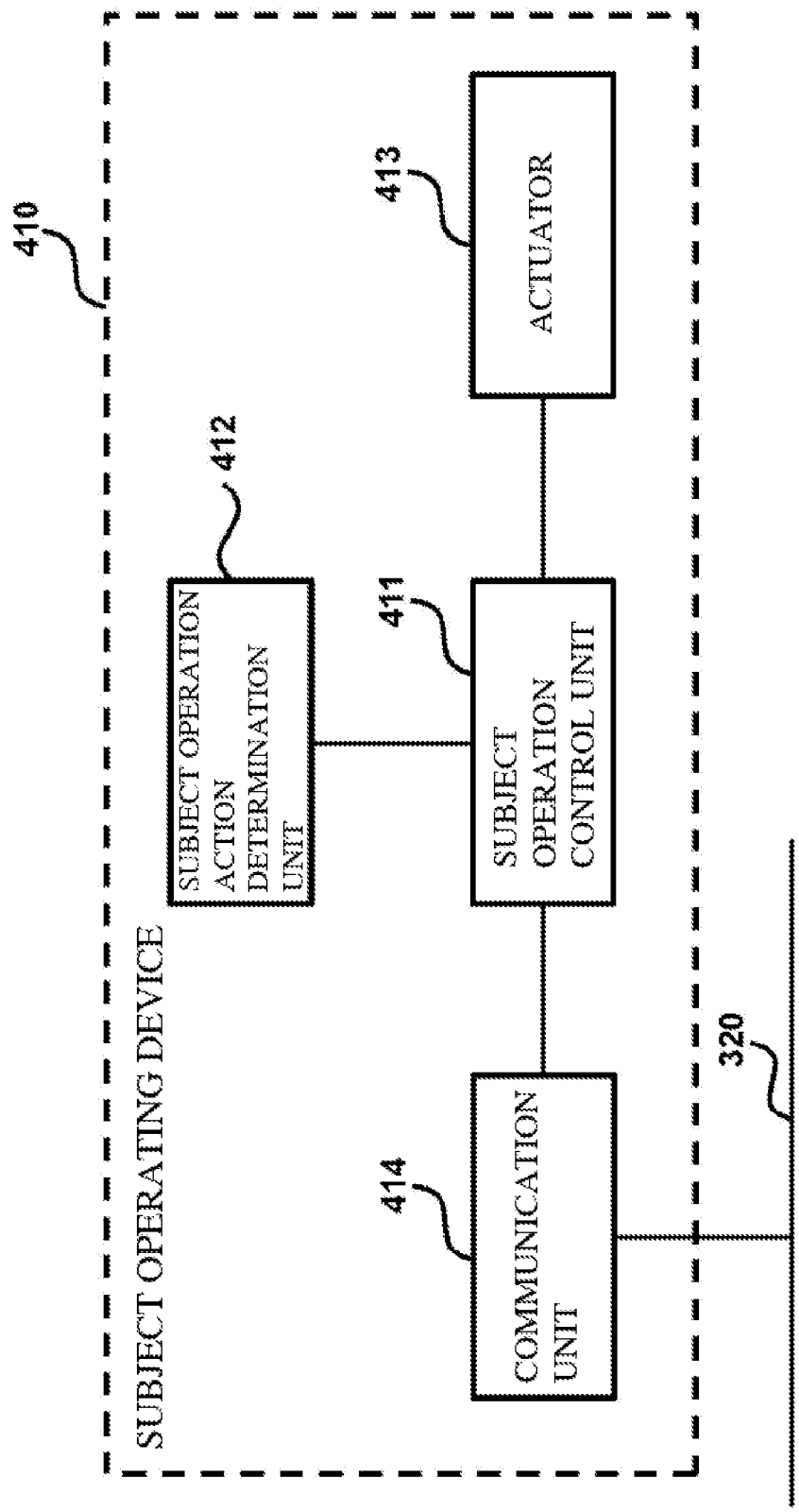
FIG. 18 is a block diagram illustrating functional modules of a subject operating device according to one or more embodiments.

FIG. 18 is a block diagram showing the functional modules of the subject operating device 410 according to one or more embodiments. As shown in FIG. 18, the subject operating device 410 may include a subject operation control unit 411, a subject operation action determination unit 412, an actuator 413, and a communication unit 414. The subject operation control unit 411 performs centralized control regarding operation of the subject operation action determination unit 412, the actuator 413, and the communication unit 414. The subject operation action determination unit 412 determines what is to operate the subject, based on an operation instruction from the learning data generation system 120 and action information regarding the actuator 413. The actuator 413 operates the subject. The communication unit 414 communicates with external devices via the local area network 320. However, optionally, the subject operating device 410 may transmit/receive information using other various communication methods, e.g. via the Internet, an intranet, a mobile communication network, or a combination thereof.

Note that the functional modules of the subject operating device 410 according to one or more embodiments shown in FIG. 18 are merely examples. The subject operating device 410 may include more or fewer functional modules compared to those in the example shown in FIG. 18.

Examples of the constituent elements of the learning requesting system 100, the constituent elements of the learning service providing system 200, and the hardware structure and functional modules of the subject operating device 410 are described above with reference to FIGS. 3 to 18. It should be understood by a person skilled in the art that the above descriptions are merely illustrative, and do not limit the hardware structures and functional modules of the systems/devices according to one or more embodiments. A person skilled in the art can modify/increase or reduce the hardware structure and functions of each system/device without departing from the scope of protection of the present invention.

The above descriptions illustrate an example in which different hardware structures are realized using the constituent elements of the learning requesting system 100 and the constituent elements of the learning service providing system 200. However, one or more elements of the constituent elements of the learning requesting system 100 and one or more elements of the constituent elements of the learning service providing system 200 may be realized using the same hardware structure. If one or more elements of the constituent elements of the learning requesting system 100 and one or more elements of the constituent elements of the learning service providing system 200 are realized using different hardware structures, the functions of such different hardware structures may be changed according to the needs. For example, at least one/all of the functions of the learning requesting system 100/the learning service providing system 200 may be realized using the learning result utilizing device 130.

Furthermore, one or more elements of the constituent elements of the learning requesting system 100 and one or more elements of the constituent elements of the learning service providing system 200 are not limited to being realized using the above-described method, and may be realized in the form of software modules that are executed on a PC, various built-in devices, cloud network service, or the like. It can be understood by a person skilled in the art that the learning requesting system 100 and the learning service providing system 200 can be realized using various method without departing from teachings according to one or more embodiments.

For example, the learning requesting system 100 and the learning service providing system 200 may be configured as an integrated single system. Any part of the integrated system may be configured as another system, device or part. Also, when utilizing one or more embodiments, a person skilled in the art may implement only part that is required. For example, it is possible to only implement the learning data generation system 120 by utilizing the format, configuration, prescriptions, and so on of requirement information for generating learning data.

For example, it is possible to provide a device for inspecting products on a production line of a factory, with a learning data generation function and a learning function. For example, a learning function that causes a heavy processing load may be realized on a cloud. If at least one of constituent elements or functions included in the learning service providing system 200 is realized using a cloud, other constituent elements or functions may be realized using any other device.

For example, the neural network 133 and the neural network 223 may be configured using electronic circuits. For example, they may be realized using an LSI or an FPGA. Also, one or more elements of the constituent elements of the learning requesting system 100 and one or more elements of the constituent elements of the learning service providing system 200 may be realized using objects. For example, when performing identification/processing/operation/data acquisition regarding the learning subject, it is possible to use an identification/processing/operation/data acquisition means that employs a biochemical method, such as a physical key or DNA testing, or that employs an optical method, such as a hologram.

The following describes a method according to one or more embodiments with reference to a combination of FIGS. 19 to 23. In the following description, steps with a prefix "S1" are steps of a method realized by the learning requesting system 100, and steps with a prefix "S2" are steps of a method realized by the learning service providing system 200.

Figure 19:
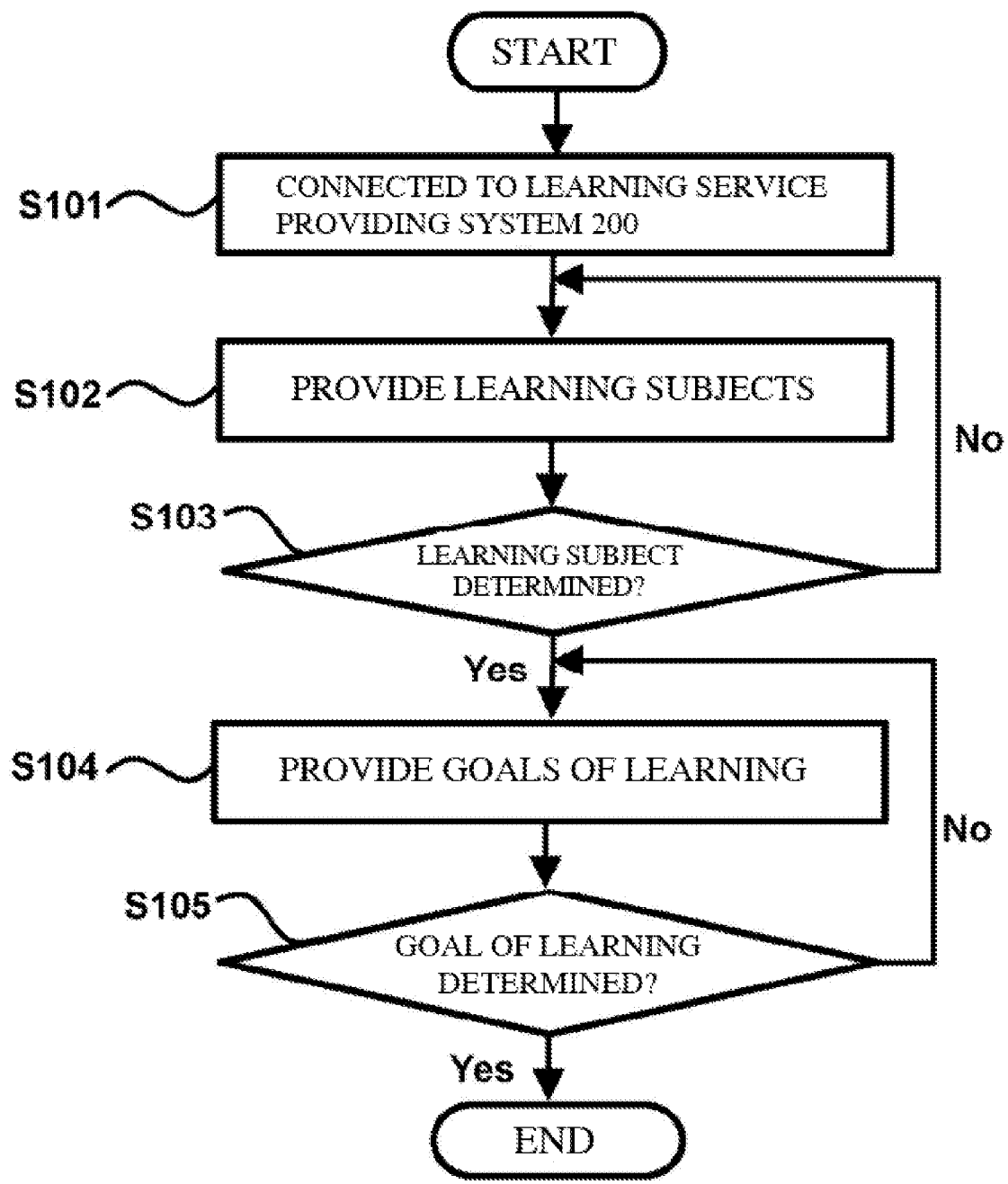
FIG. 19 is a flow diagram illustrating a method request information generation method, which is realized in a learning requesting system according to one or more embodiments.

FIG. 19 is a flowchart showing a request information transmission method, which is realized by the learning requesting system 100 according to one or more embodiments. As shown in FIG. 19, in step S101, the learning requesting system 100 connects to the learning service providing system 200, and the method proceeds to step S102. In step S102, the learning requesting device 110 of the learning requesting system 100 provides a selection screen regarding the learning subject to the user (the learning requester). Selectable items of the learning subject may be those received from the learning service providing system 200. The user can select a corresponding learning subject according to the selection screen thus provided. In step S103, the learning requesting system 100 determines whether or not the user has selected a learning subject. If the user has selected a learning subject, the method proceeds to step S104, and if the user has not selected a learning subject, the method returns to step S102 and waits until the user selects a learning subject. In step S104, the learning requesting device 110 of the learning requesting system 100 provides a selection screen regarding the goal of learning to the user. Selectable items of the goal of learning may be those received from the learning service providing system 200. The user can select a corresponding goal of learning according to the selection screen thus provided. In step S105, the learning requesting system 100 determines whether or not the user has selected a goal of learning. If the user has selected a goal of learning, the method proceeds to step S106, and if the user has not selected a goal of learning, the method returns to step S104 and waits until the user selects a goal of learning. In step S106, the learning requesting system 100 transmits the learning subject and the goal of learning selected by the user to the learning service providing system 200 as request information for making a request for learning, and the flowchart ends.

According to the method of outputting the request information, the user selects a learning subject and a goal of learning using the learning requesting device 110 of the learning requesting system 100, thereby inputting request information including information regarding the learning subject and information regarding the goal of learning, to the learning service providing system 200. Note that request information may include other information. For example, optionally, request information may include information regarding the user. If request information also includes information such as information regarding the user, the learning requesting device 110 of the learning requesting system 100 may provide a selection screen that is similar to the learning subject selection screen and the learning goal selection screen to the user so that the user can perform selection.

Figure 20:
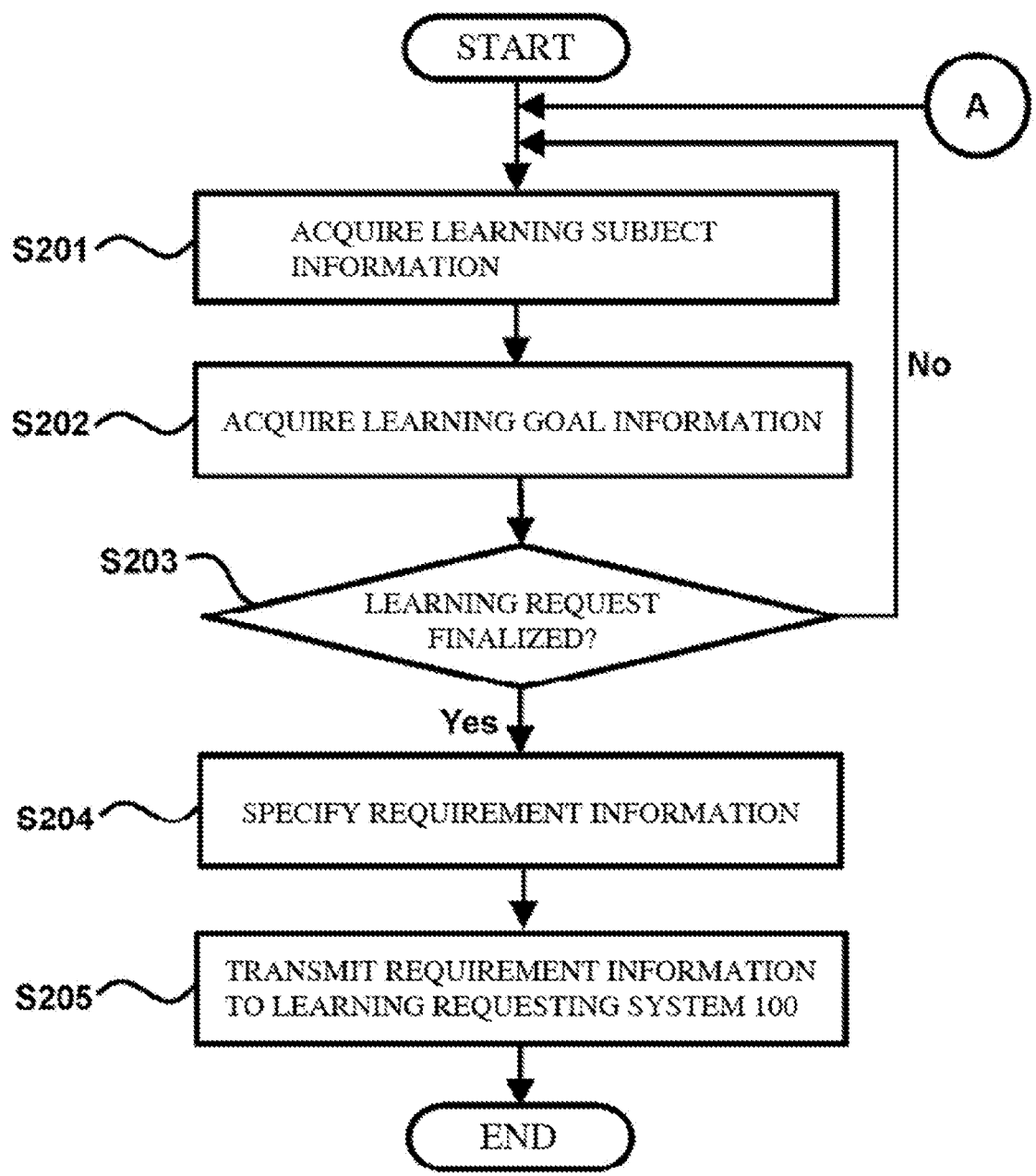
FIG. 20 is a flow diagram illustrating a processing method for generating learning data, which is realized in a learning service providing system according to one or more embodiments.
Figure 21:
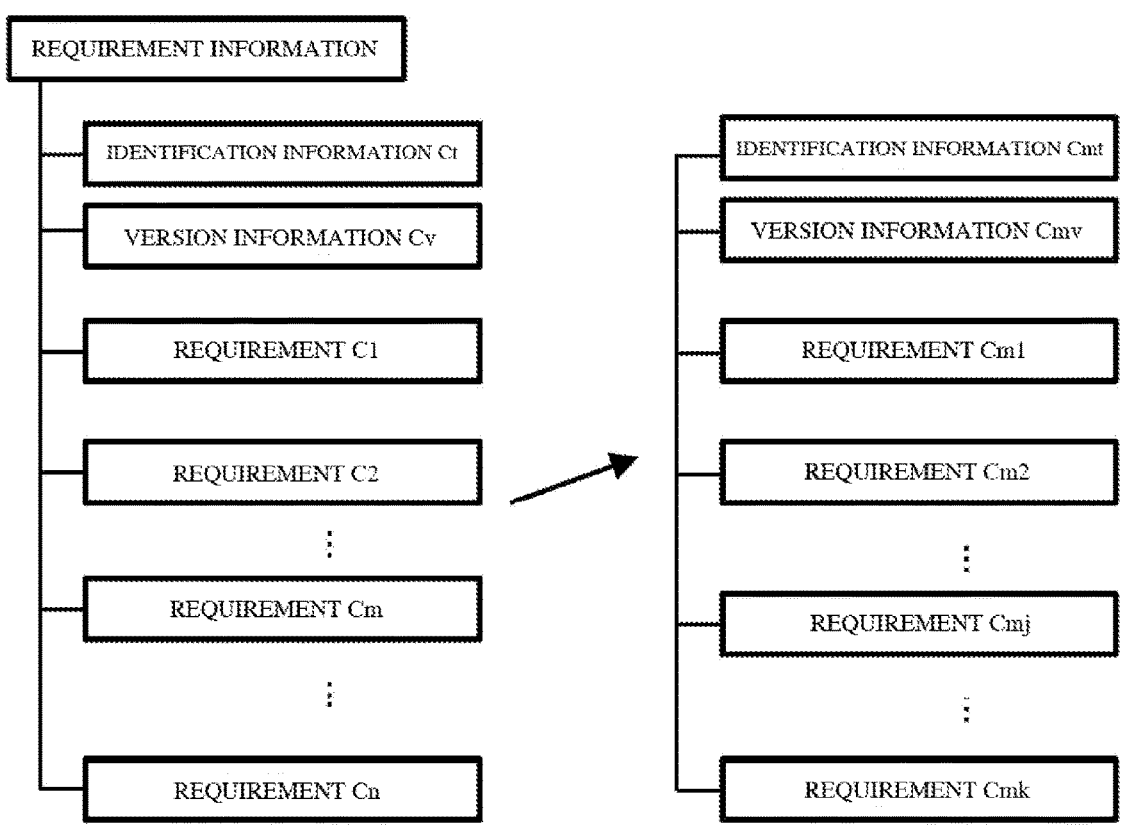
FIG. 21 is a diagram illustrating a logical configuration of requirement information for generating learning data according to one or more embodiments.

The following describes a processing method for generating learning data according to one or more embodiments with reference to the combination of FIGS. 20 and 21.

FIG. 20 is a flowchart showing a processing method for generating learning data, which is realized in the learning service providing system 200 according to one or more embodiments. In the processing method for generating learning data, the learning service providing system 200 specifies requirement information for generating learning data, based on request information for making a request for learning, received from the learning requesting system 100, and transmits the requirement information to the learning data generation system 120 of the learning requesting system 100.

As shown in FIG. 20, in step S201, the learning request receiving device 210 of the learning service providing system 200 provides selectable learning subjects to the learning requesting device 110 of the learning requesting system 100, and accordingly the learning requesting device 110 provides a screen for selecting a learning subject, to the user interacting with the learning requesting device 110. The learning request receiving device 210 receives information regarding the learning subject selected by the user, and the method proceeds to step S202. In step S202, the learning request receiving device 210 of the learning service providing system 200 provides selectable goals of learning to the learning requesting device 110 of the learning requesting system 100, and accordingly the learning requesting device 110 provides a screen for selecting a goal of learning, to the user interacting with the learning requesting device 110. The learning request receiving device 210 receives information regarding the goal of learning selected by the user, and the method proceeds to step S203.

In step S203, the learning request receiving device 210 determines whether or not the user has finalized the learning request. If the user has not finalized the learning request, the method returns to step S201, and waits until the user selects a learning subject. If the user has finalized the learning request, the method proceeds to step S204. In step S204, the learning service providing system 200 searches the learning database device 230 for requirement information for generating learning data corresponding to the determined learning subject and goal of learning, and the method proceeds to step S205. In step S205, the learning service providing system 200 transmits the requirement information to the learning requesting system 100. The processing method for generating learning data, realized using the learning service providing system 200 according to one or more embodiments, ends.

In step S204 shown in FIG. 20, the learning service providing system 200 searches the learning database device 230 based the request information, for requirement information for generating learning data corresponding thereto. However, the present invention is not limited in this way. For example, the learning service providing system 200 may beforehand store a program for generating requirement information, and after receiving request information, the learning service providing system 200 may generate requirement information corresponding thereto, using the program.

It is possible to automate the generation of requirement information by preparing database of requirement information corresponding to pieces of request information, or preparing a program for generating requirement information based on request information. As a result, the user need not know the details of operation for generating learning data, which reduces a load on the user.

Optionally, after specifying requirement information for generating learning data, the learning service providing system 200 may store a correspondence relationship between: information regarding the learning subject and the goal of learning; and requirement information, using the requirement information database 234. By storing the correspondence relationship in the database, it is possible to simplify computational operation when requirement information is searched for or generated next time.

It is possible to apply the correspondence relationship to a similar request that is made by the user later. As a result, it is possible to reduce computation load on the CPU, and reduce computation time.

Furthermore, in the above-described processing method for generating learning data, it is possible to automate/semi-automate the generation of learning data by using requirement information. Thus, it is possible to avoid a situation where AI learning does not end due to the lack of learning data and the CPU wastefully continues running Therefore, it is possible to reduce a load on the CPU and save system resources. Also, it is possible to avoid a situation in which additional learning is performed due to the lack of learning. Therefore, it is possible to reduce a communication load between a client and a server, for example, and processing load on the server, for example, and thus it is possible to save server resources and processing time.

Optionally, the learning service providing system 200 may provide the user with more selectable items in addition to learning subjects and goals of learning. For example, the learning service providing system 200 may be provided in advance with one or more programs/methods/databases for creating learning data required for predetermined learning. The user selects a required program/method/database, or, as described above, a required program/method/database can be automatically determined based on information regarding the learning subject and the goal of learning that have been selected by the user. If a program/method/database for creating required learning data is determined, information regarding required learning data can also be determined.

The goal of learning described above is the ability to process/analyze the learning subject that the user expects the learning requesting system 100 to acquire. Examples of the abilities to process the learning subject, which the user wishes to acquire, include the following abilities.

The ability to perform classification. It is possible to acquire the ability to classify the subjects of analysis using deep learning (or another AI technology may be employed) based on input data or an input signal. The ability to perform classification can be utilized to, for example, discern good and bad products, determine a rating, classify the subjects of analysis into groups, determine the state of the subjects of analysis, detects subjects that have the same characteristic, to perform hierarchical classification of the subjects of analysis, and so on.

The ability to perform prediction. The ability to perform prediction can be utilized to, for example, predict a failure, predict a signal, predict the state of a subject, predict a stock price, currency exchange, a credit price, and so on.

The ability to make a decision. The ability to make a decision can be utilized to, for example, make a decision in a game such as go or shogi, make an organizational decision, or make a decision in transactions, and so on.

The ability to operate the subject. The ability to operate the subject can be utilized to, for example, play an action game, control a plant, control a production line, control a robot, and so on.

Note that the above examples are merely illustrative, and do not limit the abilities to process the learning subject described in the present application, which the user wishes to acquire.

It is necessary to perform learning using different learning data and acquire a different learning result (ability) according to the ability (the goal of learning) that the user wishes to acquire. In the processing method for generating learning data shown in FIG. 20, requirement information for generating learning data is specified based on request information, the requirement information is provided to the learning data generation system 120, and learning data is generated. Thus, it is possible to acquire an expected ability.

For example, if a certain type of ability is to be acquired, it is possible to generate learning data based on corresponding requirement information, based on the type and the level of the ability specified in request information, by specifying information regarding the type, number, etc. of pieces of learning data, which is included in the requirement information.

Even if the same type of ability is to be acquired, the type, number, etc. of pieces of learning data that are required vary depending on the expected level of the ability. As a result of information regarding the type, number, etc. of pieces of learning data being included in requirement information, the user need not know what kind of data is required and how much data is required in order to achieve the desired goal of learning. Thus, it is possible to simplify user operation.

In another example, if an ability is to be acquired regarding a different learning subject, it is possible to generate learning data based on corresponding requirement information by specifying, based on a learning subject specified in request information, a requirement included in requirement information and corresponding to the learning subject, and, for example, by specifying and at least one of: the type of the learning subject; the state of the learning subject; state control information regarding the learning subject; and state control program information regarding the learning subject.

If the learning subject changes, it is necessary to acquire learning data regarding the different learning subject. As a result of information regarding learning subjects being included in requirement information, the user need not know various information regarding learning subjects, and can acquire desired learning data by simply specifying the learning subject. Thus, it is possible to simplify user operation.

In yet another example, if an ability is to be acquired regarding a learning subject that has a plurality of states, it is possible to specify, based on the learning subject specified in request information, requirements corresponding to the states of the learning subject, included in requirement information, or specify a requirement corresponding to a state conversion regarding the learning subject. For example, learning data is generated based on corresponding requirement information by specifying at least one of state information regarding the learning subject, state conversion information regarding the learning subject (e.g. state control information regarding the learning subject and state control program information regarding the learning subject), and so on.

If a learning subject has a plurality of states, it is required that learning data for each state of the learning subject is acquired. As a result of information regarding the states/state conversion of learning subjects being included in requirement information, the user can acquire desired learning data without knowing various information regarding the learning subjects. Thus, it is possible to simplify user operation.

The following describes a logical configuration of requirement information for generating learning data according to one or more embodiments in combination with FIG. 21. FIG. 21 is a diagram showing a logical configuration of requirement information for generating learning data according to one or more embodiments. As shown in FIG. 21, requirement information for generating learning data described above may include identification information Ct, version information Cv, and requirements C1 to Cn, where n is a natural number. Identification information Ct is information for identifying requirement information. Version information Cv is information for recording the version of requirement information. Also, requirement information may include other information such as log information. A requirement Cm ($1 \leq m \leq n$) of the requirements C1 to Cn may include identification information Cmt, version information Cmv, and requirements Cm1 to Cmk, where k is a natural number. That is, requirement information may have a logical configuration with a hierarchical nest. Optionally, a requirement Cmj ($1 \leq j \leq k$) of the requirements Cm1 to Cmk may further include one or more lower-level requirements. With such a logical configuration with a hierarchical nest, it is possible to handle a complex configuration of requirement information. Optionally, any requirement included in requirement information (e.g. Cm2) may be a text, data, an identifier, a program, or a combination thereof.

The following describes examples of the content of each of the requirements C1 to Cn included in requirement information.

Requirement C1: Information regarding input data
  Requirement C11: The type of input data (e.g. data obtained from a sensor, a control parameter for a camera, etc.)
  Requirement C12: An input data acquisition method (e.g. a program for acquiring input data, e.g. database search, manual input, etc.)

Input data is data that is to be input to the learning data generation system 120 in order to generate learning data. For example, in a case where good/bad confectionery products are to be discerned in a production line of a food processing plant, it is possible to automate data input by including control parameters regarding a camera, configuration parameters, a control program, and so on in requirement information for generating learning data.

Requirement C2: Information regarding output data
  Requirement C21: the type of output data (e.g. a control instruction, an operation instruction, notification information, etc. for a camera)

Output data is data that is to be output from the learning data generation system 120 in order to generate learning data. For example, in a case where good/bad confectionery products are to be discerned in a production line of a food processing plant, a control instruction, it is possible to enable the subject operating device 410 to operate a camera to capture an image, by outputting thereto an operation instruction, notification information, and so on for controlling the subject operating device 410, and it is possible to input a captured image for learning as learning data.

Requirement C3: Information regarding a subject operating device
  Requirement C31: The type of a subject operating device
  Requirement C32: The hardware configuration of a subject operating device
  Requirement C33: Control data for a subject operating device
  Requirement C34: A subject operating device control method (e.g. a control program, control program information, etc.)

If information regarding the subject operating device 410 is included in requirement information, the learning data generation system 120 can control the subject operating device 410 according to information regarding the type and the control method of the subject operating device 410. For example, as a result of control data and a control program for a robot being included in requirement information, it is possible to change the state of the learning subject by operating the subject using the robot.

As a result of various kinds of information regarding the operation subject being included in requirement information, it is possible to automatically control the operation subject, without performing a manual operation. Thus, it is possible to avoid the occurrence of an error and improve the efficiency of operation.

Requirement C4: Information regarding a subject control device
  Requirement C41: The type of a subject control device
  Requirement C42: A subject operating device control method (e.g. a control program, control program information, etc.)

As a result of control data and a control program for controlling the subject control device 4103 being included in requirement information, it is possible to enable the learning data generation system 120 to acquire learning data by automatically changing the state of the learning subject using the subject control device 4103.

Requirement C5: Information regarding learning data
  Requirement C51: The details (e.g. the type, the number, etc.) of pieces of learning data
  Requirement C52: Information regarding teaching data
  Requirement C53: A learning data acquisition method (e.g. a program for acquiring learning data)
  Requirement C54: A learning data pre-processing method (e.g. a pre-processing program for learning data)
  Requirement C55: The range of the subjects of learning data
    Requirement C551: Learning subject information
      Requirement C5511: Population information
      Requirement C5512: Information regarding the range of subjects
    Requirement C552: Learning subject set information
    Requirement C553: An acquisition period
    Requirement C554: A data acquisition method employed at learning
    Requirement C555: The details of learning data and test data Requirement C56: Learning data format information (e.g. output format information, information regarding a program for converting the format of learning data, etc.)

Requirement C57: Learning data identification information

As a result of various kinds of information regarding learning data being included in requirement information, it is possible to automatically acquire learning data desired by the user, and thus it is possible to automate the generation of learning data.

In order to generate learning data, it is required that the type, number, and acquisition method of pieces of learning data have been determined in advance. As a result of the requirement C5 regarding learning data information being included in requirement information, it is possible to enable the learning data generation system 120 to generate certain learning data. As described above, it is possible to classify pieces of information regarding learning data into hierarchical groups to perform determination.

Also, as a result of the requirement C56 regarding learning data format information being included in requirement information, it is possible to enable the learning data generation system 120 to automatically read learning data. In one example, the format of learning data may be described with a hierarchical data structure for each requirement, using JSON or XML, for example. Optionally, information regarding a program for converting the format of learning data may be included in requirement information. As a result, when providing the learning device 220 with learning data, it is possible to automatically convert learning data to data in a data format that the learning device 220 can read, using a program corresponding thereto. Thus, it is possible to simplify user operation, and reduce processing time. Also, it is possible to enable the user to easily perform setting, and avoid a human error.

Furthermore, as a result of the requirement C57 regarding learning data identification information being included in requirement information, it is possible to add identification information to learning data, which makes it unnecessary to manage the details of learning data as shown in the requirement C5 above. Thus, it is possible to simplify the logical configuration of requirement information.

Requirement C6: Information regarding a learning period
Requirement C61: Learning start timing
Requirement C62: Learning end timing
Requirement C7: Information regarding the goals of learning
Requirement C71: Information regarding learning subjects
Requirement C711: the type of learning subject (e.g. an image, text, audio, etc.)
Requirement C712: The states of learning subjects
Requirement C713: State conversion regarding learning subjects (e.g. state control information regarding learning subjects, state control program information regarding learning subjects, etc.)
Requirement C72: Information regarding an ability to be acquired
Requirement C721: The type of the ability to be acquired (for example, there are the ability to perform classification, the ability to perform prediction, the ability to perform control, and so on. Each type of ability may be classified internally. For example, the ability to perform classification may include the ability to perform supervised classification and the ability to perform unsupervised classification).
Requirement C73: Evaluation of the level of learning
Requirement C731: The content of an evaluation function
Requirement C74: An achievement level
Requirement C741: A targeted achievement level
Requirement C75: Re-learning
Requirement C751: An ID specifying learning that has been previously performed
Requirement C752: The content of a change made to the goal It is possible to set different goals of learning to different instances of learning. As a result of the requirement C7 regarding different goals of learning being set to requirement information, it is possible to acquire learning data corresponding to the requirement C7 regarding the goals of learning. Also, as a result of the requirements C73, C74, and C75 being set to the requirement C7 regarding the goals of learning, it is possible to acquire learning data with desired quality.

As a result of various kinds of information regarding learning subjects being included in requirement information, it is possible to automatically perform operation/analysis/data acquisition on the learning subjects, and it is possible to automate the generation of learning data.

Requirement C8: Information regarding the learning device
Requirement C81: The manufacturer of the learning device
Requirement C811: Models (which may be various derivative models, for example)
Requirement C812: A cloud service that provides a learning service
Requirement C82: The specifications of the learning device
Requirement C821: Computation ability
Requirement C822: The degree of parallelism
Requirement C83: Settings regarding the learning device
Requirement C831: The number of repetitions
Requirement C832: Termination time
Requirement C833: Settings regarding available power consumption It is possible to acquire similar or different abilities using different learning devices. As a result of information C8 regarding the learning device being set to requirement information, the learning data generation system 120 can generate corresponding learning data that is to be used by the learning device 220 to perform learning.

Requirement C9: Information regarding the learning method
Requirement C91: The learning program
Requirement C911: Type/version information
Requirement C92: Information regarding a programming language (for example, it is necessary to know the programming language that is used in order to modify the program later.)
Requirement C93: Information regarding a framework (for example, some companies provide various frameworks for performing deep learning.)
Requirement C94: Information regarding a neural network (for example, it is possible to obtain a neural network that has acquired the ability to perform classification, by performing learning regarding classification. Before starting learning using a learning program, it is possible to determine the configuration of the neural network, using hyper parameters. Hyper parameters may include information regarding the configuration of the input layer, the configuration of the intermediate layers, and the configuration of the output layer. Optimal hyper parameters are often different for each learning subject, and a learning program may be automatically set according to the purpose of learning, or the tuning of hyper parameters may be manually performed.)

Requirement C941: A neural network learning method (Abilities are acquired according to respective learning methods. For example, the method may be related to: a deep learning method such as an SVM or a regression model; a deep belief network, a deep Boltzmann machine, or a stacked autoencoder; an autoencoder, or a restricted Boltzmann machine (RBM); dropout, or sparse coating; regularization, or a denoising autoencoder; the type of an activation function (a sigmoid function, a soft sign, a soft plus, Relu, etc.); and the type of a random number sequence.)

Requirement C942: The configuration of a neural network
  Requirement C9421: Hyper parameters
    Requirement C94211: The configuration of an input layer
    Requirement C94212: The number of layers
    Requirement C94213: The number of units of hidden layers
    Requirement C94214: The content of each layer (for example, each layer may be related to: a CNN (Convolutional Neural Network); an RNN (Recurrent Neural Network); an Elman network; a Jordan network; an ESN (Echo state network); an LSTM (Long short term memory network); or a BRNN (Bi-directional RNN).)
    Requirement C94215: Inter-layer feedback information
      Requirement C942151: The configuration of a feedback circuit
    Requirement C94216: The configuration of an output layer
  Requirement C9422: The accuracy of computation (e.g. the accuracy of computation at learning)
  Requirement C9423: Conditions for ending learning
Requirement C943: Configuration settings that are based on a frame work (the configuration of a neural network as described above may be set according a setting method provided by any of the frameworks. The above-described pieces of information related to learning may be set using a method provided any of the frameworks.)

Requirement C95: Information regarding an ability testing method (As a result of an ability testing method being performed, the learning results are affected by the method so as to meet test requirements. Therefore, learning data needs to be acquired so as to meet the test requirements.)

Requirement C96: Differences between learning results (random numbers are often used in deep learning, and therefore a slightly different ability may be acquired through each learning.)

Examples of requirements included in requirement information for generating learning data are shown above. It can be understood by a person skilled in the art that the requirements at the respective levels shown above may be modified according to the needs. For example, the number thereof may be increased or reduced. Requirement information may include different requirements depending on the subject of learning, the purpose of learning, and a learning environment. The reference numerals (e.g. C4) that are used to indicate the above examples of requirements are not intended to limit the order of the requirements included in requirement information or the storage method, and the order of the requirements included in requirement information and the storage method may be appropriately set according to the needs.

Optionally, ID information may be added to each requirement. When specifying requirement information based on information regarding the subject of learning, the purpose of learning, and so on, it is possible to add ID information corresponding to requirements to requirement information, and specify the requirements based on ID information. In addition, it is possible to simplify the configuration of requirement information.

The creator of a learning program for the learning device 220 knows the details of the learning method that is to be created by himself/herself. Therefore, the creator can create a program that outputs requirement information for generating required learning data corresponding to the requirement C9 shown above regarding the learning method, and other requirements. As a result, it is possible to provide requirement information for generating formatted learning data or a program for outputting the requirement information, together with the learning program. As described above, requirement information can be stored and managed in the requirement information database 234 of the learning database device 230. It is possible to prepare required data for each instance of learning, based on requirement information for generating specified learning data.

As described above, the learning service providing system 200 generates requirement information for generating learning data, based on request information regarding a request for learning made by a user, and the learning requesting system 100 can automatically generate learning data based on the requirement information, without the user manually operating the subject operating device 410 or inputting information regarding learning. Thus, the acquisition of learning data is automated.

Note that requirement information for generating learning data may include information regarding manual work, which may be referenced by a user to generate information regarding learning data, for example. Therefore, the learning data generation system 120 can semi-automatically generate learning data based on requirement information and information that has been manually input.

Therefore, based on the processing method for generating learning data according to one or more embodiments, it is possible to achieve at least the following technical effects: the user need not know details regarding the creation of learning data; the user need not have a special skill for generating learning data; learning data creation work becomes efficient; the time required to create learning data is reduce: the man-hours can be reduced; and a human error is prevented from occurring in learning data.

Therefore, the learning data generation system 120 automatically or semi-automatically controls the subject operating device 410 to acquire learning data based on the above-described requirement information. Thus, it is possible to realize highly automated work. If all tasks are automated, the learning requesting system 100 can acquire a new ability that is expected by a user, simply as a result of each system operating.

Upon the processing method for generating learning data as shown in FIG. 20 being complete, the learning requesting system 100 receives requirement information for generating learning data, from the learning service providing system 200, generates learning data based on the requirement information, and transmits the learning data to the learning service providing system 200. The following describes a learning data generation method, which is realized by the learning requesting system 100 according to one or more embodiments, in combination with FIG. 22.

Figure 22:
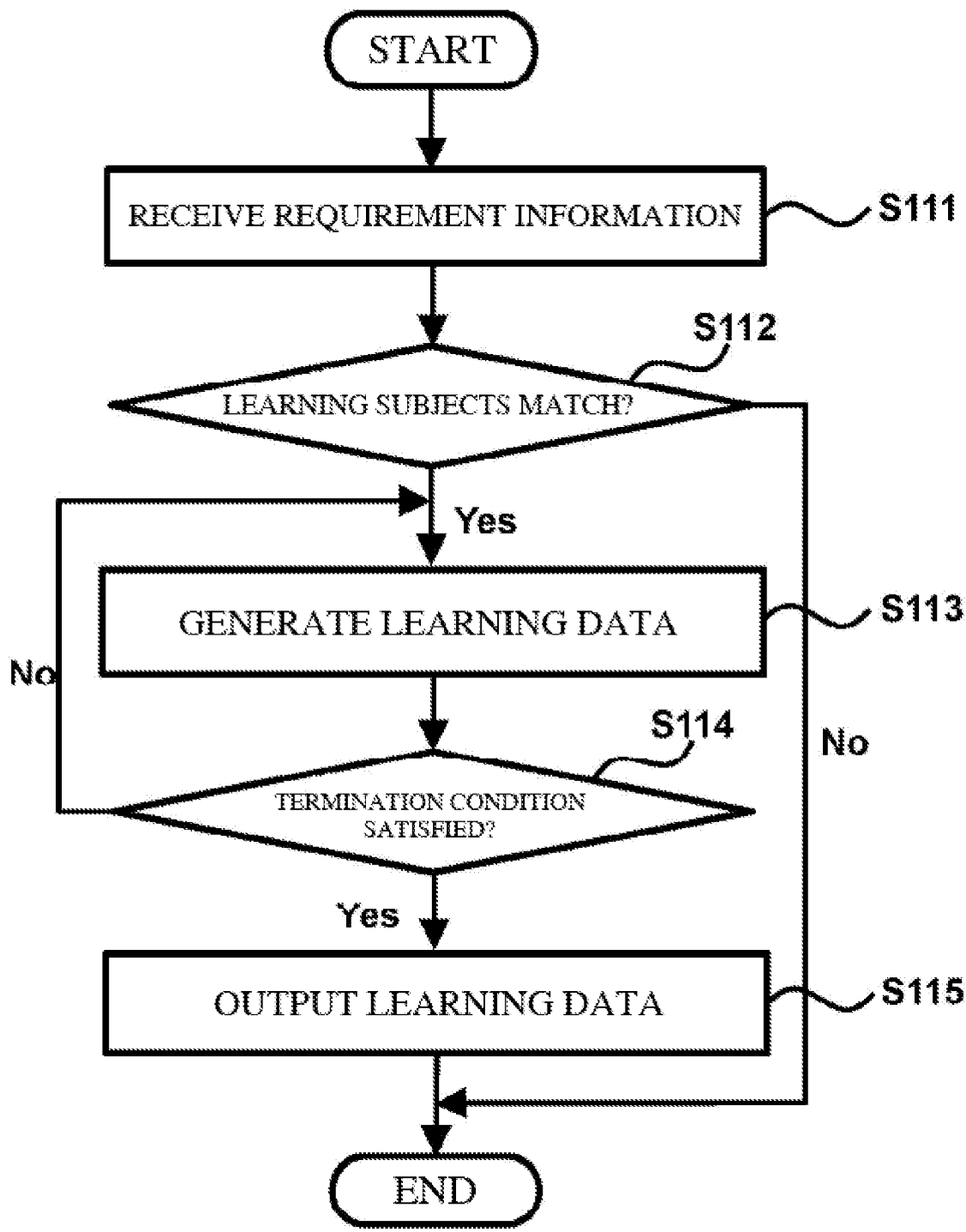
FIG. 22 is a flow diagram illustrating a learning data generation method, which is realized by a learning requesting system according to one or more embodiments.

FIG. 22 is a flowchart showing a learning data generation method, which is realized by the learning requesting system 100 according to one or more embodiments. As shown in FIG. 22, in step S111, the learning requesting device 110 of the learning requesting system 100 receives requirement information for generating learning data from the learning service providing system 200 and provides the requirement information to the learning data generation system 120, and the method proceeds to step S112. In step S112, the learning data generation system 120 determines whether or not information regarding a learning subject included in requirement information matches the learning subject of learning data that is to be actually generated at this time. If it is determined that they match, the method proceeds to step S113. If it is determined that they do not match, the method ends. The learning requesting system 100 can notify the user of the information. In step S113, as described above in combination with FIG. 4, the learning data generation system 120 generates learning data (the first piece of learning data, and the method proceeds to step S114. In step S114, the learning data generation system 120 determines whether or not a termination condition is satisfied. If the termination condition is satisfied, the method proceeds to step S115. If the termination condition is not satisfied, the method returns to step S113, and the generation of learning data is continued. In step S115, the learning data generation system 120 ends the generation of learning data, selects the closest result of synthesis related to learning data, and outputs the result as learning data. The learning data may be output to the learning service providing system 200. The flowchart ends.

The possible content of requirement information for generating learning data is described above. The following describes an example of a method through which the learning requesting system 100 generates learning data based on the requirement information.

For example, when a certain type of ability is to be acquired, requirement information corresponding to the type of the ability and the level of the ability specified in request information may include information regarding the type, the number, or the like of pieces of learning data, and by specifying information regarding the type, the number, or the like of learning data, it may be possible to generate the corresponding number of first pieces of learning data of the corresponding type, and define them as learning data or part of learning data.

Even if the same type of ability is to be acquired, the type, number, etc. of pieces of learning data that are required vary depending on the expected level of the ability. As a result of information regarding the type, number, etc. of pieces of learning data being included in requirement information, the user need not know what kind of data is required and how much data is required in order to achieve the desired goal of learning. Thus, it is possible to simplify user operation.

In another example, when an ability is to be acquired regarding a different learning subject, requirement information corresponding to the learning subject specified in request information may include configuration information regarding the learning subject and/or an operation subject for which data acquisition/operation is to be performed. As a result, it is possible to form the learning subject and/or the operation subject according to the configuration information, generates the first pieces of learning data corresponding to the different learning subject, and define them as learning data or part of learning data.

If the learning subject changes, it is necessary to acquire learning data regarding the different learning subject. As a result of information regarding learning subjects being included in requirement information, the user need not know various information regarding learning subjects, and can acquire desired learning data by simply specifying the learning subject. Thus, it is possible to simplify user operation.

In yet another example, when an ability is to be acquired regarding a learning subject that has a plurality of states, requirement information corresponding to the learning subject specified in request information may include information regarding each state of the learning subject or information regarding state conversion of the learning subject. By forming the state of the learning subject based on at least one of state information regarding the learning subject, state conversion information regarding the learning subject (e.g. state control information regarding the learning subject and state control program information regarding the learning subject), and so on, it is possible to generate the first piece of learning data regarding the learning subject in each state, and define them as learning data or part of learning data.

If a learning subject has a plurality of states, it is required that learning data for each state of the learning subject is acquired. As a result of information regarding the states/state conversion of learning subjects being included in requirement information, the user can acquire desired learning data without knowing various information regarding the learning subjects. Thus, it is possible to simplify user operation.

Figure 23:
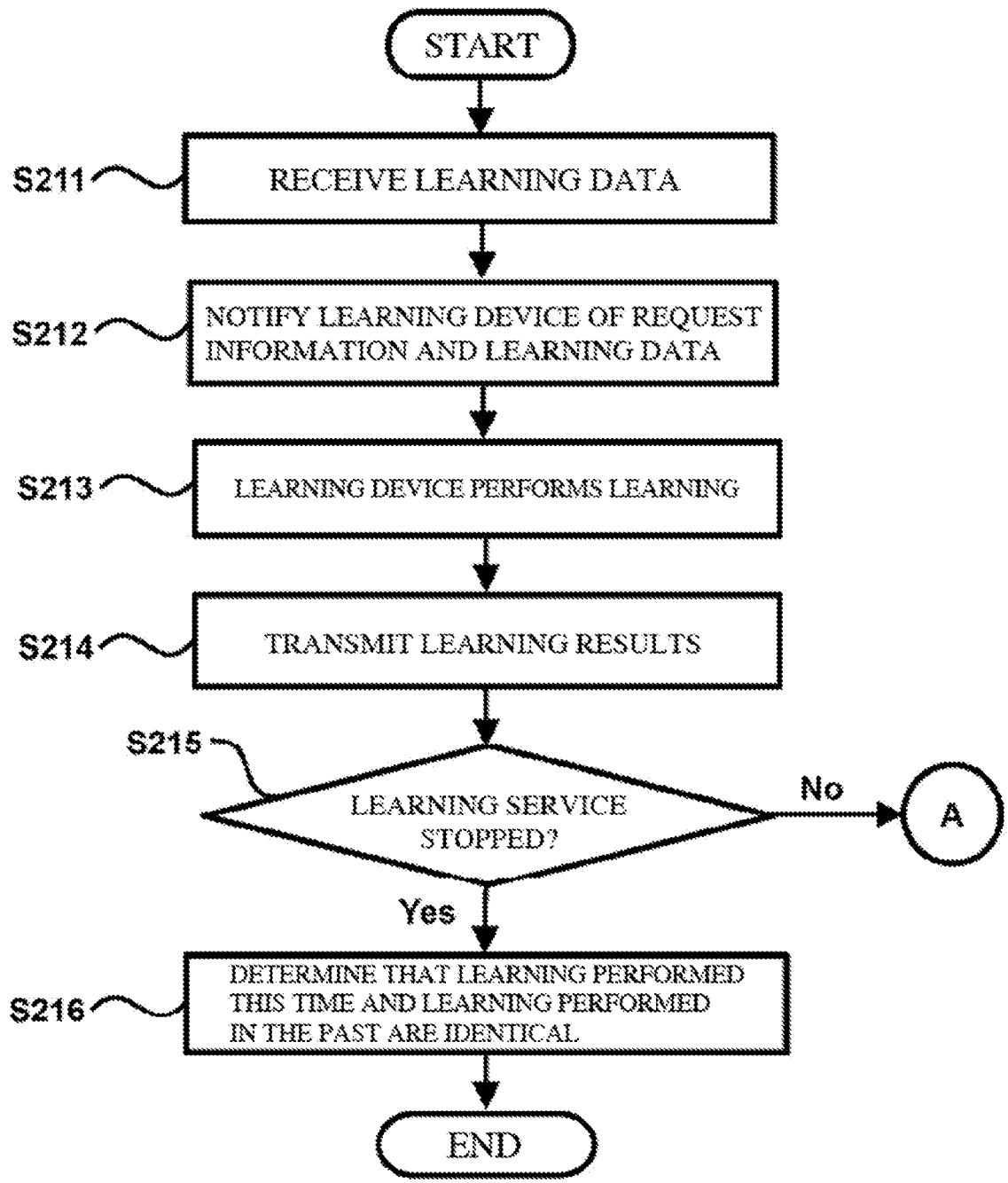
FIG. 23 is a flow diagram illustrating a learning result generation method, which is realized by a learning service providing system according to one or more embodiments.

The following describes a method through which the learning service providing system 200 generates learning results using learning data that has been received, in combination with FIG. 23. FIG. 23 is a flowchart showing a learning result generation method, which is realized by the learning service providing system 200 according to one or more embodiments. The learning service providing system 200 receives, from the learning requesting system 100, learning data generated by the learning data generation system 120, generates learning results by performing learning based on the learning data and request information, and transmits the learning results to the learning requesting system 100 so that the learning result utilizing device 130 can perform subject analysis.

Specifically, as shown in FIG. 23, in step S211, the learning request receiving device 210 receives learning data from the learning requesting device 110 via the Internet 310, and the method proceeds to step S212. In step S212, the learning request receiving device 210 notifies the learning device 220 of request information and learning data, and the methods proceeds to step S213. In step S213, the learning device 220 performs learning using request information and learning data to obtain learning results. Upon learning being complete, the method proceeds to step S214. In step S214, the learning request receiving device 210 transmits learning results to the learning requesting system 100, and the method proceeds to step S215. In step S215, the learning service providing system 200 determines whether or not the learning service is complete. If the learning service is not complete, the method returns to step S201 in FIG. 20, and waits until a learning request from the learning requesting system 100 is received. If the learning service is complete, the learning service proceeds to step S216. In step S216, the learning service providing system 200 determines an identity between learning performed this time and learning performed in the past, records the result of determination, and the method ends.

By performing identity determination in step S216, it is possible to obtain the same learning results, prevent an error from occurring, and improve the accuracy of learning results.

It is possible to perform the task of learning using learning data on a remote server or a cloud server instead of on the above-described device, and therefore it is possible to reduce a computation load on the local device and reduce computation time.

Thus, after the learning requesting system 100 receives the learning data from the learning request receiving device 210, the learning result utilizing device 130 can acquire the ability that is expected by the user. The learning result utilizing device 130 can perform subject analysis using the learning data.

Although the above methods are each described as a combination of a series of operations in order to simplify descriptions, the present invention is not limited to the order of operations described above because it can be understood by a person skilled in the art that some of the steps may be performed in a different order or at the same time. It can also be understood by a person skilled in the art that all of the embodiments described in the present application are illustrative and operations and modules related thereto are not necessarily essential for one or more embodiments.

It is obvious for a person skilled in the art that, as described in the above embodiments, the above methods may be realized using a necessary general-purpose hardware platform in addition to software. Of course, dedicated hardware may be used. However, in many cases, the former may be preferable. According to such understanding, the part of the technical idea of the present invention that contributes to conventional art, or all or part of the technical idea, can inherently be realized in the form of a software product. The computer software product is stored in a recording medium (e.g. a ROM/RAM, a magnetic disk, or an optical disc) that contains some instructions for causing a terminal device (which may be a personal computer, a server, or a network device, for example) to execute the methods described in the embodiments.

To facilitate understanding of the present invention, the following describes application examples that employ a processing method for generating learning data according to one or more embodiments.

Application Example 1

When good/bad products are detected from among confectionery products that are conveyed on a production line of a food processing plant, the shapes of confectionery products are usually indeterminate, and good/bad products cannot be classified using a method of accurately measuring the shapes of the subjects. However, a purchaser can easily discern an obviously bad product. For example, if a foreign object such as a piece of paper is contained in a product, the purchaser can easily recognize it. By utilizing a deep learning technology, it is possible to provide an inspection device in a production line with the ability to perform determination similar to that of a human. In the application example 1, it is possible to automate or semi-automate the input of learning data by performing the processing method for generating learning data according to one or more embodiments, significantly reduce the complexity of human work, improve the processing efficiency, and reduce the likelihood of an error occurring.

Figure 24:
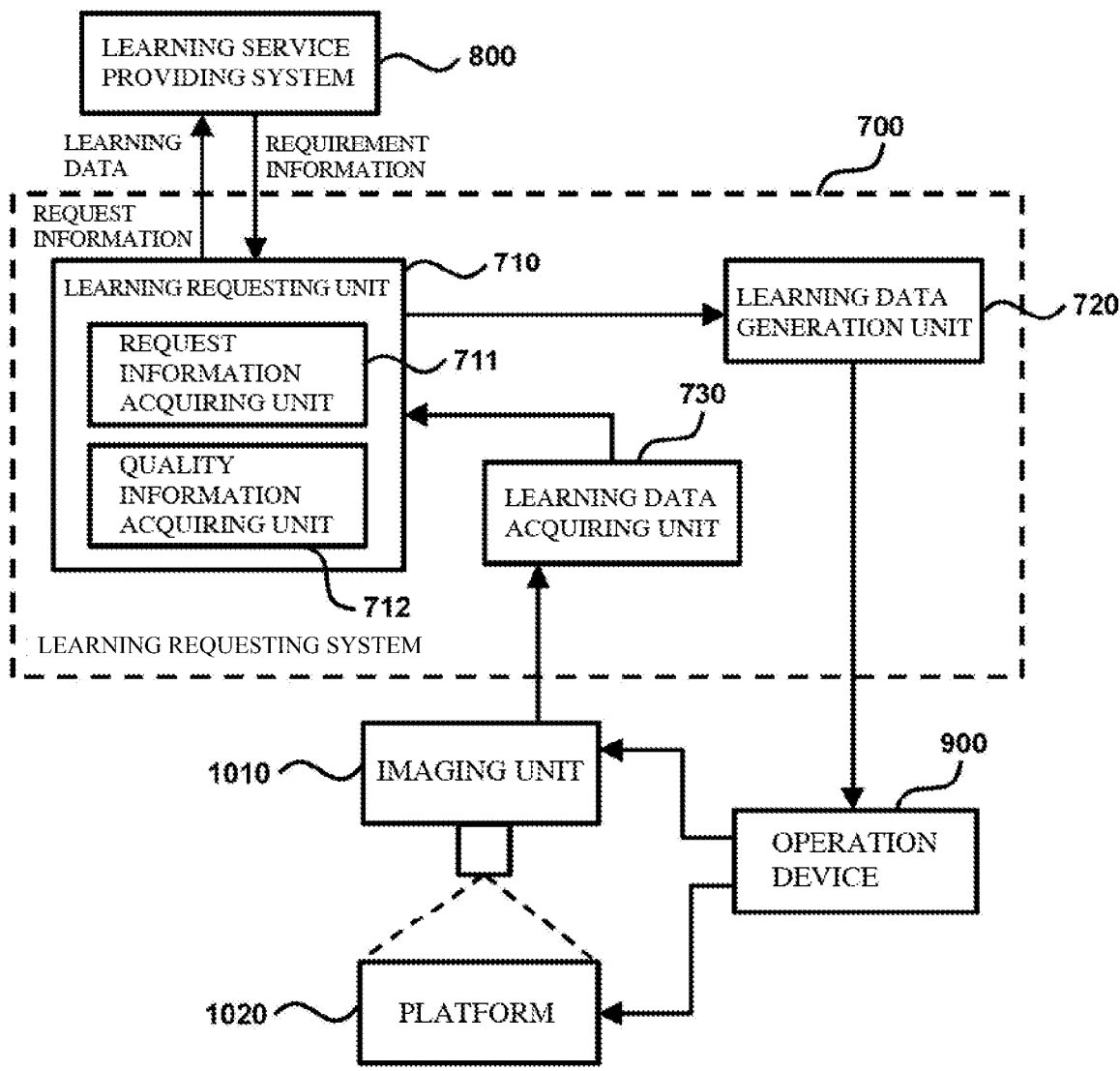
FIG. 24 is a functional block diagram illustrating an application example 1 of a processing method for generating learning data according to one or more embodiments.

FIG. 24 is a functional block diagram showing the application example 1 of a processing method for generating learning data according to one or more embodiments. In the application example 1, the user wishes to acquire learning data related to discernment between good and bad confectionery products. By performing learning using the learning data to acquire learning results, it is possible to provide the inspection device with the ability to discern between good and bad confectionery products.

As shown in FIG. 24, a learning requesting system 700 includes a learning requesting unit 710, a learning data generation unit 720, and a learning data acquiring unit 730. The learning requesting unit 710 interacts with the user to receive request information for making a request for learning input from the user and quality information (teaching data) used to discern between good and bad confectionery products. The learning requesting unit 710 also interacts with a learning service providing system 800 to transmit request information to the learning service providing system 800 and receive requirement information for generating learning data from the learning service providing system 800. The learning data generation unit 720 performs control to cause an operation device 900 to generate the first piece of learning data (image data), based on requirement information received by the learning requesting unit 710. The learning data acquiring unit 730 acquires the first piece of learning data thus generated, and provides the first piece of learning data to the learning requesting unit 710 so that the learning requesting unit 710 can synthesize and output the first piece of learning data and quality information as learning data.

The learning service providing system 800 can specify requirement information for generating learning data, based on request information, and generate learning results by performing learning using learning data. The operation device 900 operates an imaging unit 1010 and a platform 1020 on or to which confectionery products are placed or fixed, to acquire image data. The operation device 900 may include an actuator, a robot hand, or the like.

Note that the learning requesting system 700 may function as the learning requesting system 100, the learning requesting unit 710 may function as the learning requesting device 110, the learning data generation unit 720 may function as the learning data generation system 120, the learning data acquiring unit 730 may function as the learning result utilizing device 130 or the learning data acquiring device 140, the learning service providing system 800 may function as the learning service providing system 200, and the operation device 900 may function as the subject operating device 410.

The imaging unit 1010 may include one or more cameras. If the imaging unit 1010 include one camera, it is possible to capture images of a confectionary product in various orientations by capturing images of the confectionary product a plurality of times in various directions, and it is also possible to acquire image data regarding a confectionary product in various orientations by moving/rotating the platform 1020 while fixing the camera. If the imaging unit 1010 includes a plurality of cameras, it is possible to acquire images of a confectionary product in various orientations without changing the orientations of the cameras, and it is also possible to acquire images of a confectionary product in various orientations by operating the cameras according to the movement/rotation of the platform 1020.

Note that confectionary products may be fixed using a small robot hand or a hole that has a variable size and shape so that the platform 1020 is not captured by a camera. Optionally, image processing may be employed to remove the influence of a background image in image data.

Figure 25:
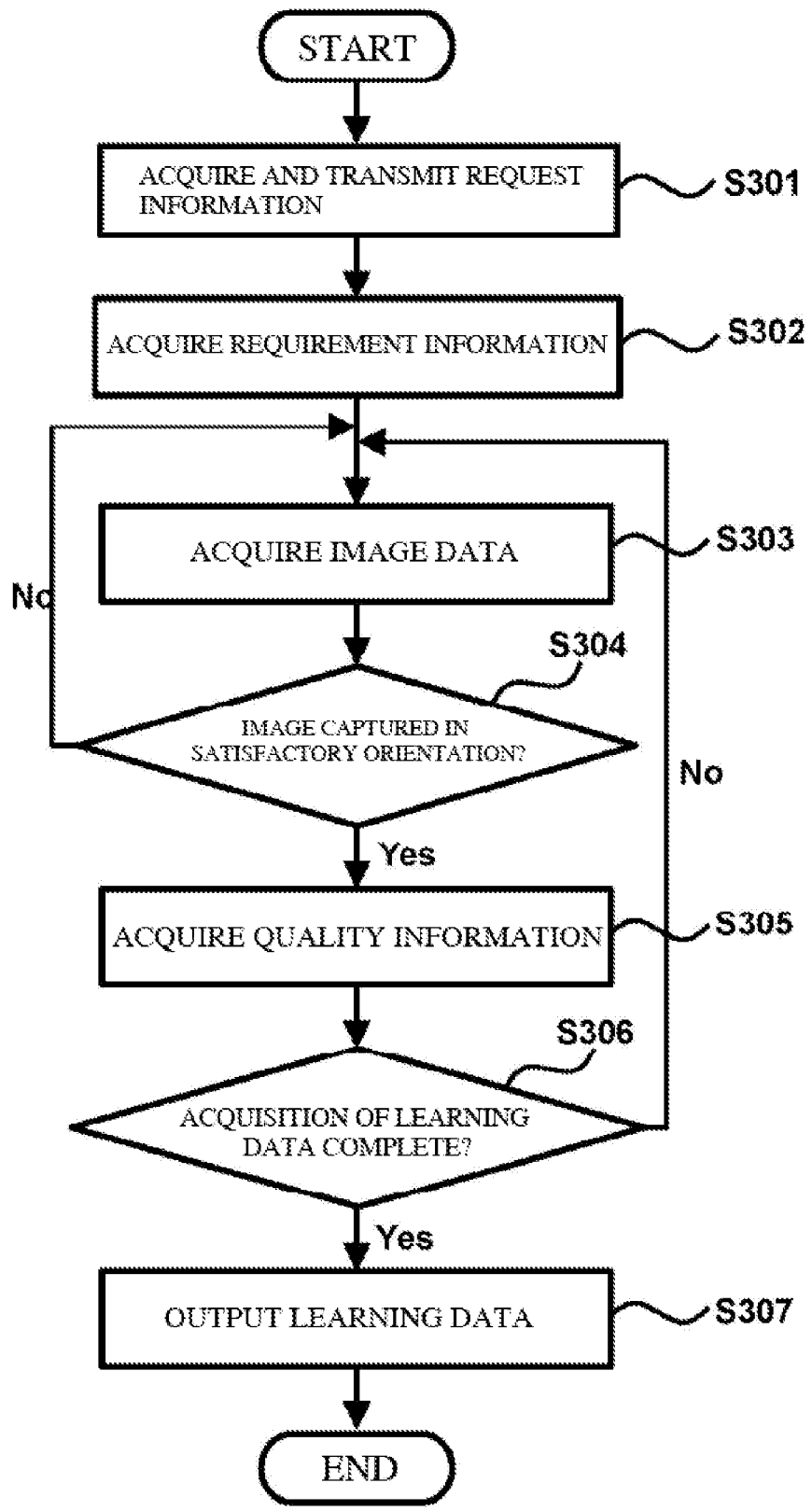
FIG. 25 is a flow diagram showing a method learning data generation method according to an application example 1.

FIG. 25 is a flowchart showing a learning data generation method according to the application example 1. As shown in FIG. 25, in step S301, the learning requesting unit 710 provides selectable learning subjects and goals of learning to the user based on a selection screen provided by the learning service providing system 800 connected to the learning requesting unit 710, and receives input from the user regarding a learning subject and a goal of learning to generate request information. For example, input regarding a learning subject may include the type of confectionary product, etc., and input regarding a goal of learning may include discernment between good and bad confectionary products. The learning requesting unit 710 transmits the generated request information to the learning service providing system 800, and the method proceeds to step S302.

In step S302, the learning service providing system 800 specifies requirement information for generating learning data, based on request information. For example, the learning service providing system 800 can searches learning database for requirement information corresponding to request information, and can also generate requirement information by providing request information to a program that generates requirement information. For example, requirement information may include information regarding the type, number, and format of pieces of learning data, information regarding operation of the operation device 900, information regarding a targeted achievement level, information regarding a learning method, information regarding a learning device, and so on. The learning requesting unit 710 acquires the requirement information from the learning service providing system 800. The method proceeds to step S303.

In step S303, the learning data generation unit 720 operates the operation device 900 based on the requirement information, the operation device 900 operates a camera to acquire image data, and the method proceeds to step S304.

In step S304, the learning data generation unit 720 determines whether or not an image of a confectionary product in a satisfactory orientation has been captured. If the result of determination is Yes, the method proceeds to step S305. If the result of determination is No, the method returns to step S303, and images of the confectionary product in other orientations are continuously captured so that image data can be acquired.

In step S305, the learning requesting unit 710 receives quality information regarding the good/bad state of the confectionary product input by the user, and synthesizes the quality information and the acquired image information to form learning data, and the method proceeds to step S306. In step S306, the learning data generation unit 720 determines whether or not a learning data acquisition completion condition is satisfied. If the acquisition of learning data has been stopped, the method proceeds to step S307. If the learning data acquisition completion condition is not satisfied, the method returns to step S303. In step S307, the learning requesting unit 710 externally outputs the synthesized learning data in the end, to the learning service providing system 800, for example. The method ends.

Note that, when acquiring image data in step S303, the back ground, illumination, etc. at the time of image capturing may be set to be the same as those for actual good/bad product inspection in order to reduce errors in learning data. For example, it is possible to acquire image data using the actual production line or simulating the actual production line.

Quality information mentioned above is the result of quality discernment performed through visual inspection by a human. In the case of the above method, the quality information is input in step S305. However, it can be understood by a person skilled in the art that it suffices if the quality information can be input in a given phase of the above method, and the relationship between the good and bad information and image data can be determined.

Optionally, the user may prepare a plurality of boxes to which a tag indicating a good product or a bad product is attached, and good samples and bad samples may be put in the plurality of boxes. As a result, the user need not input quality information. The learning data generation unit 720 can acquire image data by performing control to cause the operation device 900 to capture images of samples in boxes to each of which a tag indicating a good product or a bad product is attached, and can provide the learning data acquiring unit 730 with the image data in association with quality information indicated by the tabs of the plurality of boxes. Thus, it is possible to automate the acquisition of learning data.

Table 1 shows an example of learning data acquired through the above-described method. It should be understood that this example is merely an example, and learning data may include other information such as user information.

TABLE 1

| Learning Data Number | Image Data | | | | | | Content of Quality Information (Result of Visual Inspection) |
|---|---|---|---|---|---|---|---|
| Sample 1 | Front Face Image Data 1 | Rear Face Image Data 1 | Right Side Face Image Data 1 | Left Side Face Image Data 1 | Top Face Image Data 1 | Bottom Face Image Data 1 | Good Product |
| Sample 2 | Front Face Image Data 2 | Rear Face Image Data 2 | Right Side Face Image Data 2 | Left Side Face Image Data 2 | Top Face Image Data 2 | Bottom Face Image Data 2 | Bad Product |
| Sample 3 | Front Face Image Data 3 | Rear Face Image Data 3 | Right Side Face Image Data 3 | Left Side Face Image Data 3 | Top Face Image Data 3 | Bottom Face Image Data 3 | Good Product |
| Sample 4 | Front Face Image Data 4 | Rear Face Image Data 4 | Right Side Face Image Data 4 | Left Side Face Image Data 4 | Top Face Image Data 4 | Bottom Face Image Data 4 | Bad Product |
| Sample 5 | Front Face Image Data 5 | Rear Face Image Data 5 | Right Side Face Image Data 5 | Left Side Face Image Data 5 | Top Face Image Data 5 | Bottom Face Image Data 5 | Good Product |
| Sample 6 | Front Face Image Data 6 | Rear Face Image Data 6 | Right Side Face Image Data 6 | Left Side Face Image Data 6 | Top Face Image Data 6 | Bottom Face Image Data 6 | Bad Product |
| Sample 7 | Front Face Image Data 7 | Rear Face Image Data 7 | Right Side Face Image Data 7 | Left Side Face Image Data 7 | Top Face Image Data 7 | Bottom Face Image Data 7 | Good Product |

TABLE 1-continued

| Learning Data Number | Image Data | | | | | | Content of Quality Information (Result of Visual Inspection) |
|---|---|---|---|---|---|---|---|
| Sample 8 | Front Face Image Data 8 | Rear Face Image Data 8 | Right Side Face Image Data 8 | Left Side Face Image Data 8 | Top Face Image Data 8 | Bottom Face Image Data 8 | Bad Product |
| Sample 9 | Front Face Image Data 9 | Rear Face Image Data 9 | Right Side Face Image Data 9 | Left Side Face Image Data 9 | Top Face Image Data 9 | Bottom Face Image Data 9 | Good Product |
| Sample 10 | Front Face Image Data 10 | Rear Face Image Data 10 | Right Side Face Image Data 10 | Left Side Face Image Data 10 | Top Face Image Data 10 | Bottom Face Image Data 10 | Good Product |

If the method according to the application example 1 is utilized, the user, when creating learning data, need not capture images of a confectionary product in many directions while manually operating a camera. Thus, it is possible to avoid misoperation when manually changing the orientation of a camera about three axes, and it is possible to avoid a failure to acquire data. Also, it is possible to automatically synchronize image capturing, performed by the camera, with the movement/rotation of the platform 1020, which improves efficiency in data acquisition. In addition, it is possible to automate the operation performed to create learning data, which significantly reduces man-hours.

Figure 26:
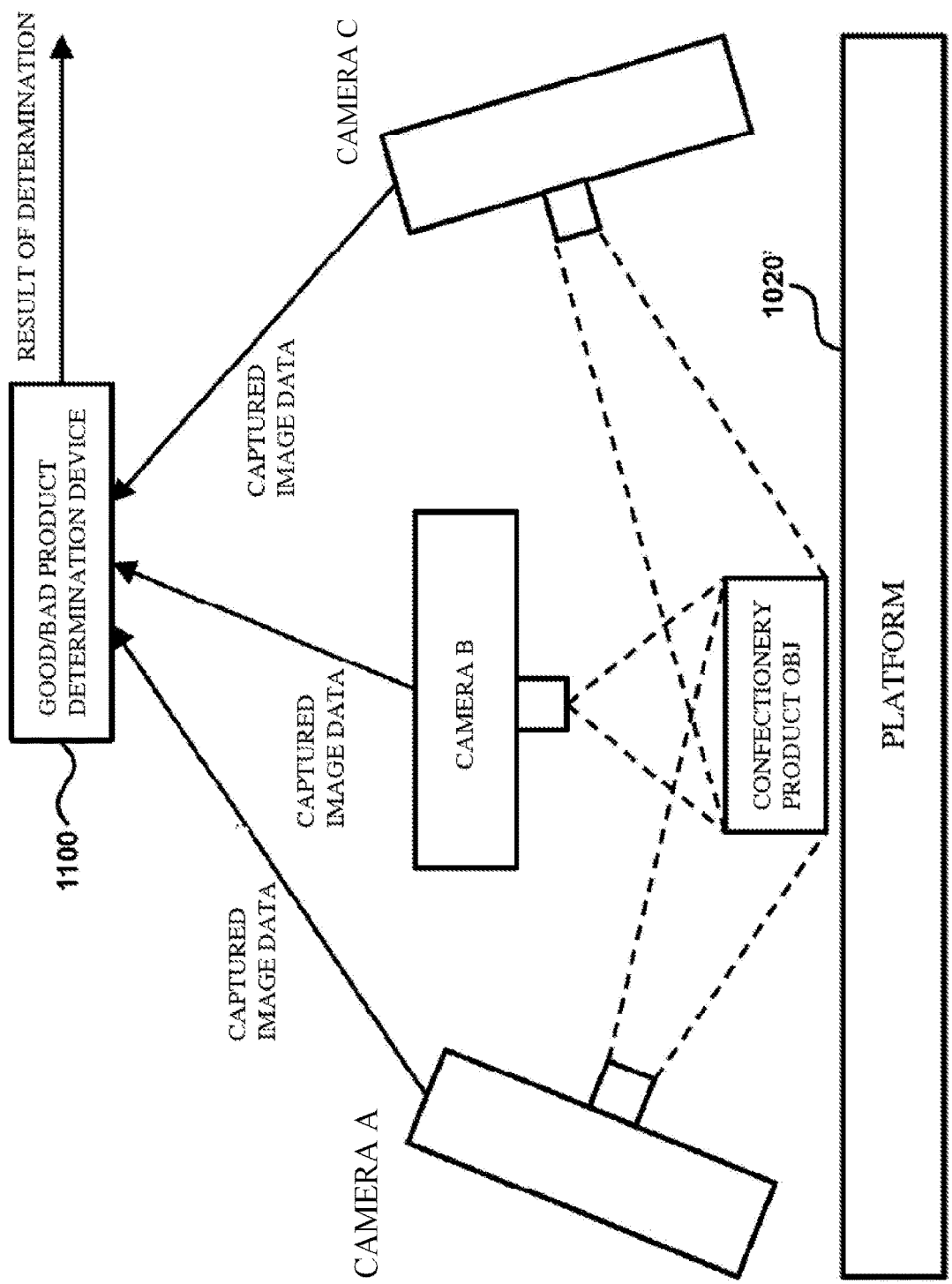
FIG. 26 is a diagram illustrating determination of good/bad products that is performed using learning results according to an application example 1.

FIG. 26 is a diagram showing determination of good/bad products that is performed using learning results according to the application example 1. As shown in FIG. 26, images of a confectionery product OBJ are captured using a camera A, a camera B, and a camera C, to acquire image data. A good/bad product determination device 1100 determines whether a confectionary product OBJ is good or not based on the image data and learning results.

Note that the good/bad product determination device 1100 may function as the learning result utilizing device 130. Also, a platform 1020' may function as the platform 1020. In the example shown in FIG. 26, three cameras are used to capture images. However, one camera, two cameras, or three or more cameras may be used. If images are captured using one camera, it is possible to capture images of the confectionary product in many directions by changing the orientation of the camera/the platform. If a confectionary product is carried on a production line, the orientation of the confectionary production on the production line may be unknown. Therefore, it is preferable that images are captured in various directions using a plurality of cameras. Optionally, if a plurality of captured images show the entire outer surface of the confectionary product, it is possible to avoid overlooking an abnormality on the outer surface of the confectionary product, such as a crack or breakage.

Figure 27:
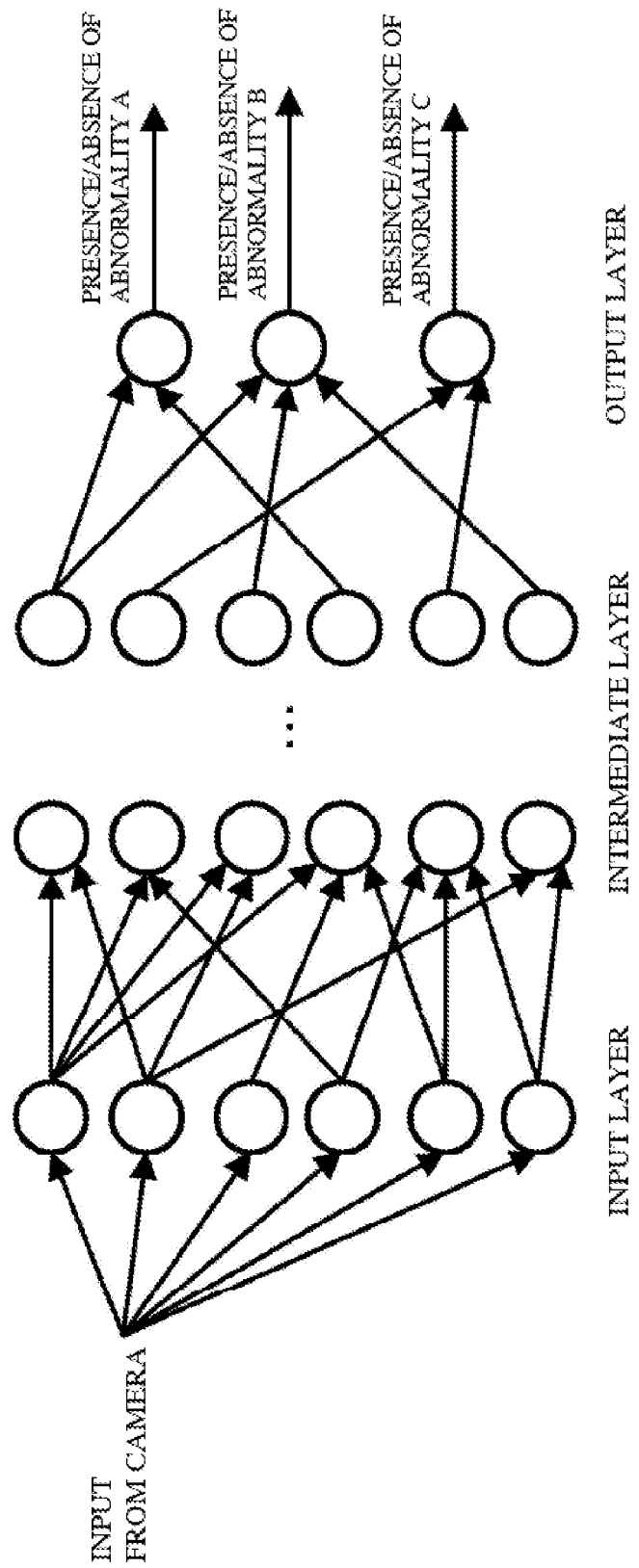
FIG. 27 is a diagram illustrating deep learning that is used in determination of good/bad products, such as in FIG. 26.

FIG. 27 is a diagram showing deep learning that is used in the determination of good/bad products shown in FIG. 26. As shown in FIG. 27, a deep learning network 1200 includes an input layer, an intermediate layer, and an output layer. Image data captured by a camera can be input to the input layer of the deep learning network 1200 as input data. Image data, which is input data, may be image data captured by one camera, or image data obtained by synthesizing pieces of image data captured by a plurality of cameras, such as panoramic image data of a confectionary product. For example, if image data has 1200×1200 pixels and each of RGB of each pixel has 256 levels, the input layer may have 1200×1200×256×256 pixels. There may be a plurality of intermediate layers, and image data is analyzed using a deep learning technology. The number of nodes of the output layer is the same as the number of abnormality modes. For example, if the uppermost node of the output layer outputs 1, an abnormality A is indicated. The deep learning network 1200 may be included in the good/bad product determination device 1100.

Figure 28:
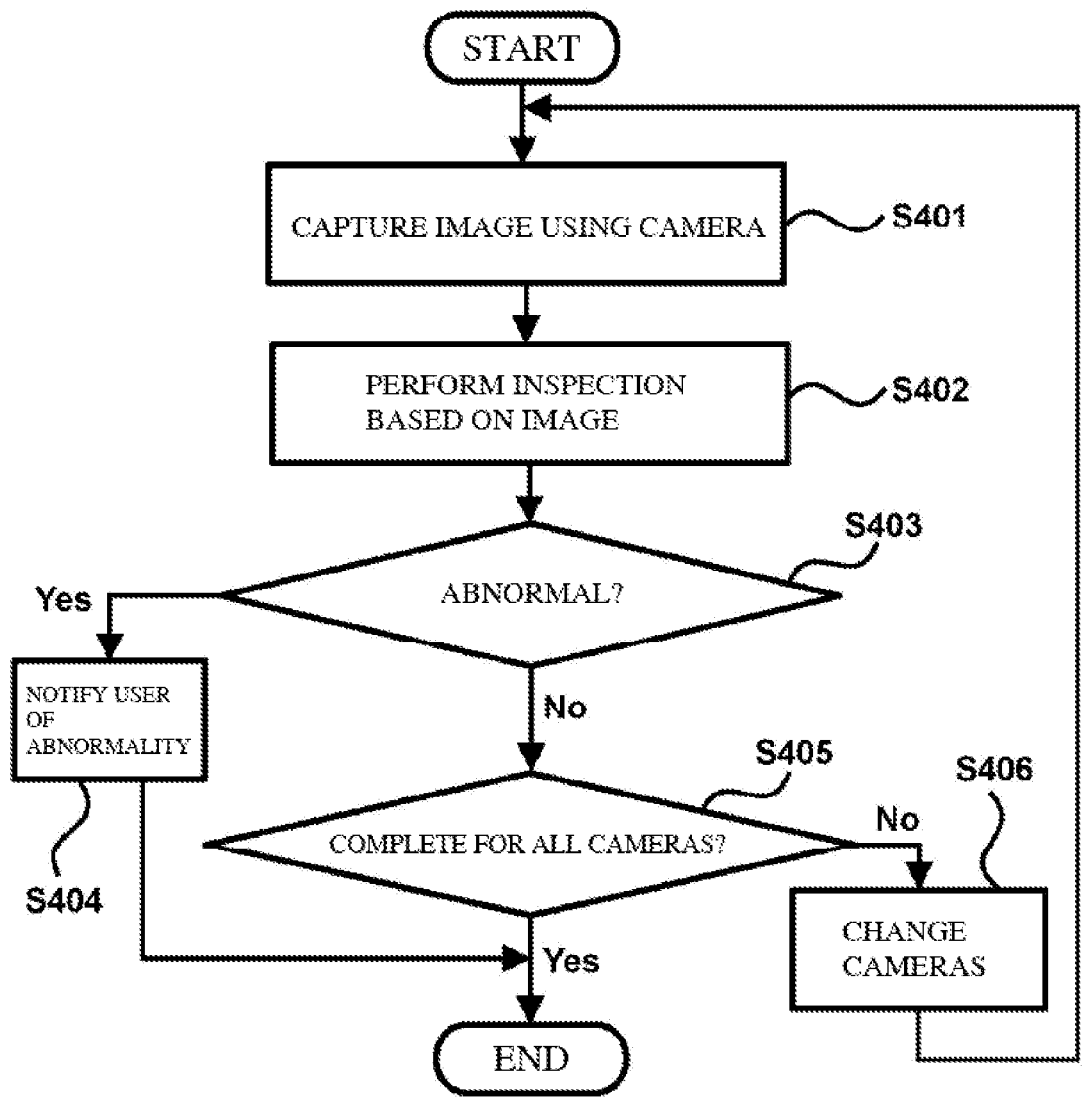

FIG. 28 is a flowchart showing the good/bad product determination method shown in FIG. 26. In step S401, an image of the confectionary product OBJ on the platform 1020' is captured using the camera A and the acquired image data is provided to the good/bad product determination device 1100, and the method proceeds to step S402. In step S402, the good/bad product determination device 1100 performs inspection based on image data to acquire inspection results, and the method proceeds to step S403. In step S403, if the result of inspection indicates an abnormality, the method proceeds to step S404. In step S404, the good/bad product determination device 1100 notifies the user of the abnormality, and the method ends. If the result of inspection does not indicate that there is an abnormality, the method proceeds to step S405. In step S405, it is determined whether or not all of the cameras have captured an image of the confectionary product. If all of the cameras have captured an image of the confectionary product, the method ends. If not all of the cameras have captured an image of the confectionary product, the method returns to step S401, and images of the confectionary product are continuously captured using the subsequent cameras.

In this method, images captured by each camera are inspected. Therefore, if even one piece of captured image data includes an abnormality, a notification about the abnormality is provided. Thus, it is possible to omit the task of image capturing performed by the subsequent cameras, or the task of inspection of images captured by the subsequent cameras, which simplifies operation processing. Also, in the case where only some of confectionary products have an abnormality and the confectionary products are arranged in random orientations, it is possible to detect the abnormality without overlooking it by performing the repetitive inspection according to the above-described method.

Application Example 2

In an application example 2, the user wishes that a machine (e.g. a client) acquires the ability to automatically classify electronic files. It is possible to perform learning on the server side to acquire the ability to classify various electronic files according to their content based on a predetermined classification rule. The following describes a learning data generation method according to the application example 2 with reference to a combination with FIG. 29.

Figure 29:
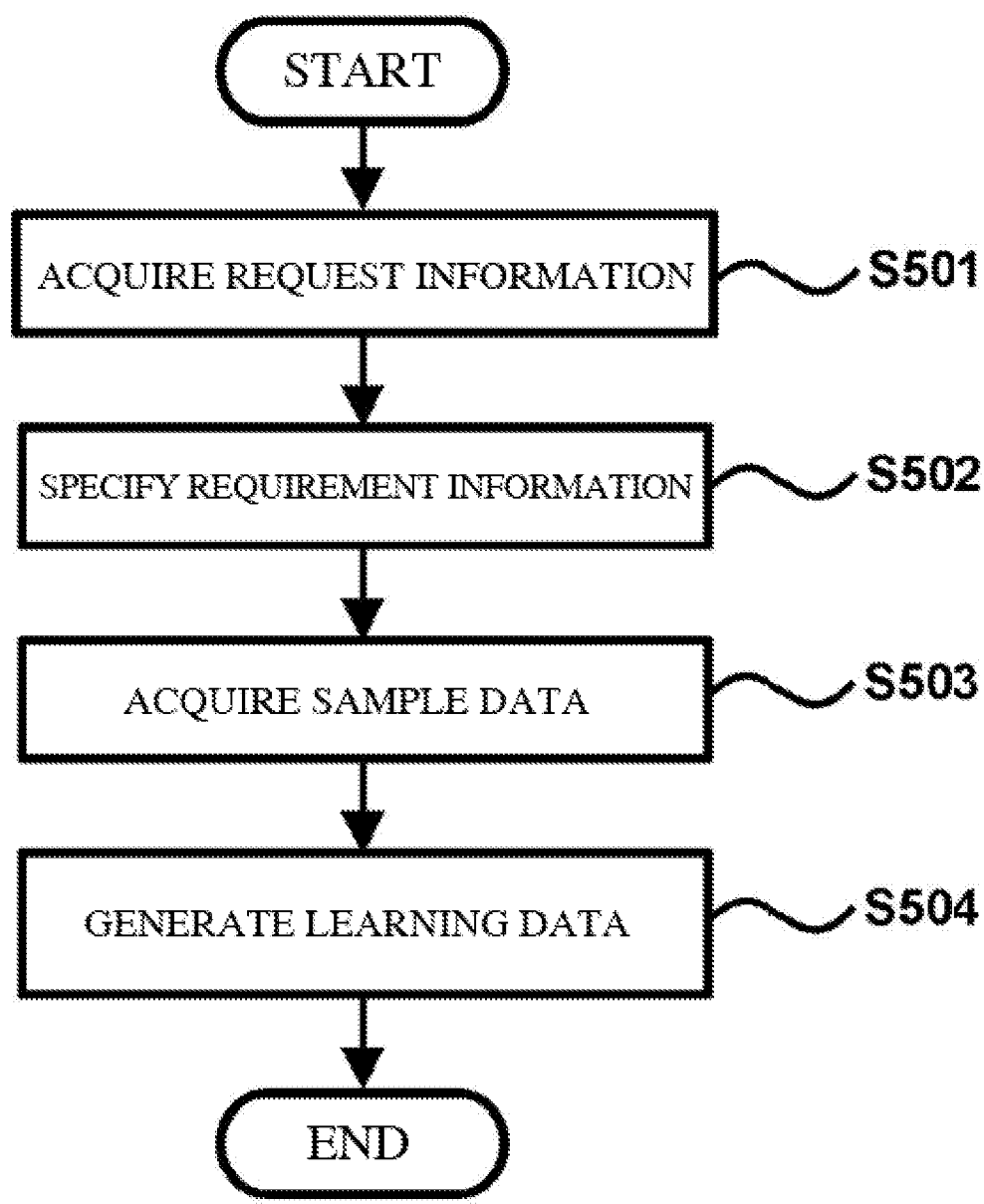
FIG. 29 is a flow diagram illustrating a learning data generation method according to an application example 2.

FIG. 29 is a flowchart showing a learning data generation method according to the application example 2. In this application example, the client may function as the learning requesting system 100, and the server may function as the learning service providing system 200.

As shown in FIG. 29, in step S501, the client that is connected to the server receives request information for making a request for learning. Request information may include, for example, information regarding electronic files that are to be classified, and information regarding the ability to automatically classify the electronic files, which is desired to be acquired. The client transmits these pieces of information to the server, and the method proceeds to step S502.

In step S502, the server specifies requirement information for generating learning data, based on request information. Specifically, sample data and information that describes a method of registering the classification names thereof may be included in requirement information, and sample data may include teaching data and test data, for example. The requirement information is provided to the client, and the method proceeds to step S503. In step S503, the user registers sample data, which is data including: classification information regarding the classified electronic files; and other information, according to guidance provided by requirement information, and the method proceeds to step S504. In step S504, the user stops registering sample data according to guidance provided by completion information included in requirement information. The client generates learning databased on requirement information and sample data, transmits them to the server to cause the server to automatically perform learning and testing, and the method ends.

According to the above-described method, sample data and information that describes the method thorough which the classification names thereof are registered can be recorded in advance in a learning data creation manual, and the user can register sample data according to the learning data creation manual. In this case, step S503 is not necessarily executed after step S502 is executed. For example, step S503 may be executed before S502 is executed, or may be executed in synchronization with step S502.

According to the method, the user can grasp what learning data and how much learning data is required when sample data is to be registered. Thus, it is possible to simplify user operation, and reduce a load on the user.

According to the method, the user need not determine whether there is sufficient learning data, and additional learning is not required even when there is not sufficient learning data. Therefore, it is possible to avoid a situation where AI learning does not end due to the lack of learning data and the client resources and the server resources are unnecessarily occupied, and it is possible to save computational resources. It is also possible to reduce the load of communication between the client and the server.

Optionally, regarding step S502, requirement information may include a program for registering the classified electronic files in response to a simple operation such as drag-and-drop performed on the client. As a result, it is possible to automate part of the registration task performed by the user, and further simplify user operation.

Optionally, regarding step S502, requirement information may include a program that includes information for searching a database in which pieces of teaching data that have been classified are registered. As a result, it is possible to automate the most part or all of registration work, and further simplify user operation. In this case, step S503 may be omitted.

Application Example 3

In an application example 3, the user wishes that a machine (e.g. an inspection device in a production line) acquires the ability to automatically rank agricultural products. It is possible to perform learning on the server side to acquire the ability to rank various agricultural products according to their specific statuses based on a predetermined ranking rule. The following describes a learning data generation method according to the application example 3 with reference to a combination with FIG. 30.

Figure 30:
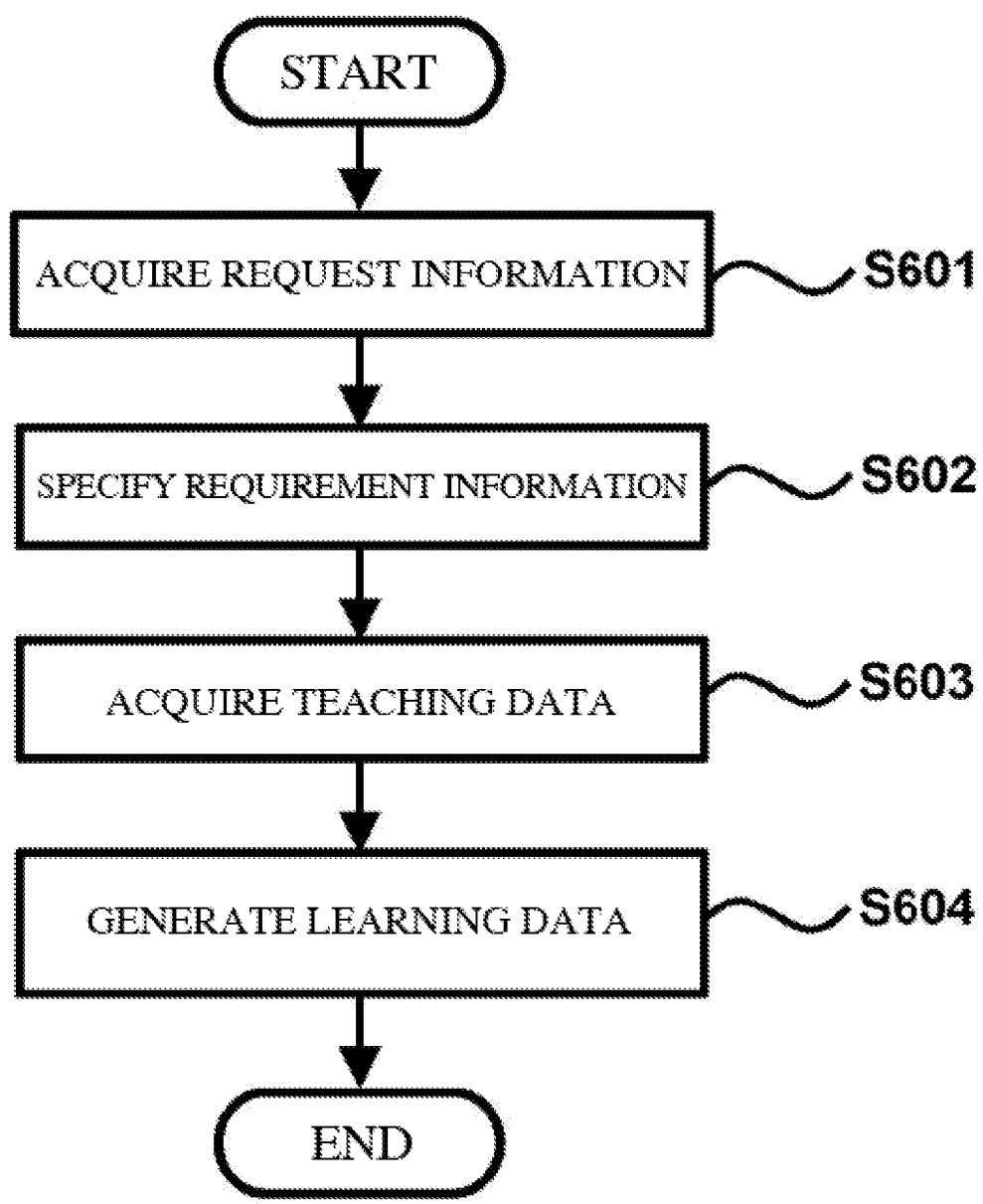
FIG. 30 is a flow diagram illustrating a learning data generation method according to an application example 3.

FIG. 30 is a flowchart showing a learning data generation method according to the application example 3. As shown in FIG. 30, in step S601, the client that is connected to the server receives request information for making a request for learning. Request information may include, for example, information regarding agricultural products that are to be ranked and information regarding the ability to automatically rank the agricultural products. The inspection device transmits these pieces of information to the server and the method proceeds to step S602.

In step S602, the server specifies requirement information for generating learning data, based on request information. For example, requirement information may include the following pieces of information.

Information regarding the data input device

The type of the data input device (e.g. a camera, a sensor, an automatic measurement device, etc.)

The model of the data input device (e.g. the manufacturer name, the model name, the serial number, etc.) A data input device control method (e.g. a control program, control parameters, etc.)

The type of input data (e.g. an image, a weight, etc.) The type of input data (e.g. information regarding the resolution of the depth of an image, the unit of weight, accuracy information, etc.)

Information regarding the learning subject (e.g. the harvest date, the place of harvest, the harvester, etc.

The requirement information is provided to the inspection device, and the method proceeds to step S603. In step S603, the user inputs teaching data, which is data including ranking information regarding the ranked agricultural products and other information, to the inspection device according to guidance provided by requirement information, and the method proceeds to step S604. In step S604, the user stops inputting teaching data according to guidance provided by completion information included in requirement information. The inspection device generates learning databased on requirement information and teaching data, transmits them to the server to cause the server to automatically perform learning and testing, and the method ends.

According to the above-described method, information that describes the teaching data input method can be recorded in advance in a learning data creation manual, and the user can input teaching data according to the learning data creation manual. In this case, the user can prepare learning data without knowing a learning method regarding automatic ranking of agricultural products. In this case, step S603 is not necessarily executed after step S602 is executed. For example, step S603 may be executed before S602 is executed, or may be executed in synchronization with step S602.

Also, the above-described information regarding the learning subject may be recorded in the learning database as information attached to learning data, in order to enable the server to perform automatic learning.

With the above-described method, information regarding a control program for a camera, an automatic measurement device, or the like can be included in requirement information, which can automate the task of inputting teaching data.

One or more aspects are applicable to various fields in addition to the fields of the above-described application examples 1 to 3. For example, in various fields where a deep learning technology is to be utilized, one or more aspects are applicable to cases where the ability to perform classification that is comparable to, or is better than, the human ability to perform discernment, is to be realized.

For example, in a case where a failure of uneven coating is to be detected in a production line for painting automobile operation parts and automobile panels, the inspection apparatus in the production line is required to have the ability to perform classification. The tolerance of uneven coating of a product is determined by the purchaser of the vehicle. Therefore, it is necessary to perform classification similar to that performed based on human sensitivity. In particular, if there are small irregularities on the coated surface or when the paint does not simply have a single color, but has partial gradation, it is difficult to perform classification using a simple method.

Using the processing method for generating learning data according to one or more embodiments, it is possible to include, for example, information regarding a coating device, a coating target, coating environment parameters, an inspection device, an inspection program, a worker, and so on in the requirement information for generating learning data, and it is possible to automate or semi-automate the task of generating learning data. As a result, it is possible to significantly reduce the complexity of human work, improve processing efficiency, and reduce the likelihood of an error occurring.

As described above, one or more aspects are applicable to various fields where a high-level ability (the ability to perform classification, the ability to perform prediction, the ability to perform determination, etc.) is to be acquired. A learning technology that is used to apply one or more aspects to acquire an ability is not limited to a deep learning technology, and any machine learning technology may be used. The following are examples of various fields to which one or more aspects are applicable. These examples are merely illustrative, and do not limit the fields to which one or more aspects are applicable.

- One or more aspects are applicable to various industrial fields such as the fields of food, chemicals, machine parts, and chemical products, and so on.
- One or more aspects are applicable to shipping inspection and classification in the fields of fishery, agriculture, forestry, and so on.
- One or more aspects are applicable to the service industry.
- One or more aspects are applicable to the fields of medical care and health.
- One or more aspects are applicable when applying an AI technology to a product in a built-in field.
- One or more aspects are applicable to a social system.
- One or more aspects are applicable to a system that utilizes an IT technology.
- One or more aspects are applicable to big data analysis in order to effectively acquire data.
- One or more aspects are applicable to the acquisition of a control ability of a wide range of control devices.
- In addition, one or more aspects are applicable to any filed in which machine learning is required.

It should be understood that the technical contents described in the above embodiments can be realized using a different method. The above-described systems, devices, and parts are merely conceptual. For example, the systems, devices, and parts are simply classified based on their logical functions, and may be classified using a different method when they are to be realized. For example, one or more systems, devices, and parts may be combined, or integrated on other devices or parts. Also, at least one of the features may be omitted or need not to be executed. Also, the connections between the systems, devices, and parts shown in the drawings according to one or more embodiments may be realized as indirect connections or direct connections, and may be realized using electricity or in another form.

The systems, devices, and parts described in the above embodiments as separate members may or may not be physically separated, and members described as the systems, devices, and parts may or may not be physical units. That is to say, they may be located in the same place or distributed among a plurality of network units. It is possible to achieve aims of one or more embodiments, using at least one or all of the units according to the needs.

Also, the functional units of each embodiment may be integrated on one processing unit, or each functional unit may physically exist, or a plurality of functional units may be integrated on one processing unit. The above-described processing units may be realized in the form of hardware or software.

If the above-described processing units are realized as software units and are sold or used as an independent product, the processing units may be stored in a computer-readable storage medium. According to such understanding, the part of the technical idea of the present invention that contributes to conventional art, or all or part of the technical idea, can inherently be realized in the form of a software product. The computer software product is stored in a recording medium that contains some instructions for causing a computer device (which may be a personal computer, a server, or a network device, for example) to execute at least one or all of the methods described in the embodiments. Examples of the above-described storage medium include a medium that can store various program codes, such as a U disk, a read-only memory (ROM), a random access memory (RAM), a portable hard disk, magnetic disk, or an optical disc.

Although only some embodiments are described above, it should be noted that a person skilled in the art can make some modification, addition, or reduction, without departing form the principals of the present invention. Such modification, addition, or reduction should also be included in the scope of protection of the present invention.

Note that the following configurations may be employed for the present technology.

(1) A processing method for generating learning data, comprising:

a step of specifying requirement information for generating learning data, using at least one hardware processor, based on request information for making a request for learning; and a step of transmitting the requirement information to a device that generates the learning data, using at least one hardware processor.

(2) A method for generating learning data, comprising:

a step of receiving request information for making a request for learning, using at least one hardware processor;

a step of transmitting the request information to a device that provides requirement information for generating the learning data, using the at least one hardware processor;

a step of receiving the requirement information from the device, using the at least one hardware processor; and a step of generating the learning data based on the requirement information, using the at least one hardware processor.

(3) A processing system for generating learning data, comprising at least one hardware processor,
wherein the hardware processor
specifies requirement information for generating learning data, based on request information for making a request for learning, and
transmits the requirement information to a device that generates the learning data.

(4) A system for generating learning data, comprising at least one hardware processor,
wherein the at least one hardware processor
receives request information for making a request for learning,
transmits the request information to a device that provides requirement information for generating the learning data,
receives the requirement information from the device, and
generates the learning data based on the requirement information.

LIST OF REFERENCE NUMERALS 100, 700 Learning requesting system
110 Learning requesting device
111 Learning request control unit
112 User interaction unit
113 Request information storage unit
114, 1215, 138, 145, 214, 225, 414, 660 Communication unit
120 Learning data generation system
121 Learning data generation management device
1211 Learning data generation management unit
1212 Learning data acquiring device setting unit
1213 Subject operating device setting unit
1214 Learning data acquisition requirement information storage unit
122 Learning data storage unit
123 Subject information input unit
124 Subject operating unit
125 Input/output unit
130, 130' Learning result utilizing device
131 Control unit
132 Neural network setting unit
133 Neural network
134 Learning result input unit
135 Learning data input unit
136 Learning data acquiring unit
137 Output unit
140, 140' Learning data acquiring device
141 Learning data acquisition control unit
142 Operation unit
143 Learning data acquiring unit
144 Learning data storage unit
200, 200', 200", 800 Learning service providing system
210 Learning request receiving device
211 Learning request receiving unit
212 Learning data storage unit
213 Request information storage unit
220 Learning device
221 Learning control unit
222 Learning result extraction unit
223 Neural network
224 Learning result output unit
230 Learning database device
231 Learning data database
232 Request information database
233 Learning result usage history database
234 Requirement information database
235 Learning program database
310 Internet
320 Local area network
330 Wireless local area network
410, 410', 410" Subject operating device
411 Subject operation control unit
412 Subject operation action determination unit
413 Actuator
600, 1101, 1301, 1301', 1401, 1401', 2001, 4101 PC
610 CPU
620 Read only memory
630 Random access memory
640 Storage unit
650 Input/output unit
1102, 1302 User input unit
1104, 1304 Monitor
1105, 1305 Keyboard
1106, 1306 Mouse
1303, 1303', 1403, 1403' Learning data input unit
2002 Server rack
2003 Blade server
4102 Actuator
4103 Subject control device
4105 Robot
710 Learning requesting unit
720 Learning data generation unit
730 Learning data acquiring unit
900 Operation device
1010 Imaging unit
1020 Platform

The invention claimed is:

1. A learning data generation method comprising:
receiving request information for making a request for learning;
transmitting the request information to a device that provides requirement information for generating learning data;
receiving the requirement information from the device; and
generating the learning data based on the requirement information.

2. The method according to claim 1, wherein
the request information comprises information regarding a learning subject comprising a subject of learning to be performed based on the learning data, and information regarding a goal of learning indicating a processing ability to be acquired for the learning subject.

3. The method according to claim 2, wherein
the generating the learning data based on the requirement information comprises:
specifying at least one of a type and the number of learning data, based on the requirement information corresponding to the information regarding the goal of learning; and
generating data regarding the type and/or the number as part of the learning data.

4. The method according to claim 2, wherein
the generating the learning data based on the requirement information comprises:
forming the learning subject and/or an operation subject to be subjected to data acquisition and/or operation for the learning subject, based on the requirement information corresponding to information regarding the learning subject; and
generating data based on the formation, as at least part of the learning data.

5. The method according to claim 2, wherein
the generating the learning data based on the requirement information comprises:
   setting a state of the learning subject based on the requirement information corresponding to information regarding at least one state of the learning subject; and
   generating data for each state of the learning subject as at least part of the learning data.

6. The method according to claim 2, wherein
the generating the learning data based on the requirement information further comprises:
   storing the generated learning data in association with teaching data that reflects the processing ability.

7. The method according to claim 1, further comprising:
receiving a learning result acquired by performing learning based on the learning data; and
performing subject analysis by utilizing the learning result.

8. A processing system that generates learning data, comprising a processor configured with a program to perform operations comprising:
   operation as a request information receiving unit configured to receive request information for making a request for learning;
   operation as a request information transmitting unit configured to transmit the request information to a device configured to provide requirement information for generating learning data;
   operation as a requirement information receiving unit configured to receive the requirement information from the device; and
   operation as a learning data generation unit configured to generate the learning data based on the requirement information.

9. The processing system according to claim 8, wherein
the request information comprises information regarding a learning subject comprising a subject of learning to be performed based on the learning data, and information regarding a goal of learning indicating a processing ability to be acquired for the learning subject.

10. The processing system according to claim 9, wherein
the processor is configured with the program to perform operations such that operation as the learning data generation unit comprises operation as the learning data generation unit configured to
   specify at least one of a type and the number of learning data, based on the requirement information corresponding to the information regarding the goal of learning, and
   generate data regarding the type and/or the number as part of the learning data.

11. The processing system according to claim 9, wherein
the processor is configured with the program to perform operations such that operation as the learning data generation unit comprises operation as the learning data generation unit configured to
   form the learning subject and/or an operation subject to be subjected to data acquisition and/or operation for the learning subject, based on the requirement information corresponding to information regarding the learning subject, and
   generate data based on the formation, as at least part of the learning data.

12. The processing system according to claim 9, wherein
the processor is configured with the program to perform operations such that operation as the learning data generation unit comprises operation as the learning data generation unit configured to
   set a state of the learning subject based on the requirement information corresponding to information regarding at least one state of the learning subject, and
   generate data for each state of the learning subject as at least part of the learning data.

13. The processing system according to claim 9, wherein
the processor is configured with the program to perform operations further comprising:
   operation as a learning data storage unit configured to store the generated learning data in association with teaching data that reflects the processing ability.

14. The processing system according to claim 8, wherein
the processor is configured with the program to perform operations further comprising:
   operation as a learning result receiving unit configured to receive a learning result acquired by performing learning based on the learning data; and
operation as a learning result utilizing unit configured to perform subject analysis by utilizing the learning result.

* * * * *